US012788649B2

(12) United States Patent
Zerhusen et al.

(10) Patent No.: US 12,788,649 B2
(45) Date of Patent: Nov. 10, 2026

(54) ALERT LIGHT METHOD FOR HOSPITAL BED

(71) Applicant: Hill-Rom Services, Inc., Batesville, IN (US)

(72) Inventors: Robert M. Zerhusen, Cincinnati, OH (US); Keith R. Kubicek, Batesville, IN (US); John D. Christie, Batesville, IN (US); Timothy A. Lane, II, Batesville, IN (US); Brandon P. Fisk, Brookville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 19/541,119

(22) Filed: Feb. 16, 2026

(65) Prior Publication Data

US 2026/0174610 A1 Jun. 25, 2026

Related U.S. Application Data

(63) Continuation of application No. 18/960,652, filed on Nov. 26, 2024, now Pat. No. 12,594,203, which is a
(Continued)

(51) Int. Cl.
*A61G 7/05* (2006.01)
*A61G 7/00* (2006.01)
(Continued)

(52) U.S. Cl.
CPC ................. *A61G 7/05* (2013.01); *A61G 7/00* (2013.01); *A61G 7/012* (2013.01); *A61G 7/015* (2013.01);
(Continued)

(58) Field of Classification Search
CPC . A61G 7/05; A61G 7/00; A61G 7/012; A61G 7/015; A61G 7/0506; A61G 7/0507;
(Continued)

(56) References Cited

U.S. PATENT DOCUMENTS

| | | | |
|---|---|---|---|
| 1,078,077 | A | 11/1913 | Arnold |
| 2,527,111 | A | 10/1950 | Widrich |

(Continued)

FOREIGN PATENT DOCUMENTS

| | | | |
|---|---|---|---|
| EP | 0860803 | A1 | 8/1998 |
| EP | 1199027 | A2 | 4/2002 |

(Continued)

OTHER PUBLICATIONS

Silenzio, Silenzio Plus, Silenzio, Delta, Nasal CPAP System, Operator's Guide, Jun. 2003.

(Continued)

*Primary Examiner* — Fredrick C Conley
(74) *Attorney, Agent, or Firm* — Barnes & Thornburg LLP

(57) ABSTRACT

A patient support apparatus, such as a hospital bed, includes an alert light assembly or an alert light module having separate zones that are individually illuminated to convey information regarding respective alert conditions. The zones each have indicia related to a particular condition of the patient support apparatus. The illuminated zones are each sufficiently large so as to be seen from afar, such as on the order of ten feet or more. Alternatively or additionally, the alert light assembly provides a lighted floor projection to indicate detection of an alert condition.

20 Claims, 23 Drawing Sheets

Related U.S. Application Data continuation of application No. 18/499,388, filed on Nov. 1, 2023, now Pat. No. 12,186,249, which is a continuation of application No. 17/939,053, filed on Sep. 7, 2022, now Pat. No. 11,833,090, which is a continuation of application No. 17/143,264, filed on Jan. 7, 2021, now Pat. No. 11,464,692, which is a continuation of application No. 16/897,546, filed on Jun. 10, 2020, now Pat. No. 10,918,546, which is a continuation of application No. 16/679,399, filed on Nov. 11, 2019, now Pat. No. 10,709,625, which is a continuation of application No. 16/513,791, filed on Jul. 17, 2019, now Pat. No. 10,512,574, which is a continuation of application No. 15/499,062, filed on Apr. 27, 2017, now Pat. No. 10,413,465, which is a continuation of application No. 14/200,062, filed on Mar. 7, 2014, now Pat. No. 9,655,798.

(60) Provisional application No. 61/781,935, filed on Mar. 14, 2013.

(51) Int. Cl.
*A61G 7/012* (2006.01)
*A61G 7/015* (2006.01)
*F21V 33/00* (2006.01)

(52) U.S. Cl.
CPC ......... *A61G 7/0506* (2013.01); *A61G 7/0507* (2013.01); *A61G 7/0528* (2016.11); *F21V 33/0072* (2013.01); *A61G 2205/50* (2013.01)

(58) Field of Classification Search
CPC .............. A61G 7/0528; A61G 2205/50; F21V 33/0072
See application file for complete search history.

(56) References Cited

U.S. PATENT DOCUMENTS

| | | | |
|---|---|---|---|
| 3,325,799 | A | 6/1967 | Farris |
| 3,504,540 | A | 4/1970 | Pradko et al. |
| 3,618,592 | A | 11/1971 | Stewart |
| 3,760,794 | A | 9/1973 | Basham |
| 3,802,417 | A | 4/1974 | Lang |
| 3,826,145 | A | 7/1974 | McFarland |
| 3,836,900 | A | 9/1974 | Mansfeld |
| 3,890,958 | A | 6/1975 | Fister et al. |
| 3,898,981 | A | 8/1975 | Basham |
| 3,926,177 | A | 12/1975 | Hardway, Jr. et al. |
| RE28,754 | E | 3/1976 | Cook et al. |
| 3,961,201 | A | 6/1976 | Rosenthal |
| 3,967,846 | A | 7/1976 | Schlage |
| 3,991,414 | A | 11/1976 | Moran |
| 3,991,746 | A | 11/1976 | Hanna |
| 4,020,482 | A | 4/1977 | Feldl |
| 4,038,709 | A | 8/1977 | Kerwit |
| 4,051,522 | A | 9/1977 | Healy et al. |
| 4,097,939 | A | 7/1978 | Peck et al. |
| 4,172,216 | A | 10/1979 | O'Shea |
| 4,175,263 | A | 11/1979 | Triplett et al. |
| 4,179,692 | A | 12/1979 | Vance |
| 4,183,015 | A | 1/1980 | Drew et al. |
| 4,195,287 | A | 3/1980 | McCoy et al. |
| 4,196,425 | A | 4/1980 | Williams, Jr. et al. |
| 4,197,854 | A | 4/1980 | Kasa |
| 4,228,426 | A | 10/1980 | Roberts |
| 4,242,672 | A | 12/1980 | Gault |
| 4,245,651 | A | 1/1981 | Frost |
| 4,264,904 | A | 4/1981 | McCoy et al. |
| 4,275,385 | A | 6/1981 | White |
| 4,295,133 | A | 10/1981 | Vance |
| 4,320,766 | A | 3/1982 | Alihanka et al. |
| 4,426,884 | A | 1/1984 | Polchaninoff |
| 4,435,862 | A | 3/1984 | King et al. |
| 4,484,043 | A | 11/1984 | Musick et al. |
| 4,539,560 | A | 9/1985 | Fleck et al. |
| 4,561,440 | A | 12/1985 | Kubo et al. |
| 4,565,910 | A | 1/1986 | Musick et al. |
| 4,592,104 | A | 6/1986 | Foster et al. |
| 4,601,356 | A | 7/1986 | Muccillo, Jr. |
| 4,633,237 | A | 12/1986 | Tucknott et al. |
| 4,638,307 | A | 1/1987 | Swartout |
| 4,669,136 | A | 6/1987 | Waters et al. |
| 4,680,790 | A | 7/1987 | Packard et al. |
| 4,710,080 | A | 12/1987 | Sheppard |
| 4,751,754 | A | 6/1988 | Bailey et al. |
| 4,793,428 | A | 12/1988 | Swersey |
| 4,803,744 | A | 2/1989 | Peck et al. |
| 4,907,845 | A | 3/1990 | Wood |
| 4,921,295 | A | 5/1990 | Stollenwerk |
| 4,926,951 | A | 5/1990 | Carruth et al. |
| 4,934,468 | A | 6/1990 | Koerber, Sr. et al. |
| 4,947,298 | A | 8/1990 | Stephen |
| 4,953,243 | A | 9/1990 | Birkman |
| 4,953,244 | A | 9/1990 | Koerber, Sr. et al. |
| 4,974,692 | A | 12/1990 | Carruth et al. |
| 4,998,939 | A | 3/1991 | Potthast et al. |
| 5,010,774 | A | 4/1991 | Kikuo et al. |
| 5,023,967 | A | 6/1991 | Ferrand |
| 5,060,174 | A | 10/1991 | Gross |
| 5,115,223 | A | 5/1992 | Moody |
| 5,117,521 | A | 6/1992 | Foster et al. |
| 5,137,033 | A | 8/1992 | Norton |
| 5,138,729 | A | 8/1992 | Ferrand |
| 5,144,284 | A | 9/1992 | Hammett |
| 5,161,274 | A | 11/1992 | Hayes et al. |
| 5,170,364 | A | 12/1992 | Gross et al. |
| 5,184,112 | A | 2/1993 | Gusakov |
| 5,195,198 | A | 3/1993 | Travis |
| 5,239,300 | A | 8/1993 | Berger et al. |
| 5,253,656 | A | 10/1993 | Rincoe et al. |
| 5,269,388 | A | 12/1993 | Reichow et al. |
| 5,276,432 | A | 1/1994 | Travis |
| 5,279,010 | A | 1/1994 | Ferrand et al. |
| 5,307,051 | A | 4/1994 | Sedlmayr |
| 5,317,769 | A | 6/1994 | Weismiller et al. |
| 5,353,012 | A | 10/1994 | Barham et al. |
| 5,377,372 | A | 1/1995 | Rudolf et al. |
| 5,393,935 | A | 2/1995 | Hasty et al. |
| 5,410,297 | A | 4/1995 | Joseph et al. |
| 5,444,880 | A | 8/1995 | Weismiller et al. |
| 5,450,639 | A | 9/1995 | Weismiller et al. |
| 5,502,853 | A | 4/1996 | Singleton et al. |
| 5,542,138 | A | 8/1996 | Williams et al. |
| 5,561,412 | A | 10/1996 | Novak et al. |
| 5,611,096 | A | 3/1997 | Bartlett et al. |
| 5,633,627 | A | 5/1997 | Newham |
| 5,640,145 | A | 6/1997 | Newham |
| 5,654,694 | A | 8/1997 | Newham |
| 5,689,839 | A | 11/1997 | Laganiere et al. |
| 5,699,038 | A | 12/1997 | Ulrich et al. |
| 5,713,856 | A | 2/1998 | Eggers et al. |
| 5,715,548 | A | 2/1998 | Weismiller et al. |
| 5,771,511 | A | 6/1998 | Kummer et al. |
| 5,774,914 | A | 7/1998 | Johnson et al. |
| 5,806,111 | A | 9/1998 | Heimbrock et al. |
| 5,808,552 | A | 9/1998 | Wiley et al. |
| 5,830,149 | A | 11/1998 | Oka et al. |
| 5,838,223 | A | 11/1998 | Gallant et al. |
| 5,878,452 | A | 3/1999 | Brooke et al. |
| 5,906,016 | A | 5/1999 | Ferrand et al. |
| 6,000,076 | A | 12/1999 | Webster et al. |
| 6,008,598 | A | 12/1999 | Luff et al. |
| 6,014,346 | A | 1/2000 | Malone |
| 6,014,784 | A | 1/2000 | Taylor et al. |
| 6,021,533 | A | 2/2000 | Ellis et al. |
| 6,049,281 | A | 4/2000 | Osterweil |
| 6,057,689 | A | 5/2000 | Saadat |
| 6,067,019 | A | 5/2000 | Scott |
| 6,078,261 | A | 6/2000 | Davsko |
| 6,147,592 | A | 11/2000 | Ulrich et al. |
| 6,163,903 | A | 12/2000 | Weismiller et al. |

(56) References Cited

U.S. PATENT DOCUMENTS

| | | | |
|---|---|---|---|
| 6,166,644 | A | 12/2000 | Stroda |
| 6,188,407 | B1 | 2/2001 | Smith et al. |
| 6,199,508 | B1 | 3/2001 | Miale et al. |
| 6,208,250 | B1 | 3/2001 | Dixon et al. |
| 6,226,819 | B1 | 5/2001 | Ogawa et al. |
| 6,234,342 | B1 * | 5/2001 | Cornell .............. B65D 17/4012 220/706 |
| 6,234,642 | B1 | 5/2001 | Bokamper et al. |
| 6,240,579 | B1 | 6/2001 | Hanson et al. |
| 6,252,512 | B1 | 6/2001 | Riley |
| 6,279,183 | B1 | 8/2001 | Kummer et al. |
| 6,286,166 | B1 | 9/2001 | Henley et al. |
| 6,320,510 | B2 | 11/2001 | Menkedick et al. |
| 6,321,878 | B1 | 11/2001 | Mobley et al. |
| 6,336,235 | B1 | 1/2002 | Ruehl |
| 6,351,861 | B1 | 3/2002 | Shows et al. |
| 6,362,725 | B1 | 3/2002 | Ulrich et al. |
| 6,377,178 | B1 | 4/2002 | DeToro et al. |
| 6,378,152 | B1 | 4/2002 | Washburn et al. |
| 6,396,224 | B1 | 5/2002 | Luff et al. |
| 6,430,766 | B1 | 8/2002 | Henley et al. |
| 6,467,111 | B1 | 10/2002 | Vrzalik et al. |
| 6,473,921 | B2 | 11/2002 | Brooke et al. |
| 6,481,688 | B1 | 11/2002 | Welling et al. |
| 6,493,568 | B1 | 12/2002 | Bell et al. |
| 6,544,200 | B1 | 4/2003 | Smith et al. |
| 6,566,833 | B2 | 5/2003 | Bartlett |
| 6,611,979 | B2 | 9/2003 | Welling et al. |
| 6,658,680 | B2 | 12/2003 | Osborne et al. |
| 6,671,905 | B2 | 1/2004 | Bartlett et al. |
| RE38,419 | E | 2/2004 | Auer et al. |
| 6,691,346 | B2 | 2/2004 | Osborne et al. |
| 6,761,344 | B2 | 7/2004 | Welling et al. |
| 6,771,172 | B1 | 8/2004 | Robinson et al. |
| 6,771,181 | B1 | 8/2004 | Hughen, Jr. |
| 6,781,517 | B2 | 8/2004 | Moster et al. |
| 6,791,460 | B2 | 9/2004 | Dixon et al. |
| 6,819,254 | B2 | 11/2004 | Riley |
| 6,822,571 | B2 | 11/2004 | Conway |
| 6,829,796 | B2 | 12/2004 | Salvatini et al. |
| 6,863,652 | B2 | 3/2005 | Huang et al. |
| 6,876,303 | B2 | 4/2005 | Reeder et al. |
| 6,880,189 | B2 | 4/2005 | Welling et al. |
| 6,892,405 | B1 | 5/2005 | Dimitriu et al. |
| 6,897,780 | B2 | 5/2005 | Ulrich et al. |
| 6,957,461 | B2 | 10/2005 | Osborne et al. |
| 6,978,500 | B2 | 12/2005 | Osborne et al. |
| 6,982,405 | B2 | 1/2006 | Erickson et al. |
| 7,010,369 | B2 | 3/2006 | Borders et al. |
| 7,014,000 | B2 | 3/2006 | Kummer et al. |
| 7,017,208 | B2 | 3/2006 | Weismiller et al. |
| 7,038,588 | B2 | 5/2006 | Boone et al. |
| 7,055,195 | B2 | 6/2006 | Roussy |
| 7,100,222 | B2 | 9/2006 | Metz et al. |
| 7,154,397 | B2 | 12/2006 | Zerhusen et al. |
| 7,155,317 | B1 | 12/2006 | Tran |
| 7,171,708 | B2 | 2/2007 | Osborne et al. |
| 7,200,882 | B2 | 4/2007 | Heimbrock |
| 7,237,287 | B2 | 7/2007 | Weismiller et al. |
| 7,242,308 | B2 | 7/2007 | Ulrich et al. |
| 7,253,366 | B2 | 8/2007 | Bhai |
| 7,296,312 | B2 | 11/2007 | Menkedick et al. |
| 7,315,535 | B2 | 1/2008 | Schuman |
| 7,319,386 | B2 | 1/2008 | Collins, Jr. et al. |
| 7,330,127 | B2 | 2/2008 | Price et al. |
| 7,406,731 | B2 | 8/2008 | Menkedick et al. |
| 7,437,787 | B2 | 10/2008 | Bhai |
| 7,443,302 | B2 | 10/2008 | Reeder et al. |
| 7,454,805 | B2 | 11/2008 | Osborne et al. |
| 7,472,439 | B2 | 1/2009 | Lemire et al. |
| 7,480,951 | B2 | 1/2009 | Weismiller et al. |
| 7,506,390 | B2 | 3/2009 | Dixon et al. |
| 7,515,059 | B2 | 4/2009 | Price et al. |
| 7,520,006 | B2 | 4/2009 | Menkedick et al. |
| 7,533,429 | B2 | 5/2009 | Menkedick et al. |
| 7,538,659 | B2 | 5/2009 | Ulrich et al. |
| 7,557,718 | B2 | 7/2009 | Petrosenko et al. |
| 7,568,246 | B2 | 8/2009 | Weismiller et al. |
| 7,594,286 | B2 | 9/2009 | William |
| 7,610,637 | B2 | 11/2009 | Menkedick et al. |
| 7,657,956 | B2 | 2/2010 | Stacy et al. |
| 7,669,263 | B2 | 3/2010 | Menkedick et al. |
| 7,676,866 | B2 | 3/2010 | Toms et al. |
| 7,679,250 | B2 | 3/2010 | Zerhusen et al. |
| 7,690,059 | B2 | 4/2010 | Lemire et al. |
| 7,703,158 | B2 | 4/2010 | Wilker, Jr. et al. |
| 7,716,762 | B2 | 5/2010 | Ferraresi et al. |
| 7,746,218 | B2 | 6/2010 | Collins, Jr. et al. |
| 7,761,942 | B2 | 7/2010 | Benzo et al. |
| 7,779,493 | B2 | 8/2010 | Lemire et al. |
| 7,805,784 | B2 | 10/2010 | Lemire et al. |
| 7,834,768 | B2 | 11/2010 | Dixon et al. |
| 7,836,531 | B2 | 11/2010 | Girard et al. |
| 7,861,334 | B2 | 1/2011 | Lemire et al. |
| 7,962,981 | B2 | 6/2011 | Lemire et al. |
| 7,978,084 | B2 | 7/2011 | Dixon et al. |
| 8,051,513 | B2 | 11/2011 | Reed |
| 8,117,701 | B2 | 2/2012 | Bobey et al. |
| 8,400,311 | B2 | 3/2013 | Dixon et al. |
| 8,416,084 | B2 | 4/2013 | Beltmann et al. |
| 8,537,008 | B2 | 9/2013 | Tallent et al. |
| 8,593,284 | B2 | 11/2013 | Tallent et al. |
| 8,878,679 | B2 | 11/2014 | Arndt et al. |
| 9,655,798 | B2 | 5/2017 | Zerhusen et al. |
| 10,416,465 | B2 | 9/2019 | Zerhusen et al. |
| 10,512,574 | B2 | 12/2019 | Zerhusen et al. |
| 10,709,625 | B2 | 7/2020 | Zerhusen et al. |
| 10,918,546 | B2 | 2/2021 | Zerhusen et al. |
| 11,464,692 | B2 | 10/2022 | Zerhusen et al. |
| 11,833,090 | B2 | 12/2023 | Zerhusen et al. |
| 12,594,203 | B2 | 4/2026 | Zerhusen et al. |
| 2001/0011393 | A1 | 8/2001 | Brooke et al. |
| 2001/0032362 | A1 | 10/2001 | Welling et al. |
| 2002/0002742 | A1 | 1/2002 | Osborne et al. |
| 2002/0044059 | A1 | 4/2002 | Reeder et al. |
| 2002/0066142 | A1 | 6/2002 | Osborne et al. |
| 2002/0138902 | A1 | 10/2002 | Bartlett et al. |
| 2002/0151990 | A1 | 10/2002 | Ulrich et al. |
| 2003/0061664 | A1 | 4/2003 | Salvatini et al. |
| 2003/0197614 | A1 | 10/2003 | Smith et al. |
| 2004/0034936 | A1 | 2/2004 | Welling et al. |
| 2004/0103475 | A1 | 6/2004 | Ogawa et al. |
| 2004/0122476 | A1 | 6/2004 | Wung |
| 2004/0128765 | A1 | 7/2004 | Osborne et al. |
| 2004/0130452 | A1 | 7/2004 | Cherubini |
| 2004/0177443 | A1 | 9/2004 | Simmonds et al. |
| 2004/0177445 | A1 | 9/2004 | Osborne et al. |
| 2004/0227737 | A1 | 11/2004 | Novak et al. |
| 2005/0035871 | A1 | 2/2005 | Dixon et al. |
| 2005/0137530 | A1 | 6/2005 | Campbell et al. |
| 2005/0165235 | A1 | 7/2005 | Hornig |
| 2005/0166324 | A1 | 8/2005 | Dixon et al. |
| 2005/0172405 | A1 | 8/2005 | Menkedick et al. |
| 2005/0187463 | A1 | 8/2005 | Quistgaard et al. |
| 2005/0188462 | A1 | 9/2005 | Heimbrock et al. |
| 2005/0219059 | A1 | 10/2005 | Ulrich et al. |
| 2006/0049936 | A1 | 3/2006 | Collins, Jr. et al. |
| 2006/0053555 | A1 | 3/2006 | Poulos et al. |
| 2006/0075560 | A1 | 4/2006 | Osborne et al. |
| 2006/0096029 | A1 | 5/2006 | Osborne et al. |
| 2006/0097879 | A1 | 5/2006 | Lippincott |
| 2006/0101581 | A1 | 5/2006 | Blanchard et al. |
| 2006/0117482 | A1 | 6/2006 | Branson |
| 2006/0162079 | A1 | 7/2006 | Menkedick et al. |
| 2006/0168730 | A1 | 8/2006 | Menkedick et al. |
| 2006/0168731 | A1 | 8/2006 | Menkedick et al. |
| 2006/0271207 | A1 | 11/2006 | Shaw |
| 2006/0277683 | A1 | 12/2006 | Lamire et al. |
| 2007/0156031 | A1 | 7/2007 | Sullivan et al. |
| 2007/0157385 | A1 | 7/2007 | Lemire et al. |
| 2007/0163043 | A1 | 7/2007 | Lemire et al. |
| 2007/0163045 | A1 | 7/2007 | Becker et al. |
| 2007/0164871 | A1 | 7/2007 | Dionne et al. |
| 2007/0169268 | A1 | 7/2007 | Lemire et al. |

(56) References Cited

U.S. PATENT DOCUMENTS

| | | | | |
|---|---|---|---|---|
| 2007/0174964 | A1 | 8/2007 | Lemire et al. | |
| 2007/0174965 | A1* | 8/2007 | Lemire | A61G 7/0528 5/630 |
| 2007/0180616 | A1 | 8/2007 | Newkirk et al. | |
| 2007/0210917 | A1 | 9/2007 | Collins, Jr. et al. | |
| 2007/0268480 | A1 | 11/2007 | Kaye | |
| 2008/0005838 | A1 | 1/2008 | Wan Fong et al. | |
| 2008/0010747 | A1 | 1/2008 | Dixon et al. | |
| 2008/0010748 | A1 | 1/2008 | Menkedick et al. | |
| 2008/0169931 | A1 | 7/2008 | Gentry et al. | |
| 2008/0172789 | A1 | 7/2008 | Elliot et al. | |
| 2008/0201847 | A1 | 8/2008 | Menkedick et al. | |
| 2008/0201851 | A1 | 8/2008 | Menkedick et al. | |
| 2008/0205311 | A1 | 8/2008 | Perkins et al. | |
| 2008/0235872 | A1 | 10/2008 | Newkirk et al. | |
| 2008/0289108 | A1 | 11/2008 | Menkedick et al. | |
| 2009/0023764 | A1 | 1/2009 | Kwon et al. | |
| 2009/0031498 | A1 | 2/2009 | Girard et al. | |
| 2009/0089930 | A1 | 4/2009 | Benzo et al. | |
| 2009/0094744 | A1 | 4/2009 | Benzo et al. | |
| 2009/0094745 | A1 | 4/2009 | Benzo et al. | |
| 2009/0094746 | A1 | 4/2009 | Ferraresi et al. | |
| 2009/0302782 | A1 | 12/2009 | Smith | |
| 2009/0313758 | A1 | 12/2009 | Menkedick et al. | |
| 2010/0000018 | A1 | 1/2010 | Eleonori et al. | |
| 2010/0052917 | A1 | 3/2010 | Sullivan et al. | |
| 2010/0073168 | A1 | 3/2010 | Tallent et al. | |
| 2010/0275376 | A1 | 11/2010 | Benzo et al. | |
| 2011/0037597 | A1 | 2/2011 | Dixon et al. | |
| 2011/0133935 | A1 | 6/2011 | Beltmann | |
| 2011/0162141 | A1 | 7/2011 | Lemire et al. | |
| 2011/0231996 | A1 | 9/2011 | Lemire et al. | |
| 2011/0277242 | A1 | 11/2011 | Dionne et al. | |
| 2012/0023659 | A1 | 2/2012 | Zerhusen et al. | |
| 2012/0023666 | A1 | 2/2012 | Heimbrock et al. | |
| 2012/0105233 | A1 | 5/2012 | Bobey et al. | |
| 2012/0291200 | A1 | 11/2012 | Dixon et al. | |
| 2014/0259410 | A1 | 9/2014 | Zerhusen et al. | |
| 2014/0292529 | A1 | 10/2014 | Zerhusen | |
| 2014/0313700 | A1* | 10/2014 | Connell | A47C 17/86 362/130 |
| 2015/0257952 | A1* | 9/2015 | Zerhusen | G08C 17/02 340/12.5 |
| 2016/0022218 | A1 | 1/2016 | Hayes et al. | |
| 2016/0128610 | A1 | 5/2016 | Kostic et al. | |
| 2017/0224562 | A1 | 8/2017 | Zerhusen et al. | |
| 2018/0161225 | A1* | 6/2018 | Zerhusen | A47C 27/10 |
| 2018/0294984 | A1* | 10/2018 | Poh | H04L 12/14 |
| 2018/0353358 | A1* | 12/2018 | Lingegård | A61G 7/05 |
| 2019/0024882 | A1* | 1/2019 | Jönsson | A61G 13/104 |
| 2019/0336368 | A1 | 11/2019 | Zerhusen et al. | |
| 2020/0069491 | A1 | 3/2020 | Zerhusen et al. | |
| 2020/0297562 | A1 | 9/2020 | Zerhusen et al. | |
| 2021/0128382 | A1 | 5/2021 | Zerhusen et al. | |
| 2023/0000700 | A1 | 1/2023 | Zerhusen et al. | |
| 2025/0082524 | A1 | 3/2025 | Zerhusen et al. | |

FOREIGN PATENT DOCUMENTS

| | | | |
|---|---|---|---|
| EP | 1354539 | B1 | 10/2003 |
| EP | 1477110 | A1 | 11/2004 |
| JP | H2-156950 | A | 6/1990 |
| JP | H3-47860 | B2 | 7/1991 |
| JP | H7-107195 | A | 4/1995 |
| JP | H11-290395 | A | 10/1999 |
| JP | H11-299837 | A | 11/1999 |
| JP | 2003164496 | A | 6/2003 |
| JP | 2003524483 | A | 8/2003 |
| JP | 2004049706 | A | 2/2004 |
| JP | 2004141484 | A | 5/2004 |
| JP | 2005118147 | A | 5/2005 |
| JP | 2005168913 | A | 6/2005 |
| JP | 2005185346 | A | 7/2005 |
| WO | 97/20534 | A1 | 6/1997 |
| WO | 01/47340 | A2 | 7/2001 |
| WO | 01/75834 | A1 | 10/2001 |
| WO | 01/85085 | A2 | 11/2001 |
| WO | 2004/093023 | A2 | 10/2004 |
| WO | 2007/056342 | A2 | 5/2007 |
| WO | 2013053040 | A1 | 4/2013 |
| WO | 2013071246 | A1 | 5/2013 |

OTHER PUBLICATIONS

Gaymar, Aire Twin, Alternating Pressure and Low-Air-Loss Therapy Mattress Replacement Systems, Operator's Manual, 2005.

Hill-Rom, User Manual, TotalCare Bariatric Bed, Product No. P1830A, Apr. 2003.

Extended European Search Report, European Application No. 16155337.5, completed May 16, 2016, (8 pages).

European Search Report on EP Application No. EP 14 15 9531, dated Jun. 25, 2014, 4 pages.

Hill-Rom "ProAxis Plus Bed User Manual—13867(5)," 2005.

Hill-Rom "Duo Deteq Alternating Therapy System User Manual (usr037)," Oct. 2000.

Centra From Hill-Rom. Hill-Rom 1992.

In Services Manual Centra Bed from Hill-Rom, Hill-Rom 1996.

The Advance 2000 Bed from Hill-Rom, Hill-Rom 1993.

ADEL 500XL Childbearing Bed, Stryker Patient Care, May 1995.

Stryker Adel 2100EC Childbearing Bed, Stryker Patient Care, Jan. 1994.

Advantage Stretcher Stryker Patient Handling, May 1994.

Hausted Gemini Series, Hausted, Inc., Oct. 1993.

* cited by examiner

ALERT LIGHT METHOD FOR HOSPITAL BED

CROSS REFERENCE TO RELATED APPLICATIONS

The present application is a continuation of U.S. application Ser. No. 18/960,652, filed Nov. 26, 2024, now U.S. Pat. No. 12,594,203, which is a continuation of U.S. application Ser. No. 18/499,388, filed Nov. 1, 2023, now U.S. Pat. No. 12,186,249, which is a continuation of U.S. application Ser. No. 17/939,053, filed Sep. 7, 2022, now U.S. Pat. No. 11,833,090, which is a continuation of U.S. application Ser. No. 17/143,264, filed Jan. 7, 2021, now U.S. Pat. No. 11,464,692, which is a continuation of U.S. application Ser. No. 16/897,546, filed Jun. 10, 2020, now U.S. Pat. No. 10,918,546, which is a continuation of U.S. application Ser. No. 16/679,399, filed Nov. 11, 2019, now U.S. Pat. No. 10,709,625, which is a continuation of U.S. application Ser. No. 16/513,791, filed Jul. 17, 2019, now U.S. Pat. No. 10,512,574, which is a continuation of U.S. application Ser. No. 15/499,062, filed Apr. 27, 2017, now U.S. Pat. No. 10,413,465, which is a continuation of U.S. application Ser. No. 14/200,062, filed Mar. 7, 2014, now U.S. Pat. No. 9,655,798, which claims the benefit, under 35 U.S.C. § 119(e), of U.S. Provisional Application No. 61/781,935, filed Mar. 14, 2013, and each of which is hereby incorporated by reference herein in its entirety.

BACKGROUND

The present disclosure relates to hospital beds, and particularly to hospital beds that have alert indicators such as lights. More particularly, the present disclosure relates to hospital beds that alert caregivers to different alert conditions of the hospital bed.

Hospital beds having lights to alert caregivers of undesirable conditions are known. For example, the CENTRA™ bed marketed by Hill-Rom Company, Inc. starting in the early 1980's had four light emitting diodes (LED's) at the foot end of the bed in a vertical arrangement which indicated, respectively, an electrical ground loss, bed not in low position, bed motors locked out, and foot brake not set. The LED's were rather small and thus, caregivers needed to view these close up, such as on the order of two feet or closer, in order to read the explanatory text next to each of the LED's.

In recent times, alert lights on beds have been made much larger and conspicuous so that caregivers can easily see these lights from a distance of ten feet or more. Thus, a caregiver is able to view the alert light status from a hallway by looking through a doorway of a patient room. See, for example, U.S. Patent Application Publication Nos. 2012/0105233 A1, 2011/0277242 A1 and 2010/0073168 A1. These more recent types of alert lights typically are illuminated green to indicate that multiple monitored bed conditions are all in a desired state and are illuminated some other color, such as amber or red, to indicate that at least one of the monitored bed conditions is in an undesirable state. However, the caregiver does not know which of the monitored conditions is causing the alert light or lights to be illuminated the color other than green. Instead, the caregiver must know what the monitored conditions are and to make a visual inspection of various bed features to determine which feature needs attention to correct the alert situation.

Based on the foregoing, it will be appreciated that there is room for improvement in connection with alert lights on hospital beds.

SUMMARY

A patient support apparatus may comprise one or more of the features recited in the appended claims and/or the following features which, alone or in any combination, may comprise patentable subject matter:

A patient support apparatus may include a base frame and an upper frame that may be supported above the base frame and that may be configured to support a patient. The upper frame may have a head end, a foot end, and a pair of laterally spaced apart sides. The head end and foot end may be spaced apart in a longitudinal dimension of the patient support apparatus and the upper frame may have a lateral frame member at the foot end. The patient support apparatus may further have an alert light assembly which may be attached to the lateral frame member. The alert light assembly may have separate zones that may be individually illuminated to convey information regarding respective alert conditions. The alert light assembly may be sufficiently large to occupy at least about one third the distance between the laterally spaced apart sides of the upper frame and to occupy at least about half the distance between a top and a bottom of the lateral frame member without extending beyond the top and bottom of the lateral frame member.

The patient support apparatus may further have a footboard that may be removably coupleable to the foot end of the upper frame. The alert light assembly may remain attached to the lateral frame member when the footboard is removed from the upper frame. The footboard may have a lower end that may be formed with a laterally extending opening through which the alert light assembly may be visible when the footboard is attached to upper frame. In some embodiments, the footboard may include a clear lens that may cover the laterally extending opening. Alternatively, the footboard may have a bottom edge that may be situated atop the lateral frame member when the footboard is attached to the upper frame so that the alert light assembly may be visible beneath the bottom edge of the footboard.

According to this disclosure, the separate zones of the alert light assembly may each include a lens and the lenses of the separate zones may be spaced horizontally from one end of the alert light assembly to the other. In some embodiments, there may be four separate zones and the lens of each separate zone may have indicia associated therewith to indicate a particular alert condition when the associated zone is illuminated a color other than green. For example, a first indicia associated with a first lens may relate to a patient position monitoring system, a second indicia associated with a second lens may relate to an angle at which a head section of the upper frame is raised, a third indicia associated with a third lens may relate to a position of the upper frame relative to the base frame, and a fourth indicia of a fourth lens may relate to a position of a siderail that may be coupled to the upper frame. The indicia on each lens of the separate zones may be etched or printed thereon.

In some embodiments, the alert light assembly may include an elongated bar that may serve as a housing for the separate zones. Thus, the elongated bar may have openings around the separate zones through which light may pass. The alert light assembly may include a set of tabs that may be formed integrally with the elongated bar The set of tabs may be used to fasten the alert light assembly to the lateral frame member. Optionally, the elongated bar may be situated inside an interior region of the lateral frame member. In some such embodiments, the lateral frame member may have a substantially vertically oriented wall that has a laterally extending hole that receives a portion of the elongated bar. Alternatively or additionally, the elongated bar may be attached to the lateral frame member with adhesive. If desired, a bezel that may frame an outer periphery of the elongated bar may be provided.

According to some embodiments of this disclosure, the lateral frame member may have a cut out midway between the laterally spaced apart sides of the upper frame and the alert light assembly may include electrical conductors that may pass through the cut out into an interior region of the lateral frame member. Each of the separate zones of the alert light assembly may include a lens that may be located in a respective opening of the elongated bar and at least one light emitter that may be located behind the respective lens. The at least one light emitter may include, for example, a first light emitter that may emit green light and a second light emitter that may emit amber light. In some embodiments, portions of the elongated bar may serve as partitions between the lenses.

According to an aspect of this disclosure, a patient support apparatus may have an alert light module extending downwardly from a bottom surface of the lateral frame member. The alert light module may be an alternative to the alert light assembly or may be in addition to the alert light assembly. The alert light module may have separate zones that may be individually illuminated to convey information regarding respective alert conditions. In some embodiments, the alert light module may have a housing with partition walls that may be located between the separate zones.

The separate zones of the alert light module may each include a lens and the lenses of the separate zones may be spaced horizontally from each other by respective ones of the partition walls. In some embodiments, there may be four separate zones and the lens of each separate zone may have indicia associated therewith to indicate a particular alert condition when the associated zone is illuminated a color other than green. For example, a first indicia associated with a first lens may relate to a patient position monitoring system, a second indicia associated with a second lens may relate to an angle at which a head section of the upper frame is raised, a third indicia associated with a third lens may relate to a position of the upper frame relative to the base frame, and a fourth indicia of a fourth lens may relate to a position of a siderail that is coupled to the upper frame.

In some embodiments, the indicia associated with each lens may be printed or etched on the respective lens. Alternatively or additionally, the indicia associated with each lens may be located on the lateral frame member above the respective lens of the alert light module. For example, the indicia located on the lateral frame member may be included on a sticker that may be adhered to the lateral frame member above the alert light module. In some embodiments, the alert light module may be situated about midway between the pair of laterally spaced apart sides of the upper frame. In some such embodiments, the alert light module may occupy at least about a third of a distance between the pair of laterally spaced apart sides of the upper frame. In other embodiments, the alert light module may be situated adjacent a first lateral side of the pair of lateral sides of the upper frame and a second alert light module may be provided and may be situated adjacent a second lateral side of the pair of lateral sides of the upper frame.

According to some embodiments of this disclosure, the housing of the alert light module may have a peripheral housing portion that may form a shell. The partition walls may be formed integrally with the shell. The housing may further have a translucent lens that may couple to the shell and that may bridge across spaces defined between the partition walls. In such embodiments, each of the partition walls may have an outer edge that may abut an inner surface of the translucent lens. A set of indicia may be provided, such as being printed or etched on the translucent lens, so as to be positioned generally centrally within each of the zones that may be illuminated.

The housing of the alert light module may further include a backing plate that may have a back wall that may couple to the shell behind the partition walls. The alert light module may also include a light emitting diode (LED) board that may be situated between the back wall and the shell. The backing plate may have a top wall that may overlie the shell and that may have at least one aperture for accommodating a fastener which may attach the alert light module to the bottom surface of the lateral frame member. In some embodiments, the at least one aperture may be provided generally in a central region of the top wall and which may permit the alert light module to be rotated about a generally vertical axis relative to the lateral frame member to reorient the alert light module into a desired viewing angle. In other embodiments, the alert light module may not be permitted to rotate relative to the lateral frame member.

According to another aspect of the present disclosure, a patient support apparatus may include a bed frame that may have a head end, a foot end, and a pair of laterally spaced part sides. The bed frame may be configured to support a person and the bed frame may have a lateral frame member at the foot end. A set of alert lights may be coupled to the lateral frame member and may be arranged to emit light upwardly. The patient support apparatus may further have a footboard that may be coupled to the bed frame. The footboard may have a set of light pipes that may overlie the alert lights and that may extend from a bottom of the footboard toward a top of the footboard. Upper ends of the light pipes may be visible and may emit light from a light emitting region at the top of the footboard.

In some embodiments, a translucent lens may overlie the upper ends of the light pipes. In some embodiments, the set of alert lights may be included as part of a light emitting diode (LED) strip. In such embodiments, the lateral frame member may have a top wall that may be formed to include an elongated opening and the LED strip may emit light upwardly through the elongated opening. The LED strip may include four zones and each zone may be capable of emitting two different colors. In some embodiments, the two different colors may include green and either amber or red. In embodiments having four zones, the set of light pipes may include four light pipes and each light pipe may be situated over a respective zone of the four zones.

According to some embodiments, the set of alert lights may comprise four alert lights and the set of light pipes may comprise four light pipes. Each light pipe may overlie a respective one of the alert lights. A plurality of indicia may be provided on the footboard beneath the light emitting region. Each indicia may relate to a particular feature of the patient support apparatus associated with a respective alert light. For example, a first indicia may relate to a patient position monitoring system, a second indicia may relate to an angle at which a head section of the upper frame is raised, a third indicia may relate to a position of the upper frame relative to the base frame, and a fourth indicia may relate to a position of a siderail that may be coupled to the upper frame. In some embodiments, the plurality of indicia on the footboard may be included on a sticker that may be adhered to the footboard beneath the light emitting region.

According to yet another aspect of the present disclosure, a patient support apparatus may include an electronic display coupled to the lateral frame member in lieu of the alert light assembly or the alert light module or, if desired, in addition to the alert light assembly or the alert light module. The electronic display may be operable to display messages including messages that may relate to alert conditions of the patient support apparatus. In some embodiments, the alert light assembly may be sufficiently large to occupy more than half the distance between the laterally spaced apart sides of the upper frame and to occupy a space between a top and a bottom of the lateral frame member without extending beyond the top and bottom of the lateral frame member.

In some embodiments, the electronic display may comprise a two-dimensional grid of light emitting diodes (LED's) which may be illuminated to form messages. If desired, the messages may scroll horizontally on the electronic display but this need not be the case. In other embodiments, the electronic display may comprise a liquid crystal display (LCD). The LCD may be illuminated predominantly green in color when a set of monitored conditions of the patient support apparatus all have a satisfactory status. The LCD may be illuminated predominantly amber in color when at least one of the set of monitored conditions of the patient support apparatus does not have a satisfactory status. Of course other colors associated with either or both of the satisfactory and unsatisfactory statuses may be used on the LCD if desired.

In some embodiments, the LCD may display a message identifying the particular monitored condition that may not have a satisfactory status. The electronic display may be situated inside an interior region of the lateral frame member and the lateral frame member may have a substantially vertically oriented wall that may have a laterally extending hole that may receive a portion of the electronic display. The patient support apparatus may further include a footboard that may be removably coupleable to the foot end of the upper frame. The footboard may have a lower end that may be formed with a laterally extending opening through which the electronic display may be visible when the footboard is attached to upper frame.

According to still further aspect of the present disclosure, the patient support apparatus may include another type of alert light module that may be coupled to the lateral frame member. The alert light module may have a housing and a plurality of light emitters that may be situated in an interior region of the housing. The housing may have a bottom wall that includes a plurality of shaped cutouts. Each light emitter may emit light through a respective one of the shaped cutouts to project onto the floor a lighted image that may have a shape matching a respective one of the shaped cutouts.

The shaped cutouts may comprise graphical images that correspond to respective features of the patient support apparatus. In some embodiments, the housing may have a set of openings spaced from the shaped cutouts. Lenses may be provided and each lens may cover a respective one of the openings. Each lens may have a graphical image thereon and each graphical image may have a shape that may be substantially similar to a shape of a respective one of the shaped cutouts. The housing may have a front wall extending upwardly from the bottom wall and the openings may be formed in the front wall.

The housing may have a set of partition walls in an interior region of the housing. Each partition wall may be situated between a respective pair of the light emitters such that each light emitter may emit light through a respective one of the lenses and a respective one of the cutouts. Each of the shaped cutouts may have associated therewith a pair of the light emitters. A first light emitter of the pair of light emitters may emit green light, for example, and a second light emitter of the pair of light emitters may emit either amber light or red light.

According to yet a further aspect of this disclosure, a patient support apparatus may include a siderail coupled to the upper frame. The siderail may be movable between a raised position situated higher in elevation than the upper frame and a lowered position in which a majority of the siderail may be lower in elevation than the upper frame. An alert light assembly may be attached to the siderail. The alert light assembly may have separate zones that may be individually illuminated to convey information regarding respective alert conditions. The separate zones may be arranged side-by-side in series and the series may be horizontally oriented when the upper frame is in a horizontal position.

In some embodiments, the alert light assembly may be situated closer to a bottom of the siderail than to a top of the siderail. The siderail may have a first end and a second end and the series of separate zones may occupy more than half the distance between the first and second ends of the siderail. In some embodiments, the alert light assembly may comprise a polypropylene light emitting diode (LED) strip. In such embodiments, the polypropylene LED strip may have an adhesive backing that may be used to attach the polypropylene LED strip to the siderail. If desired, the alert light assembly may be embedded in a cavity that may be formed in the siderail.

As is the case with some other embodiments disclosed herein, each of the separate zones of the alert light assembly attached to the siderail may include a lens that has indicia associated therewith to indicate a particular alert condition when the associated zone is illuminated a color other than green. For example, a first indicia that may be associated with a first lens may relate to a patient position monitoring system, a second indicia that may be associated with a second lens may relate to an angle at which a head section of the upper frame may be raised, a third indicia that may be associated with a third lens may relate to a position of the upper frame relative to the base frame, and a fourth indicia that may be associated with a fourth lens may relate to a position of the siderail relative to the upper frame. Each of the zones may be illuminated green in color when an associated condition of the patient support apparatus has a satisfactory status and each of the zones may be illuminated either amber or red when the associated condition of the patient support apparatus has an unsatisfactory condition.

According to still further embodiments, a patient support apparatus may have a graphical user interface (GUI) attached to a siderail in addition to or in lieu of the alert light assemblies and the alert light modules discussed elsewhere herein. In such embodiments having a GUI, a screen saver may appear on the GUI after a period of inactivity of use of the GUI. The screen saver may include a set of enlarged graphical icons that may be colored to indicate a status of an associated feature of the patient support apparatus.

In some embodiments, the set of enlarged graphical icons may include an icon that may relate to one, two or all three of the following: a patient position monitoring system, an angle at which a head section of the upper frame is raised, and a position of the upper frame relative to the base frame. For example, a first icon of the set of graphical icons on the screen saver may relate to whether an angle of a head section is above a threshold angle. If desired, an angle at which the head section is raised relative to one of the upper frame and horizontal may be displayed on the screen saver near the first icon. The screen saver may also display information pertaining to a patient supported by the patient support apparatus. The information may include textual information indicating that the patient is a falls risk, just to list one example.

According to still a further aspect of this disclosure, a patient support apparatus may include a pole coupled to the upper frame. The pole may have a pole axis that may be defined along its length. An alert light assembly may be supported by the pole. The alert light assembly may have separate zones that may be individually illuminated to indicate respective alert conditions. The separate zones may be stacked along the pole axis.

In some embodiments, each of the separate zones has a tri-lobed configuration. The pole may be movable relative to the upper frame between a use position extending generally vertically upwardly from the upper frame and a storage position extending generally horizontally and in proximity to a frame member of the upper frame. A footboard may be coupled to the upper frame and a mattress may be supported by the upper frame. When the pole is in the storage position, one of the lobes of the tri-lobe configuration of each of the separate zones may be tucked into a crevice that may be defined between the mattress and the footboard.

In some embodiments, each of the separate zones may include a lens that may encompass the pole axis. Each lens may have indicia associated therewith to indicate a particular alert condition when the associated zone is illuminated a color other than green. The indicia on each lens may include three graphical icons spaced equally around the pole axis. The separate zones may comprises four separate zone. The three graphical icons of the respective lens of a first zone of the four separate zones may relate to a patient position monitoring system, the three graphical icons of the respective lens of a second zone of the four separate zones may relate to an angle at which a head section of the upper frame is raised, the three graphical icons of the respective lens of a third zone of the four separate zones may relate to a position of the upper frame relative to the base frame, and the three graphical icons of the respective lens of a fourth zone of the four separate zones may relate to a position of a siderail that is coupled to the upper frame.

In some embodiments, the alert light assembly supported on the pole may include separation walls between each of the separate zones so that light emitted from one of the separate zones may be prevented from bleeding into an adjacent zone. Each zone of the separate zones may include a first light emitter that may emit light of a first color and a second light emitter that may emit light of a second color. For example, the first color may be green and the second color may be either amber or red.

According another aspect of the present disclosure, a patient support apparatus may include a frame that may be configured to support a patient, at least one sensor that may be coupled to the frame and that may produce a signal that may be used to monitor a sleep state of the patient, and an alert light coupled to the frame. The alert light may be illuminated based on the sleep state of the patient so as to indicate an optimal time for a caregiver to take at least one vital sign of the patient.

In some instances, the optimal time for the caregiver to take the at least one vital sign may be when the signal from the sensor indicates that the sleep state of the patient may be a deep sleep state. In other instances, the optimal time for the caregiver to take the at least one vital sign may be when the signal from the sensor indicates that the sleep state of the patient may be an alert state of sleep. In some embodiments, the alert light may be changed from a first color to a second color to indicate the optimal time for the caregiver to take the at least one vital sign of the patient. In other embodiments, the alert light may be changed from an off state to an on state to indicate the optimal time for the caregiver to take the at least one vital sign of the patient.

While several of the embodiments discussed above have four separate zones for alerting, it is within the scope of this disclosure for an alert light assembly or an alert light module of the types discussed herein to have a number of zones less than or greater than four.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
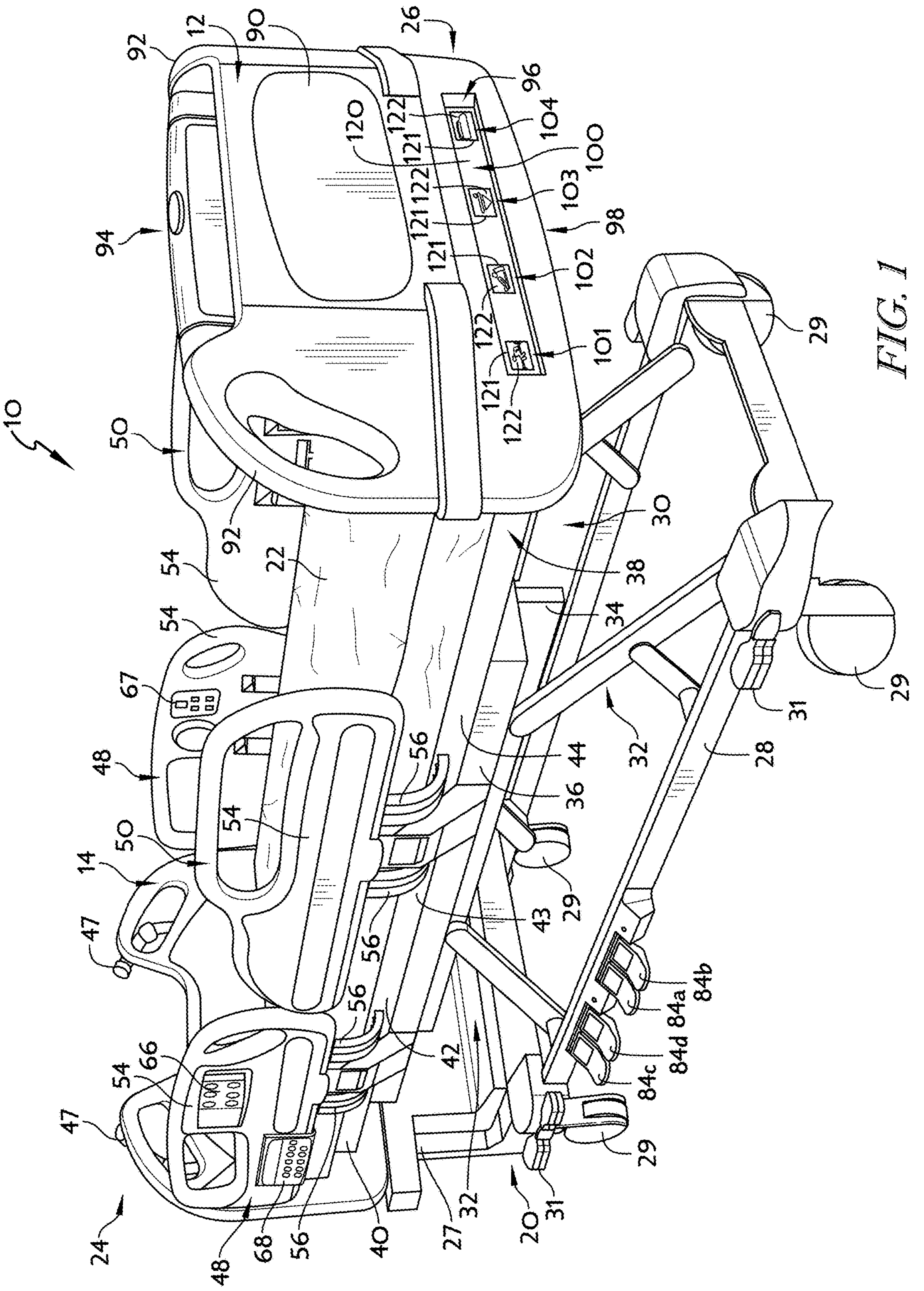
FIG. 1 is a perspective view of a hospital bed showing a footboard attached to an upper frame of the hospital bed, the footboard having a laterally extending, substantially horizontal opening at its lower end through which an alert light assembly is visible.

A patient support apparatus, such as illustrative hospital bed 10, includes a bed frame 20 that supports a surface or mattress 22 as shown in FIG. 1. The hospital bed 10 shown in FIG. 1 is based on the VERSACARE™ bed marketed by Hill-Rom Company, Inc. However, the present disclosure is applicable to other patient support apparatuses including, for example, other types of beds, patient tables, stretchers, wheel chairs, and the like. Furthermore, use of the term "hospital bed" herein is intended to mean beds that support patients in all types of settings including, for example, nursing homes, outpatient facilities, medical clinics, and even a patient's own home, and is not intended to imply that such beds must be located in a hospital. As will be described in further detail below, the present disclosure is focused primarily on various alert light assemblies or alert light modules that convey information regarding the status of multiple features or functions of bed 10.

Referring still to FIG. 1, frame 20 of bed 10 includes a base frame 28, an upper frame assembly 30 and a lift system 32 coupling upper frame assembly 30 to base frame 28. Lift system 32 is operable to raise, lower, and tilt upper frame assembly 30 relative to base frame 28. Bed 10 has a head end 24 and a foot end 26 that is spaced from head end 24 in a longitudinal dimension of bed 10. Hospital bed 10 further includes a footboard 12 at the foot end 26 and a headboard 14 at the head end 24. Illustrative bed 10 includes a pair of push handles 47 coupled to an upstanding portion 27 of base frame 28 at the head end 24 of bed 10. Headboard 46 is also coupled to upstanding portion 27 of base frame 28 as well. Footboard 45 is coupled to upper frame assembly 30. Base frame 28 includes wheels or casters 29 that roll along a floor (not shown) as bed 10 is moved from one location to another. A set of foot pedals 31 are coupled to base frame 28 and are used to brake and release casters 29.

Illustrative hospital bed 10 has four siderail assemblies coupled to upper frame assembly 30 as shown in FIG. 1. The four siderail assemblies include a pair of head siderail assemblies 48 (sometimes referred to as head rails) and a pair of foot siderail assemblies 50 (sometimes referred to as foot rails). Siderails 48 are spaced from each other in a lateral dimension of bed 10 and the same can be said of siderails 50. Each of the siderail assemblies 48, 50 is movable between a raised position, as shown in FIG. 1, and a lowered position (not shown). Siderail assemblies 48, 50 are sometimes referred to herein as siderails 48, 50. Each siderail 48, 50 includes a barrier panel 54 and a linkage 56. Each linkage 56 is coupled to the upper frame assembly 30 and is configured to guide the barrier panel 54 during movement of siderails 48, 50 between the respective raised and lowered positions. Barrier panel 54 is maintained by the linkage 56 in a substantially vertical orientation during movement of siderails 48, 50 between the respective raised and lowered positions.

Upper frame assembly 30 includes a lift frame 34, a weigh frame 36 supported with respect to lift frame 34, and a patient support deck 38 carried by weigh frame 36. Each of frames 34, 36, 38, either individually of collectively, is considered to be an "upper frame" according to this disclosure. Thus, patient support apparatuses that omit one or more of frames 34, 36, 38 but yet still have an upper frame are within the scope of this disclosure. So, basically, the upper frame is considered to be the portion of bed frame 20 that is moved by lift system 32 relative to base frame 30, regardless of its configuration. Accordingly, upper frame assembly 30 is sometimes referred to herein as simply upper frame 30.

Patient support deck 38 is carried by weigh frame 36 and engages a bottom surface of mattress 22. Patient support deck 38 includes a head section 40, a seat section 42, a thigh section 43 and a foot section 44 in the illustrative example as shown in FIG. 1. The placement of reference numerals 40, 42, 43, 44 in FIG. 1 generally denotes the location of the corresponding sections. Sections 40, 43, 44 are each movable relative to weigh frame 36. For example, head section 40 pivotably raises and lowers relative to seat section 42 whereas foot section 44 pivotably raises and lowers relative to thigh section 43. Additionally, thigh section 43 articulates relative to seat section 42. Also, in some embodiments, foot section 44 is extendable and retractable to change the overall length of foot section 44 and therefore, to change the overall length of deck 38.

In the illustrative embodiment, seat section 42 is fixed in position with respect to weigh frame 36 as patient support deck 38 moves between its various patient supporting positions including a horizontal position, shown in FIG. 1, to support the patient in a supine position, for example, and a chair position (not shown) to support the patient in a sitting up position. In other embodiments, seat section 42 also moves relative to weigh frame 36, such as by pivoting and/or translating. Of course, in those embodiments in which seat section 42 translates along upper frame 42, the thigh and foot sections 43, 44 also translate along with seat section 42.

Bed 10 includes one or more motors or actuators, which in some embodiments, comprise linear actuators with electric motors to move the various sections 40, 43, 44 relative to frame 36 and operate lift system 32 to raise, lower, and tilt upper frame assembly 30 relative to base frame 28. These actuators are well-known in the hospital bed art and thus, are not illustrated herein. Alternative actuators or motors contemplated by this disclosure include hydraulic cylinders and pneumatic cylinders, for example. Further details of the various aspects of bed 10 can be found in U.S. Pat. Nos. 6,658,680; 6,611,979; 6,691,346; 6,957,461; and 7,296,312, each of which is hereby expressly incorporated by reference herein to the extent not inconsistent with the present disclosure which shall control as to any inconsistencies.

In the illustrative example, bed 10 has four foot pedals 84*a*, 84*b*, 84*c*, 84*d* coupled to base frame 28 as shown in FIG. 1. Foot pedal 84*a* is used to raise upper frame assembly 30 relative to base frame 28, foot pedal 84*b* is used to lower upper frame assembly 30 relative to base frame 28, foot pedal 84*c* is used to raise head section 40 relative to frame 36, and foot pedal 84*d* is used to lower head section 40 relative to frame 36. In other embodiments, foot pedals 84*a-d* are omitted.

Each siderail 48 includes a first user control panel 66 coupled to the outward side of the associated barrier panel 54 and each siderail 48 includes a second user control panel 67 coupled to the inward side of the associated barrier panel 54. Control panel 66 includes various buttons that are used by a caregiver (not shown) to control associated functions of bed 10 and control panel 67 includes various buttons that are used by a patient (not shown) to control associated function of bed 10. For example, control panel 66 includes buttons that are used to raise and lower the head section 40, buttons that are used to operate knee motor to raise and lower the thigh section 43, and buttons that are used to raise, lower, and tilt upper frame assembly 30 relative to base frame 28. In the illustrative embodiment, control panel 67 includes buttons that are used to raise and lower the head, thigh, and foot sections 40, 43, 44. In some embodiments, the buttons of control panels 66, 67 comprise membrane switches.

In the illustrative embodiment, a scale/ppm control panel 68 is also provided on the outward side of at least one barrier panel 54 of siderails 48 as shown in FIG. 1. A scale/patient position monitoring (ppm) system of bed 10 is a well-known feature to those skilled in the art and is used to weight a patient supported on bed 10 and to monitor a position of the patient on bed 10. Such a scale/ppm system, in some patient support apparatuses, such as bed 10 has weight and/or position sensors 70 as shown diagrammatically in FIG. 27. Sensors 70 in some embodiments include load cells with strain gages. The load cells support scale frame 36 with respect to lift frame 36 in the embodiment of bed 10 of FIGS. 1 and 2. Signals from sensors 70 are electrically coupled to control circuitry 72 of bed 10 and are processed by a microprocessor 74 of control circuitry of bed 10 using software stored in memory 76 to determine a patient's weight and position on bed 10. Further details of a suitable scale/ppm system for use on bed 10 are included in U.S. Pat. Nos. 6,658,680; 6,611,979; 6,691,346; 6,957,461; and 7,296,312 which are already incorporated by reference herein. Still more details of a suitable scale/ppm system for bed 10 can be found in U.S. Pat. No. 7,253,366 which is hereby expressly incorporated by reference herein to the extent not inconsistent with the present disclosure which shall control as to any inconsistencies.

Figure 2:
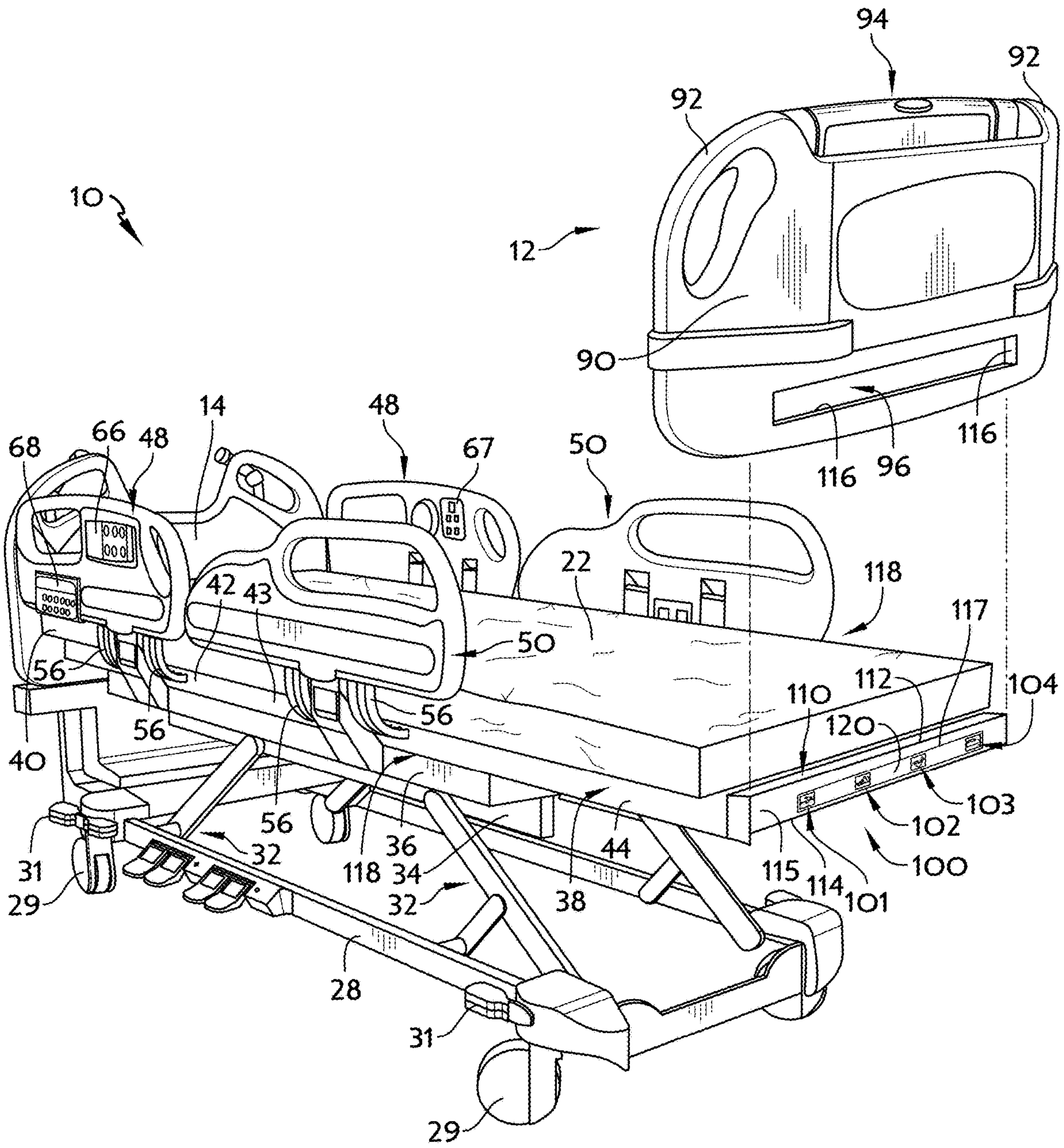
FIG. 2 is a perspective view, similar to FIG. 1, showing the footboard exploded upwardly away from the upper frame and showing the alert light assembly coupled to a lateral frame member of the upper frame.

Referring now to FIGS. 1 and 2, footboard 12 has a main body 90 that serves as a barrier at foot end 26 of bed 10. Main body 90 is formed to include a pair of grip handles 92 at its upper end or top 94 and is formed to include a laterally extending, generally horizontal opening 96 adjacent its lower end or bottom 98. Footboard 12 is removably coupleable to upper frame 30 as is well-known in the art. Thus, footboard 12 includes a first set of couplers (not shown) that mate with a second set of couplers (not shown) provided on upper frame 30. For example, in some embodiments footboard 12 has posts (not shown) that are received in sockets (not shown) provided at the foot end 26 of foot section 44 of deck 38. In other embodiments, footboard 12 has sockets and foot end 26 of foot section 44 of deck 38 has upstanding posts that are received in the sockets of footboard 12. An example of footboard coupling to a bed frame using posts and sockets is discussed below in connection with FIG. 13.

When footboard 12 is coupled to upper frame assembly 30, as shown in FIG. 1, opening 96 aligns with an alert light assembly 100 such that the alert light assembly is visible through opening 96 at the foot end 26 of bed 10. Alert light assembly 100 is attached to a lateral frame member 110 of foot section 44 of deck 44 as shown in FIG. 2. When footboard 12 is detached from upper frame assembly 30, as shown in FIG. 2, alert light assembly 100 remains attached to lateral frame member 110 and, of course, can still be seen at the foot end 26 of bed 10.

Alert light assembly 100 has four separate zones 101, 102, 103, 104 that are individually illuminated to convey information regarding respective alert conditions of bed 10. According to this disclosure, alert light assembly 100 is sufficiently large to occupy at least about one third of the distance between the longitudinally extending, laterally spaced apart sides 118 of the upper frame 30 and to occupy at least about half the distance between a top surface 112 and a bottom surface 114 of the lateral frame member 110 without extending beyond top surface 112 and bottom surface 114 of the lateral frame member 110. In fact, in the illustrative example, alert light assembly 100 occupies roughly three fourths of the distance between the longitudinally extending sides 118 of upper frame 30. Thus, alert light assembly 100 is on the order of about two to three feet in length across the lateral dimension of upper frame 30 between sides 118.

Alert light assembly 100 has an elongated bar or housing 120 that carries the zones 101, 102, 103, 104 that are illuminated. Thus, alert light assembly 100 is sometimes referred to as a "light bar." In the illustrative example, opening 96 is shaped as an elongated, narrow, horizontally extending rectangle defined by a rectangular edge 116 as shown best in FIG. 2. Opening 96 is about the same size as the periphery of housing 120 of alert light assembly 100. Furthermore, lateral frame member 110 has a vertically oriented wall 115 formed with a rectangular hole or opening 117 that is also about the same size as opening 96 and the periphery of housing 120. Thus, the majority of housing 120 is situated inside an interior region of lateral frame member 110 but a portion of housing 120 is received within opening 117 to fill opening 117. In some embodiments, however, housing 120 is recessed just slightly within opening 117 so that an outer surface of wall 115 of lateral frame member 110 protects alert light assembly 100 to some extent from impacts. In the illustrative example, opening 117 in wall 115 is situated about midway between the sides 118 of upper frame assembly 30. Later frame member 110, therefore, is a tubular member having a substantially hollow interior region that receives a portion of housing 120.

In the example of FIGS. 1 and 2, each of zones 101, 102, 103, 104 is approximately square in shape or slightly rectangular. According to this disclosure, each of zones 101, 102, 103, 104 is substantially the same size and this size may range from about 1 inch to about 3 inches in the vertical dimension and from about 1 inch to about 3 inches in the horizontal dimension, at the option of the bed designer. Thus, zones 101, 102, 103, 104, even at their lower size range, are much larger than standard light emitting diodes (LED's) having domes which typically come in sizes of three or five millimeters in diameter. Accordingly, when any of zones 101, 102, 103, 104 are illuminated, they can be viewed and understood from a distance that is on the order of ten to twenty feet away. Thus, a caregiver standing in a hallway of healthcare facility and looking through the door of a patient room will easily be able to discern which of zones 101, 102, 103, 104 is illuminated green or illuminated a color other than green, such as red, orange, or amber, or not illuminated at all.

In the illustrative example of FIGS. 1 and 2, the amount of housing material situated horizontally between each of zones 101, 102, 103, 104 is larger that the horizontal dimension of each of zones 101, 102, 103, 104. In other words, a fairly noticeable unilluminated space between zones 101, 102, 103, 104 exists in the embodiment shown in FIGS. 1 and 2. In some embodiments, housing 120 is formed to include openings 121 that receive lenses 122 which are associated with respective zones 101, 102, 103, 104. The portions of housing 120 between the openings 121 that receive lenses 122, therefore, serve as partitions between the lenses.

Inside housing 120, behind each of the lenses 122 is at least one light emitter. In some embodiments, the at least one light emitter behind each lens 122 includes a first LED 78 that emits green light and a second LED 80 that emits amber or yellow light as shown diagrammatically in FIG. 27. In other embodiments, second LED emits some other color of light other than green, such as red or orange. In the diagrammatic example of FIG. 27, a pair of electrical conductors 82 electrically couple control circuitry 72 of bed 10 to each respective LED 78, 80 with at least one conductor 82 of each pair having a current limiting resistor 86. Thus, control circuitry 72 controls whether LED 78 of each zone 101, 102, 103, 104 is lit or whether LED 80 of each zone 101, 102, 103, 104 is lit depending upon the status of the monitored bed conditions. In some embodiments, control circuitry 72 includes one or more LED driver integrated circuit (IC) chips (not shown) that control the application of current on conductors 82 to illuminate the respective LED's 78, 80.

Other light emitters for assembly 100, including light bulbs of suitably small size, are within the scope of this disclosure. In lieu of two separate LED's 78, 80, a bi-color or tri-color LED is used in other embodiments of alert light assembly 100. Organic light emitting diodes (OLED's), including light-emitting electrochemical cells (LEC's), are used as the light emitters in still other embodiments contemplated by this disclosure. Thus, the term light emitter is intended to cover all devices that are capable of emitting light. A flexible light strip that carries a set of LED's is attached to a rear of housing 120 in some embodiments such that LED's on the flexible light strip are positioned within the openings of housing 120 behind respective lenses 122.

Each of lenses 122 is translucent such that light appears to be emitted from each lens 122 across the entire surface area of the lens 122, with one exception in some embodiments. In the example of FIGS. 1 and 2, each lens 122 has an indicia provided thereon which blocks the emitted light from passing through the indicia. The indicia on the lenses 122 of each zone 101, 102, 103, 104 relates to a particular bed function such that each zone 101, 102, 103, 104 is illuminated in a manner to indicate a satisfactory status or unsatisfactory status of four different bed conditions, assuming the particular bed condition is being monitored. If a particular condition of bed 10 associated with one or more of zones 101, 102, 103, 104 is not being monitored, then the light emitter(s) associated with that zone is turned off altogether. In some embodiments, lenses 122 are frosted in appearance.

In the illustrative example shown in FIGS. 1 and 2, zone 101 is associated with a bed exit or ppm function of the scale/ppm system of bed 10. Thus, the indicia of zone 101 is an icon of a person starting to exit the bed and stand up. Thus, when the ppm system of bed 10 is armed such that a patient's position on bed 10 is being monitored by the control circuitry of bed 10 in a known manner, zone 101 is illuminated green to indicate a satisfactory status if the patient is within a range of permissible positions on bed 10 and zone 101 is illuminated a color other than green (e.g., amber, red, or orange) to indicate an unsatisfactory status if the patient has moved outside the range of permissible positions. Bed exit is one of the modes or levels of sensitivity of the ppm system, as is well-known in the art. Other modes of other patient movement amounts or sensitivities are also known in the art for ppm systems. For example, many beds marketed by Hill-Rom Company, Inc. have three modes of sensitivity: patient movement mode, patient position mode, and out-of-bed mode. Zone 101 changes from being illuminated green to being illuminated a color other than green in response to the detection of an alarm condition associated with the selected mode of operation of the ppm system of bed 10. If the ppm system is disarmed, then zone 101 is not illuminated any color at all. The ppm system of bed 10 includes weight/position sensors 70 and the portion of control circuitry 72, both hardware and software, related to the weighing and ppm function of bed 10.

In the illustrative example shown in FIGS. 1 and 2, zone 102 is associated with a head of bed (HOB) angle. Thus, bed 10 includes an angle sensor 88, shown diagrammatically in FIG. 27, such as a potentiometer or accelerometer that measures an angle at which head section 40 of deck 38 is raised relative to frame 36, in the case of the potentiometer, or relative to horizontal, in the case of the accelerometer. Sensor 88 is electrically coupled to control circuitry 72. In some embodiments, a potentiometer or other type of shaft encoder, such as a magnetic sensor or optical rotary encoder, is included in the actuator that moves head section 40 and an output from the potentiometer or shaft encoder of the actuator is correlated to an angle of head section 40 relative to frame 36. Thus, in such embodiments the potentiometer or the shaft encoder of the linear actuator serves as the angle sensor 88. In any event, when a HOB angle monitoring feature of bed 10 is armed, control circuitry 72 of bed 10 monitors the HOB angle to make sure that head section 40 is raised above a threshold angle, such as thirty degrees or fifty degrees, for example. Other threshold angles are within the scope of this disclosure.

It is not uncommon for doctors to order that the HOB angle be raised to at least the threshold angle as a preventative measure for ventilated assisted pneumonia (VAP) from occurring in the patient. Thus, when the HOB angle monitoring feature is armed, zone 102 is illuminated green to indicate a satisfactory status when the head section 40 is raised above the threshold angle and zone 102 is illuminated a color other than green to indicate an unsatisfactory status when head section 40 is below the threshold angle. The indicia of zone 102 is an icon of a patient's torso raised up through an arc. If the HOB monitoring function of bed 10 is disarmed, then zone 102 is not illuminated any color.

In the illustrative example of FIGS. 1 and 2, zone 103 is associated with a bed height monitoring system. Thus, a height at which lift system 32 supports lift frame 34 relative to base frame 28 is monitored by the control circuitry 72 of bed 10 based on electrical inputs from one or more lift system position sensors 91 as indicated diagrammatically in FIG. 27. Under typical use conditions when a patient is in bed 10, it is preferable that lift frame 34, and therefore weigh frame 36, be placed in its lowermost position relative to base frame 28. Thus, in some embodiments, the actuators of lift system 32 have sensors 91, such as potentiometers or shaft encoders that produce signals which correlate to a position at which lift system 32 supports frame 34 relative to base frame 28. In other embodiments, one or more limit switches serve as sensors 91 and are provided to indicate whether or not lift frame 34 is in its lowest position. The bed height monitoring system of bed 10 includes one or more sensors 91 and the portion of control circuitry 72, both hardware and software, related to determining whether or not upper frame 30 of bed 10 is in its lowermost position.

Thus, when the height monitoring system of bed 10 is armed, zone 103 is illuminated green to indicate a satisfactory status when lift frame 34 is in its lowermost position (sometimes referred to as a "lowered position") and zone 103 is illuminated a color other than green to indicated an unsatisfactory status when some or all of lift frame 34 is moved out of the lowered position. The indicia of zone 103 is an icon of a patient lying horizontally with a down arrowhead icon beneath the patient. If the bed height monitoring system of bed 10 is disarmed, then zone 103 is not illuminated any color.

In the illustrative example of FIGS. 1 and 2, zone 104 is associated with a siderail position monitoring system of bed 10. Thus, bed 10 has sensors 93 which monitor the position of each of siderails 48, 50 as is well-known in the art. The sensors 93 to monitor siderail position are, for example, limit switches or magnetic switches such as switches having Hall effect sensors. In some embodiments, the particular siderails 48, 50 to monitor is selectable by a caregiver using one of control panels 66, 68, for example. Thus, among the four siderails 48, 50 of bed 10, the caregiver is able to select whether one, two, three or four of them are monitored. In other embodiments, the bed 10 defaults to monitoring the position of all four siderails when the siderail monitoring system is armed.

For each of the monitored siderails, when the siderail monitoring system is armed, a satisfactory status is considered to exist when all of the monitored siderails 48, 50 are in the raised position as shown in FIG. 1. If any one or more of the monitored siderails 48, 50 is lowered while the siderail monitoring system is armed, that is considered to be an unsatisfactory status. Zone 104 is illuminated green when a satisfactory status is detected and zone 104 is illuminated a color other than green when an unsatisfactory status is detected. The indicia of zone 104 is a siderail icon. If the siderail monitoring system of bed 10 is disarmed, then zone 104 is not illuminated any color. The siderail positioning monitoring system of bed 10 includes sensors 93 and the portion of control circuitry 72, both hardware and software, related to the determining the position of siderails 48, 50 of bed 10.

For each lens 122 of zones 101, 102, 103, 104 the associated indicia is printed, such as being screen printed, or etched on the lens in some embodiments. In other embodiments, the indicia are printed on a clear or transparent sticker that is adhered to the respective lens 122. In still other embodiments, the area on lens 122 forming the respective icon is frosted more heavily (e.g., is made more opaque by frosting) than the remaining areas of lens 122. Thus, the present disclosure contemplates all manner of providing lenses 122 with their respective icons.

Figure 27:
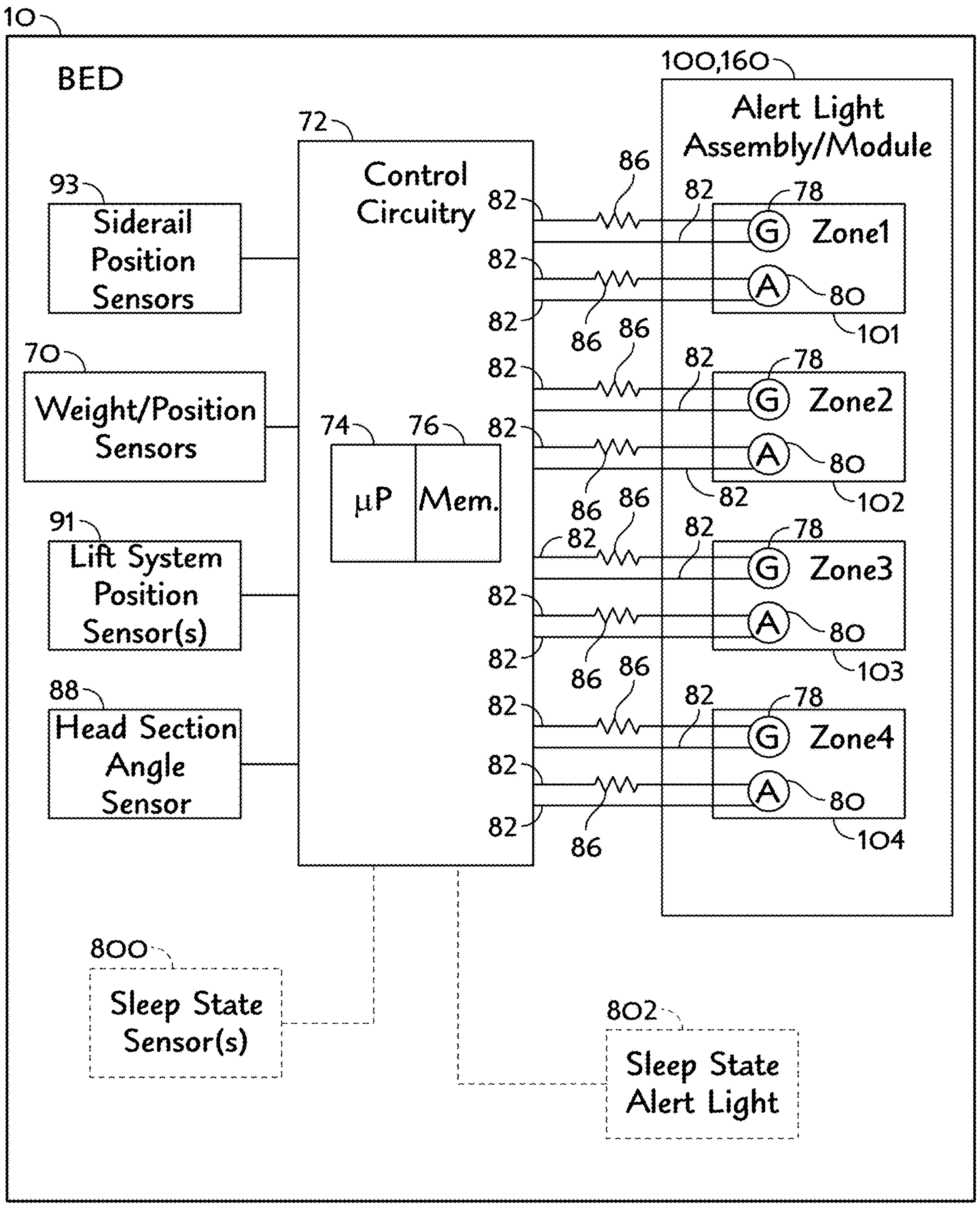
FIG. 27 is a block diagram of portions of an electrical system of a hospital bed showing various sensors coupled to control circuitry of the bed and the control circuitry coupled to respective green and amber alert lights of corresponding zones of an alert light assembly or module.

With regard to FIG. 27, it should be noted that not all electrical components of bed 10 are intended to be shown. For example, bed motors and actuators are omitted. Some beds have integrated air mattress systems with associated electrical components such as electrically operated valves, such as solenoid valves, and air sources, such as blowers, compressors, and pumps. These too are omitted from FIG. 27. The user inputs of control panels 66, 67, 68 are omitted from FIG. 27. Power circuitry such as the components that receive AC power from an external AC power outlet and convert the received power to appropriate DC voltage levels, such as 5 V for powering integrated circuit components and 24 V for powering the bed motors and actuators, are omitted from FIG. 27. Furthermore, while FIG. 27 diagrammatically uses a single block to represent control circuitry 72 and includes a single microprocessor 74 and memory 76 represented by respective blocks, this is not intended to imply that all of control circuitry 72 is on a single circuit board or that circuitry 72 has only one microprocessor or one memory component. In some embodiments, bed 10 has multiple circuit boards carried by various portions of frame 20 and has multiple microprocessors and memory devices 76 as well as additional accompanying circuit components.

Figure 3:
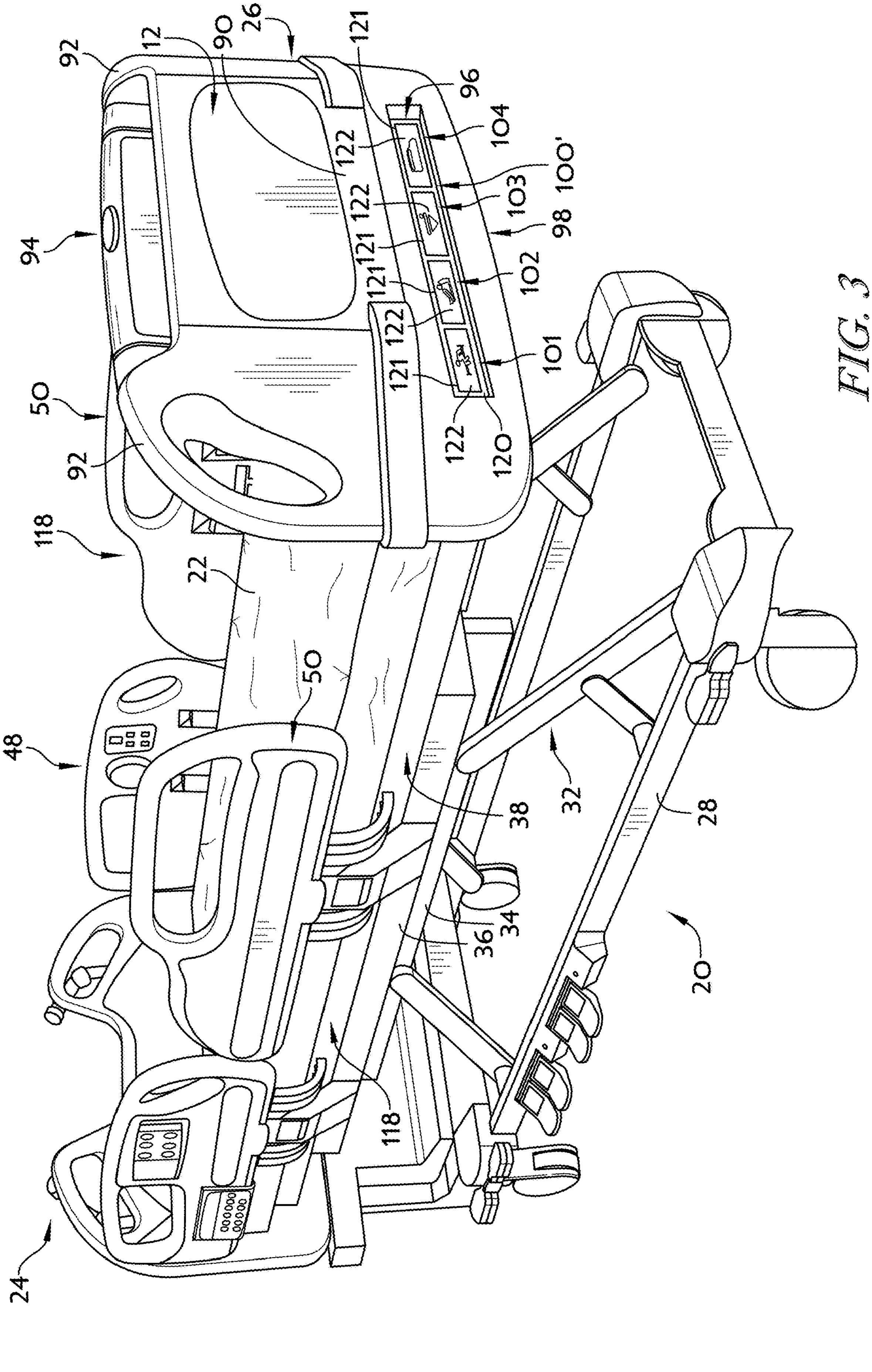
FIG. 3 is a perspective view of a hospital bed, similar to FIG. 1, but showing an alternative alert light assembly that has larger alert light zones and that has less space between the separate zones of the alert light than the embodiment of FIG. 1.

Referring now to FIG. 3, bed 10 is shown with an alternative alert light assembly 100' that is very similar to alert light assembly 100 of FIGS. 1 and 2. Thus, in FIG. 3, the same reference numbers that were used in FIGS. 1 and 2 are used again to denote like components of bed 10 and light assembly 100'. The main difference between alert light assembly 100' and alert light assembly 100 is that openings 121 are much larger in alert light assembly 100' than they were in assembly 100 and the lenses 122 in openings 121 of assembly 100' are correspondingly larger. Thus, only narrow bands of material of housing 120 of assembly 100' serve as partitions between respective zones 101, 102, 103, 104 of assembly 100'. Otherwise, all other aspects of bed 10 and alert light assembly 100' shown in FIG. 3 are the same as described above in connection bed 10 and alert light assembly 100 shown in FIGS. 1 and 2. The discussion of FIG. 27 above is also equally applicable to bed 10 and assembly 100'.

Figure 4:
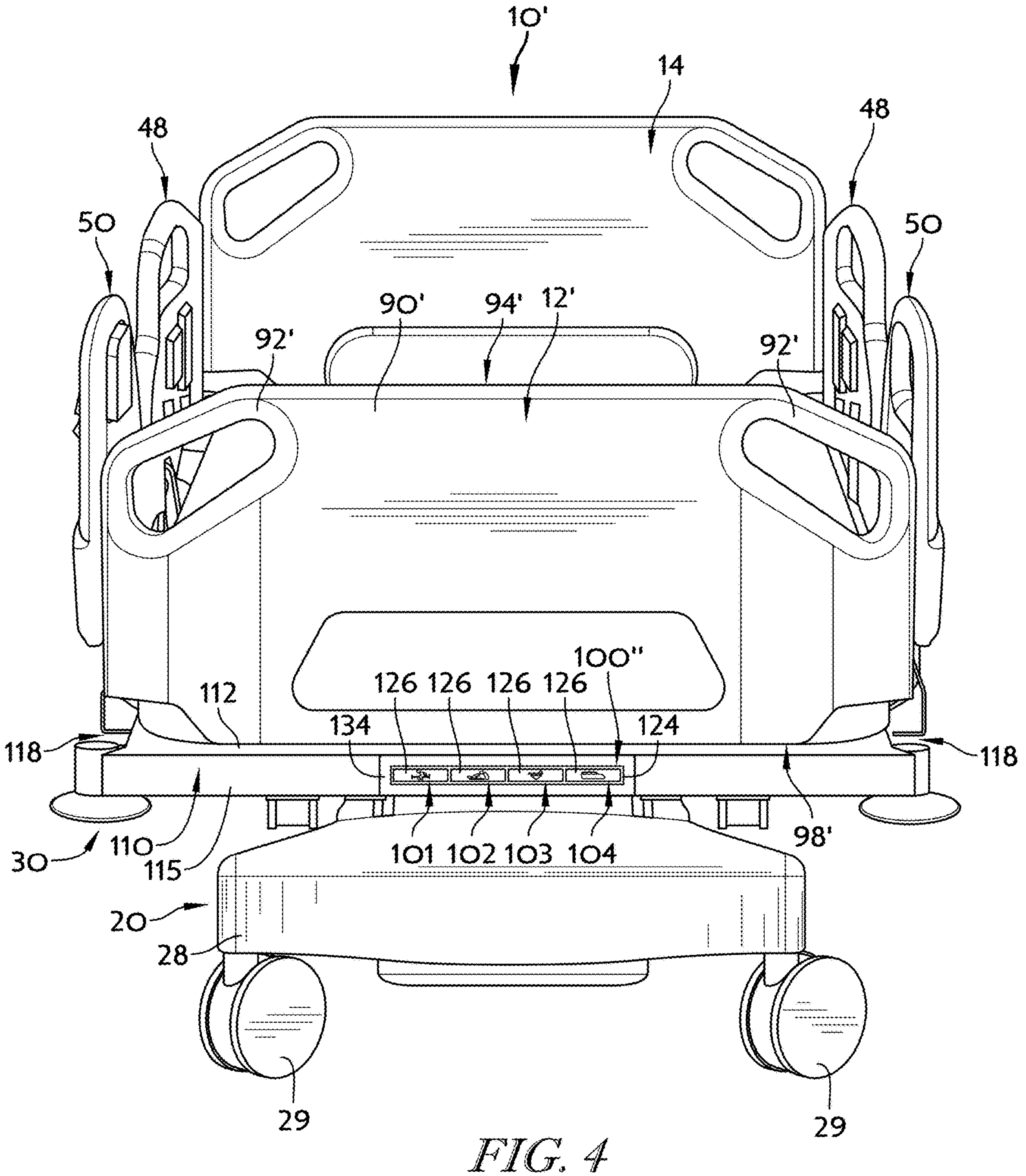
FIG. 4 is an end view of another hospital bed showing an alert light assembly attached to a lateral frame member of an upper frame of the hospital bed and showing a footboard attached to a lateral frame member with a bottom edge of the footboard situated atop the lateral frame member.

Referring now to FIG. 4, an alternative bed 10' is shown. Portions of bed 10' that are similar to bed 10 are denoted with like reference numerals. Bed 10' includes an alternative alert light assembly 100" which in the illustrative embodiment does not occupy as much lateral space between sides 118 of upper frame 30 as assemblies 100, 100'. However, assembly 100" still occupies about a third of the distance between sides 118 of upper frame assembly 30 and therefore, is still visible from afar, such as on the order of ten to twenty feet. Assembly 100" is located about midway between sides 118 and is roughly about one foot to about eighteen inches in length.

Figure 5:
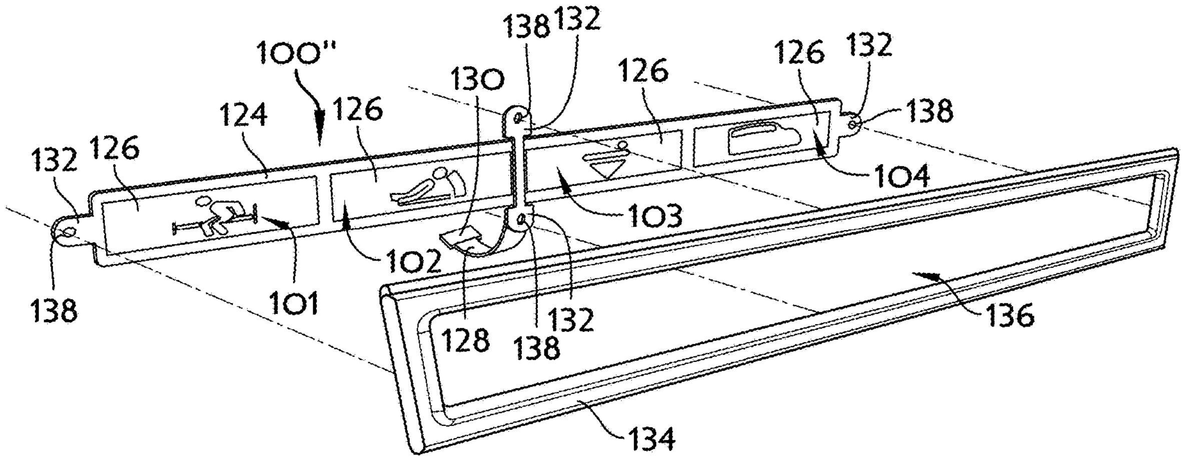
FIG. 5 is an exploded view of the alert light assembly of FIG. 4 showing an elongated bar that serves has a housing, the elongated bar having four lenses situated in respective opening of the elongated bar, a set of tabs extending from the elongated bar, a ribbon of electrical conductors extending downwardly from a central region of the elongated bar, and a protective bezel exploded away from the elongated bar.

Rather than being a "light bar" like alert light assembly 100, alert light assembly 100" is a "light strip" that has a very thin substrate 124 which carries bi-color light emitting diode (LED) regions 126 which serve as the respective zones 101, 102, 103, 104 that are illuminated to convey information regarding respective alert conditions as shown best in FIG. 5. Substrate is about 0.06 inches thick in some embodiments. Embodiments of other thicknesses, such as about 0.1 inches for example, are within the scope of this disclosure. Substrate 124 is made of polypropylene, in some embodiments, and has recessed pockets in which LED regions 126 are situated. Each region 126 of zones 101, 102, 103, 104 of assembly 100" has the same indicia and relates to the same functions of bed 10 as assemblies 100, 100'.

In some embodiments, substrate 124 has an adhesive backing such that assembly 100" is adhered to an outer surface of vertical wall 115 of lateral frame member 110. Thus, in the illustrative example, substrate 124 and regions 126 are situated outside the interior region of frame member 110. Assembly 100" has a ribbon 128 of electrical conductors which terminate at an electrical connector 130 as shown in FIG. 5. Ribbon 128 extends from a central region of substrate 124 about midway between the opposite ends of substrate 124. The conductors of ribbon 128 are routed from connector 130 to the various regions 126. Wall 115 of frame member 110 has a hole, such as a relatively small slot through which connector 130 and ribbon 128 are routed into the interior region of lateral frame member 110. Connector 130 attaches to a mating electrical connector in the interior region of frame member 110 and electrical conductors extend from the mating connector to control circuitry 72, thereby to electrically couple assembly 100" with circuitry 72.

Circuitry 72 controls the illumination of regions 126 depending upon the status associated with the signals received by circuitry 72 from sensors 70, 88, 91, 93. In some embodiments, regions each comprise a single bicolor LED and three conductors of ribbon 128 are associated with the bicolor LED of each region 126. When circuitry 72 causes current to conduct through a first pair of the three conductors of ribbon 128 associated with a respective region 126, the region 126 is illuminated green in color to indicate a respective satisfactory status. When circuitry 72 causes current to conduct through a second pair of the three conductors of ribbon 128 associated a respective region 126, the region 126 is illuminated a color other than green, such as amber or red, to indicate a respective unsatisfactory status. When no current is conducted by any of the three conductors, the respective region emits no light.

In the illustrative embodiment, substrate 124 has a set of connector tabs 132 that receive fasteners, such as rivets, screws, or bolts, to couple alert light assembly 100" to lateral frame member 110. Tabs 132 may be used in addition to, or in lieu of, the adhesive backing of substrate 124. In the illustrative example, four tabs 132 are provided and extend from the top, bottom and opposite ends of substrate 124. Tabs 132 are formed integrally with substrate 124 and have the same thickness (e.g., 0.06 inches) in the illustrative example. Referring again to assembly 100 of FIGS. 1 and 2 and assembly 100' of FIG. 3, in some embodiments, housing 120 has tabs similar to tabs 132 of assembly 100". However, the tabs of assemblies 100, 100' are not as thick as the thickness of housing 120, which is roughly on the order of about 0.25 inches to about 1 inch thick, and are situated inside the interior region of frame member 110, whereas tabs 132 of assembly 100" are located outside of the interior region of frame member 110 in most embodiments.

In the illustrative example of FIGS. 4 and 5, a protective bezel 134 is provided and covers the periphery of substrate 124 and tabs 132. Bezel 134 is rectangular in shape and has a large central opening 136, shown in FIG. 5, through which regions 126 of zones 101, 102, 103, 104 are visible as shown in FIG. 4. In some embodiments, bezel 134 has an adhesive backing to secure bezel 134 against the outer surface of wall 115 of lateral frame member 110. In other embodiments, bezel 134 has fingers or projections which snap into apertures 138 provided in tabs 132. Receipt of the fingers or projections in apertures 138 secures bezel 134 in place. In such embodiments, substrate 124 is adhesively backed because apertures 138 are intended to be used to secure bezel 134 in place rather than being used to receive fasteners to couple substrate 124 to frame member 110.

Figure 6:
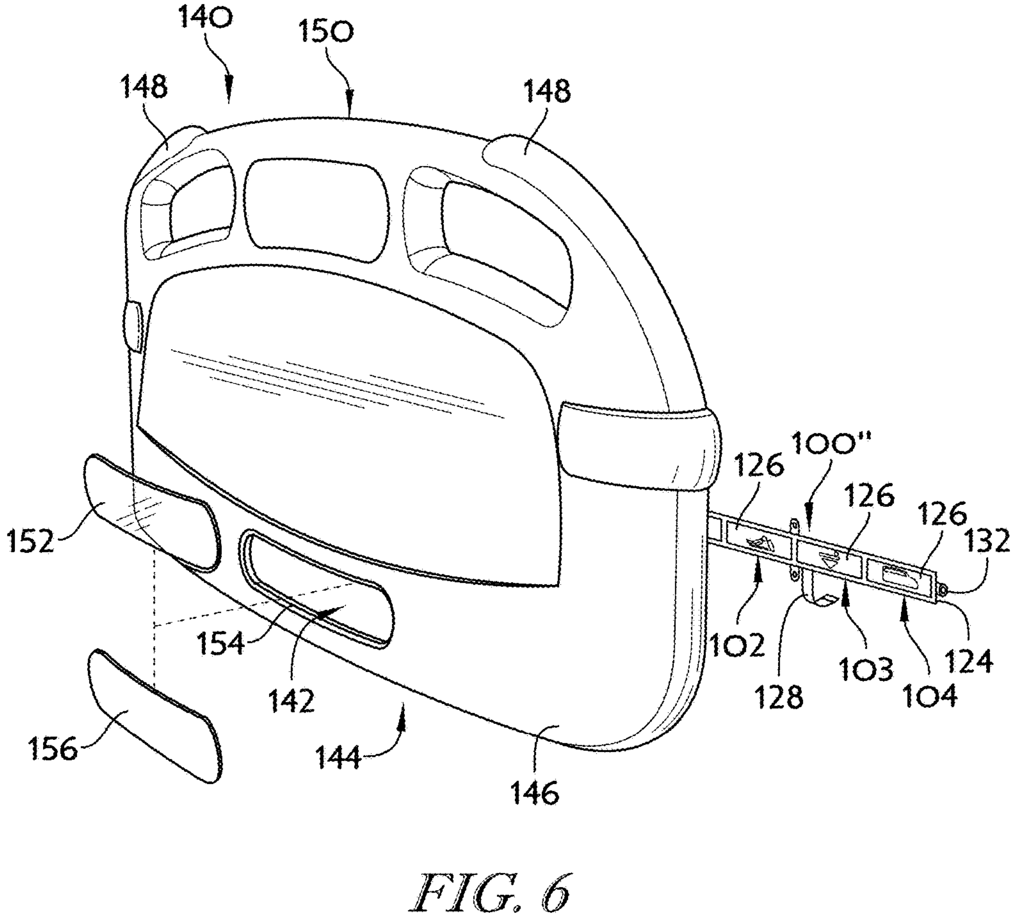
FIG. 6 is an exploded view showing a footboard that is used, in some embodiments, with the alert light assembly of FIGS. 4 and 5, the footboard having a laterally extending, substantially horizontal opening at its lower end through which the alert light assembly is visible and showing an optional clear lens that is placed over the opening when the footboard is used with a hospital bed that has the alert light assembly and an optional neutral blank that is placed over the opening when the footboard is used with a hospital bed that omits the alert light assembly.
Figure 7:
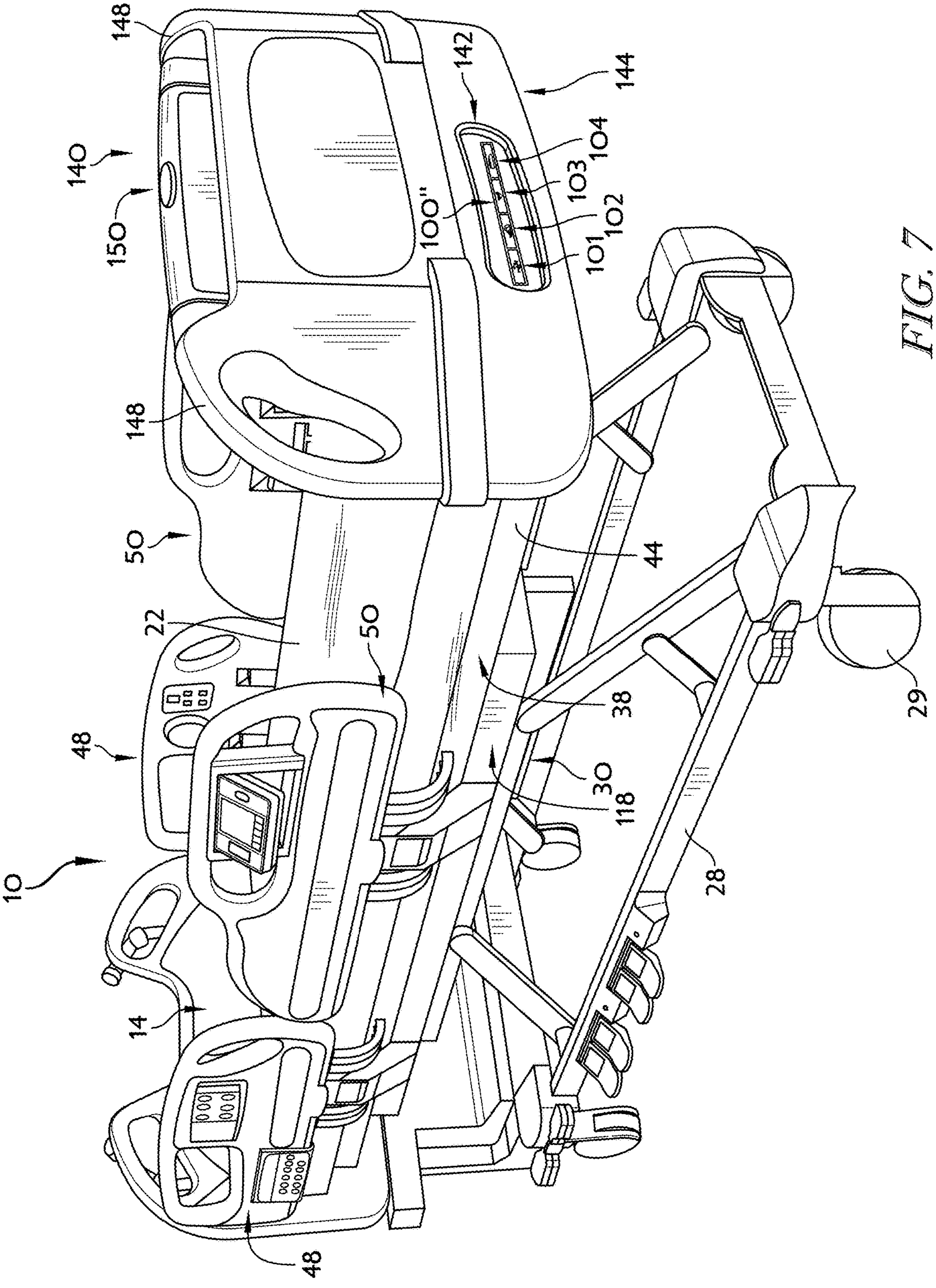
FIG. 7 is a perspective view showing the footboard of FIG. 6 attached to the upper frame of a hospital bed and showing the alert light assembly being visible in the opening at the lower end of the footboard.

In the example of FIG. 4, the bottom 98' of footboard 12' is situated above frame member 110 when footboard 12' is coupled to upper frame assembly 30 of bed 10. In some embodiments, bottom 98' rests upon or abuts top wall 112 of frame member 110. Thus, footboard 12' does not require any opening through which to see alert light assembly 100" when footboard 12' is attached to bed 10. Referring to FIG. 6, an alternative footboard 140 has a horizontally extending, oval-shaped opening 142 formed in a main body 146 of footboard adjacent to a lower end or bottom 144 of footboard 140. Similar to footboards 12, 12', main body 146 of footboard 140 is formed to include a pair of grip handles 148 at its upper end or top 150. Opening 142 is sized so that alert light assembly 100" is visible through opening 142 when footboard 140 is coupled to bed 10 as shown in FIG. 7. In some embodiments, such as the illustrative embodiment of FIGS. 6 and 7, a transparent or clear lens 152 is mounted within opening 142, such as by the use of adhesive between lens 152 and a lip 154 provided at the periphery of opening 142. Lens 152 protects alert light assembly 100" from impact when footboard 140 is coupled to bed 10. If bed 10 does not include alert light assembly 100", then an opaque blank 156 is mounted within opening 142 in lieu of lens 152 as suggested in FIG. 6.

Figure 8:
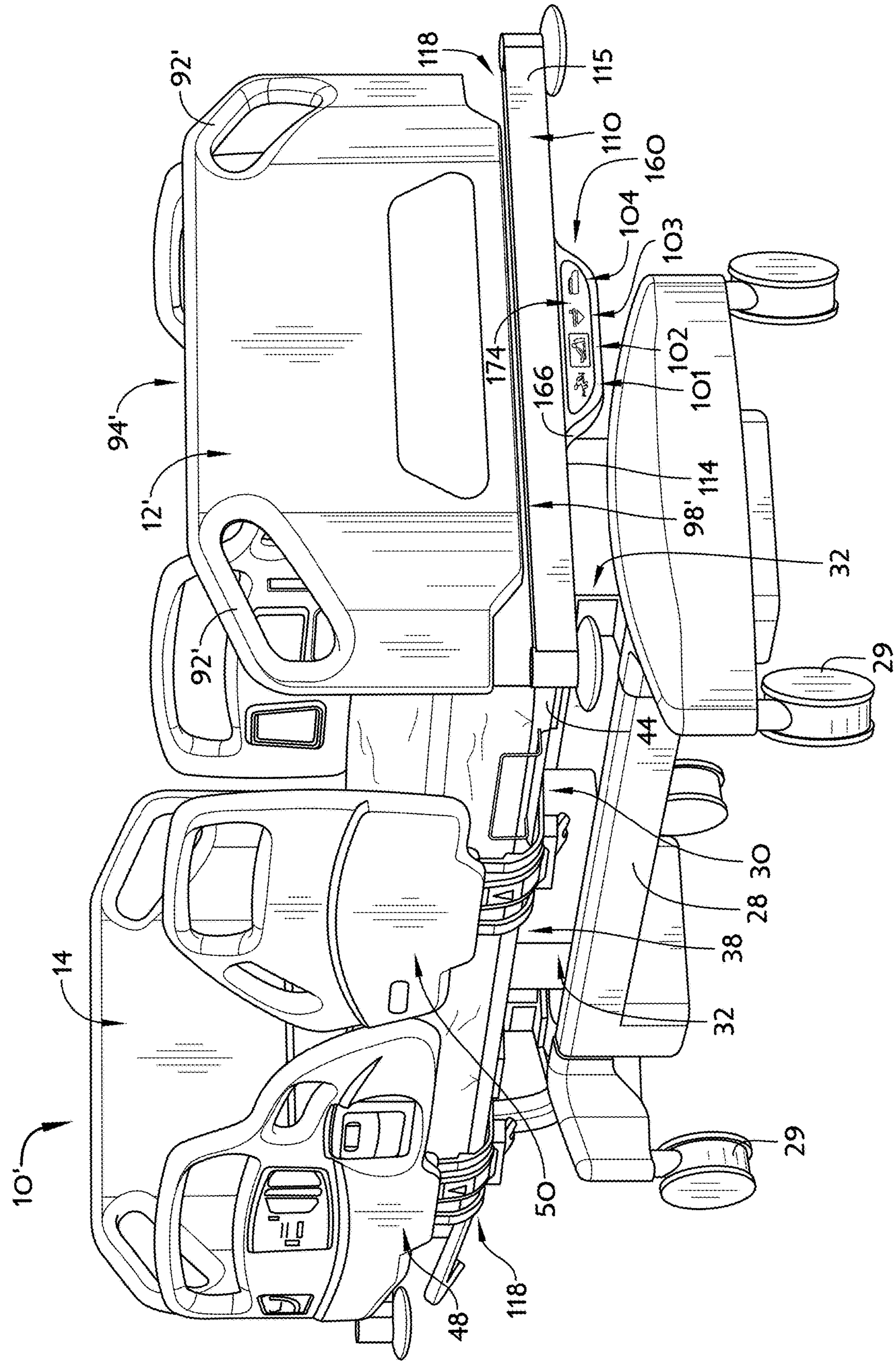
FIG. 8 is a perspective view of an alternative hospital bed showing an alert light module attached to a central region of a lateral frame member of the hospital bed and handing downwardly therefrom.

Referring now to FIG. 8, bed 10' includes an alternative alert light module 160 that is coupled to lateral frame member 110 and that hangs downwardly from bottom surface 114 of frame member 110. Similar to alert light assemblies 100, 100', 100" discussed above, module 160 has four zones 101, 102, 103, 104 that are illuminated to convey information regarding the status of the associated monitored bed function. Module 160 is located about midway between the opposite sides 118 of upper frame 30 of bed 10' and occupies about one third of the distance between the ends of frame member 110. Thus, module 160 is on the order of about ten inches to twelve inches in length in the lateral dimension of bed 10'. In other embodiments, module 160 is longer than or shorter than these lengths. However, module 160 is still sufficiently large that zones 101, 102, 103, 104, when illuminated, can be seen and understood by a caregiver at a distance of about ten to twenty feet, or more, from module 160 as was the case with assemblies 100, 100', 100".

Figure 9:
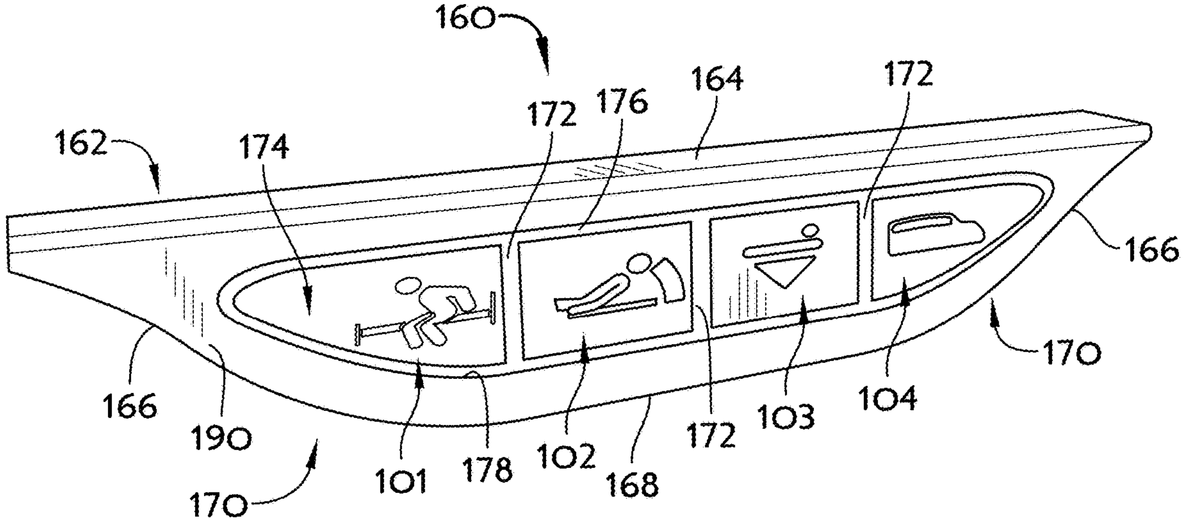
FIG. 9 is an enlarged perspective view of the alert light module of FIG. 8, showing icons associated with four separate zones of the module.

Module 160 has a housing 162 with a planar top wall 164, sloped side walls 166, and a bottom wall 168 that is generally parallel with top wall 164 as shown in FIG. 9. Side walls 166 blend with bottom wall 168 at rounded bottom corner regions 170 of housing 162. In some embodiments, housing 162 is made from a sheet metal material but other materials of suitable strength, such as various plastics material, may be used to construct housing 162 if desired. If housing 162 is made of sheet metal material, then it is contemplated by this disclosure that housing 162 is painted a color that is the same as the color that upper frame assembly 30 is painted, although, this need not be the case. If a plastics material is used to construct housing 162, then the plastic material is chosen to be a color that matches the color of the paint on upper frame assembly 30, but again, this need not be the case.

Housing 160 is coupled to bottom surface 114 of frame member 110 with suitable fasteners such as screws, bolts, or rivets, for example. Thus, in some embodiments, top wall 164 of housing 160 and the bottom wall of frame member 110 both include holes (not shown) that receive such fasteners. Top wall 164 of module 160 and the bottom wall of frame member 110 also both include openings (not shown) through which conductors are routed from the light emitters or associated circuitry of module 160 into the interior region of frame member 110.

Housing 162 includes a set of internal partition walls 172, the end edges of which are shown in FIG. 9. Partition walls 172 extend between top wall 164 and bottom wall 168 of housing 162 and each of partition walls 172 is generally vertically oriented. Module 160 includes a lens 174 that bridges across all of zones 101, 102, 103, 104 and that adheres to, or otherwise couples to, an internal lip 176 that is formed around a periphery of an opening 178 of a front wall 190 of housing 162. Lens 176 abuts end edges of partition walls 172 and, in some embodiments, is adhered to the end edges of partition walls 172.

Behind the portions of lens 174 of each of zones 101, 102, 103, 104 are one or more light emitters, such as green and amber LED's 78, 80 shown diagrammatically in FIG. 27. A circuit board is also included inside housing 162 of module 160 in some embodiments. An example of such a circuit board is shown herein in connection with FIG. 19 which is discussed below. The discussion above regarding FIG. 27 is equally applicable to module 160. Thus, bed 10' has sensors 70, 88, 91, 93 and control circuitry 72 for example. Zones 101, 102, 103, 104 of module 160 are illuminated green to indicate satisfactory statuses of the monitored conditions of bed 10' with which sensors 70, 88, 91, 93 are associated and zones 101, 102, 103, 104 are illuminated a color other than green (e.g., amber, orange, red) to indicate unsatisfactory statuses of the monitored conditions of bed 10'.

Lens 174 includes indicia for each of zones 101, 102, 103, 104. The indicia of lens 174 are the same as described above in connection with alert assemblies 100, 100', 100". In some embodiments, lens 174 is made of multiple layers of polypropylene with one of the subsurface layers having the indicia printed thereon. Thus, the indicia of lens 174 are subsurface indicia. The indicia of lenses 122 and regions 126 discussed above may be formed similarly in some embodiments. That is, lenses 122 and regions 126 may also comprise multiple layers of polypropylene material if desired.

Figure 10:
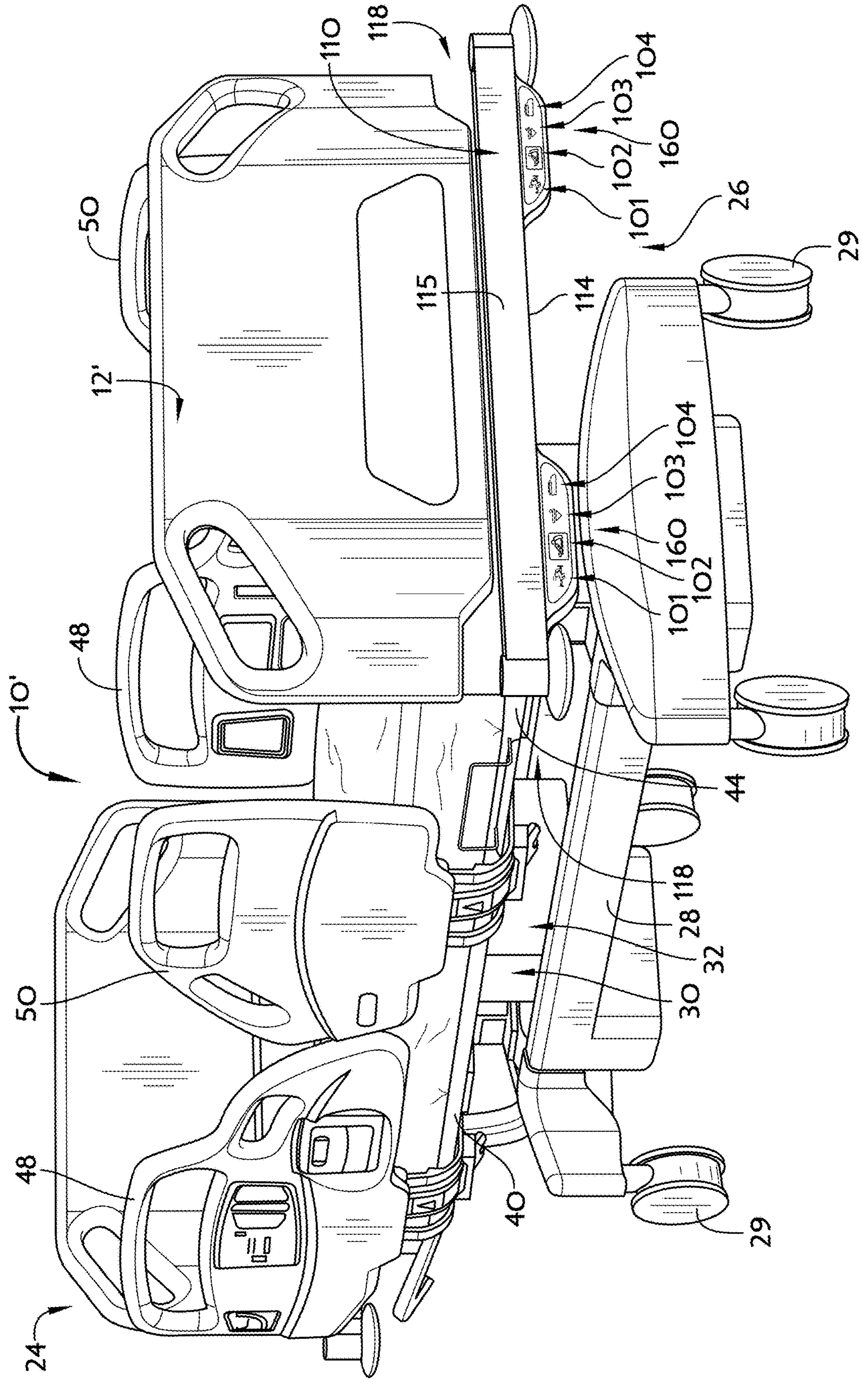
FIG. 10 is a perspective view, similar to FIG. 8, but showing two alert light modules, each alert light module being attached to an opposite end region of the lateral frame member and hanging downwardly therefrom.

Referring now to FIG. 10, bed 10' has two alert light modules 160 mounted to bottom surface 114 at opposite end regions of lateral frame member 110. Thus, in the embodiment of FIG. 10, the two alert light modules 160, together, occupy about two thirds of the distance between opposite sides 118 of upper frame 30. By providing two modules 160 on frame member 110 of foot section 44 of upper frame assembly 30, the visibility of illuminated zones 101, 102, 103, 104 is increased. Circuitry 72 of bed 10' controls the illumination of zones 101, 102, 103, 104 of the two modules 160 in an identical manner. For example, in FIG. 10, a box is drawn on both modules 160 around the icon associated with zone 102 which is related to the HOB feature of bed 10' to indicate that an alert condition has been detected by circuitry 72 in connection with the angle of the head section 40 of bed 10' as sensed by sensor 88.

Figure 11:
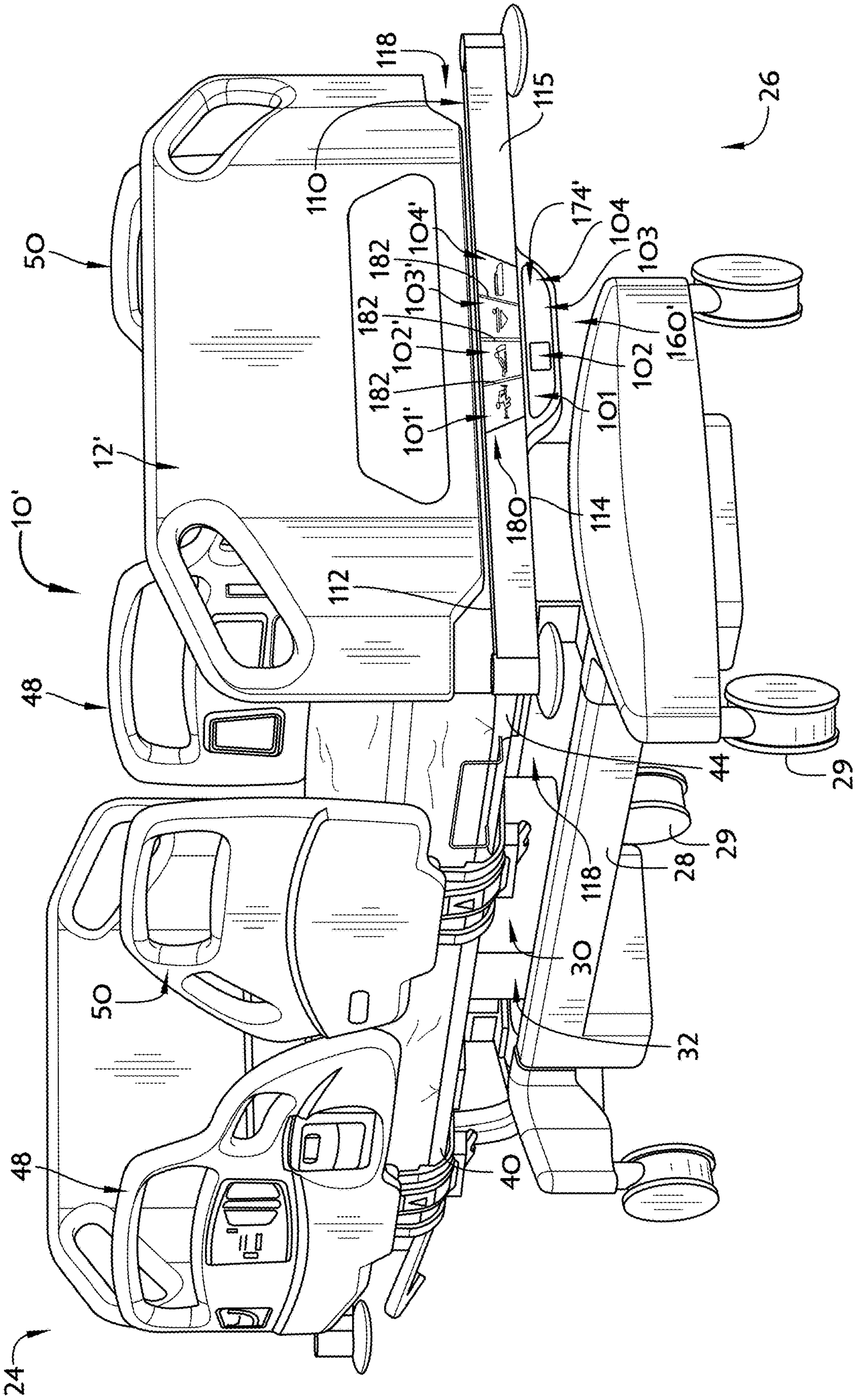
FIG. 11 is a perspective view, similar to FIG. 8, but showing a label on the central region of the lateral frame member above the alert light module, the label having indicia to indicate bed features or functions associated with each of the alert lights of the alert light module rather than having the indicia on the lens or lenses of the alert light module.

Referring now to FIG. 11, a variant embodiment of bed 10' is shown with an alternative alert light module 160' mounted to bottom surface 114 of frame member 110 of foot section 44. Module 160' is located about midway between opposite sides 118 of upper frame assembly 30 and occupies about one third of the distance between the ends of frame member 110. Module 160' has a lens 174' that is devoid of indicia. Otherwise, module 160' is the same as module 160. Thus, except for the discussion above of the indicia of lens 174 of module 160, the discussion above of all other aspects of module 160 is equally applicable to module 160'.

Bed 10' has a sticker 180 adhered to vertical wall 115 of lateral frame member 110 directly above module 160' as shown in FIG. 11. Sticker 180 is divided into zones 101', 102', 103', 104' by spacer lines 182. Zones 101', 102', 103', 104' are located vertically above the corresponding zones 101, 102, 103, 104 of module 160'. Each of zones 101', 102', 103', 104' of sticker 180 includes the same indicia that are provided on lens 174 of module 160. However, the vertical height of sticker 180 is larger than the vertical height of lens 174 and so the indicia are larger on sticker 180 above module 160' than are the indicia of lens 174 of module 160. Thus, the enlarged size of the indicia on sticker 180 above module 160' makes it easier for a caregiver to identify the particular feature of bed 10' that has an alert status of unsatisfactory as indicated by the illumination of one or more of zones 101, 102, 103, 104 of module 160' a color other than green.

In the illustrative example of FIG. 11, a box is drawn on module 160' around the area of lens 174' associated with zone 102 which is related to the HOB feature of bed 10' to indicate that an alert condition has been detected by circuitry 72 in connection with the angle of the head section 40 of bed 10' as sensed by sensor 88. In some embodiments, sticker 180 is constructed of 7 mil. Polypropylene, the indicia are printed subsurface indicia, and the back surface of sticker 180 is coated with model no. 300LSE adhesive available from 3M Company.

With regard to alert light assemblies 100, 100', 100" and alert light modules 160, 160', in some embodiments, multiple green LED's 78 and multiple amber LED's 80 (or red LED's or orange LED's, etc.) are provided in each of zones 101, 102, 103, 104. Having multiple LED's 78, 80 in each zone 101, 102, 103, 104 is desirable, for example, when assemblies 100, 100', 100" and modules 160, 160' are larger and extend two thirds or more of the distance between lateral sides 118 of upper frame assembly 30. See U.S. Patent Application Publication No. 2010/0073168 A1 which discusses the use of multiple LED's as alert lights and which is hereby expressly incorporated by reference herein to the extent not inconsistent with the present disclosure which shall control as to any inconsistencies.

Figure 12:
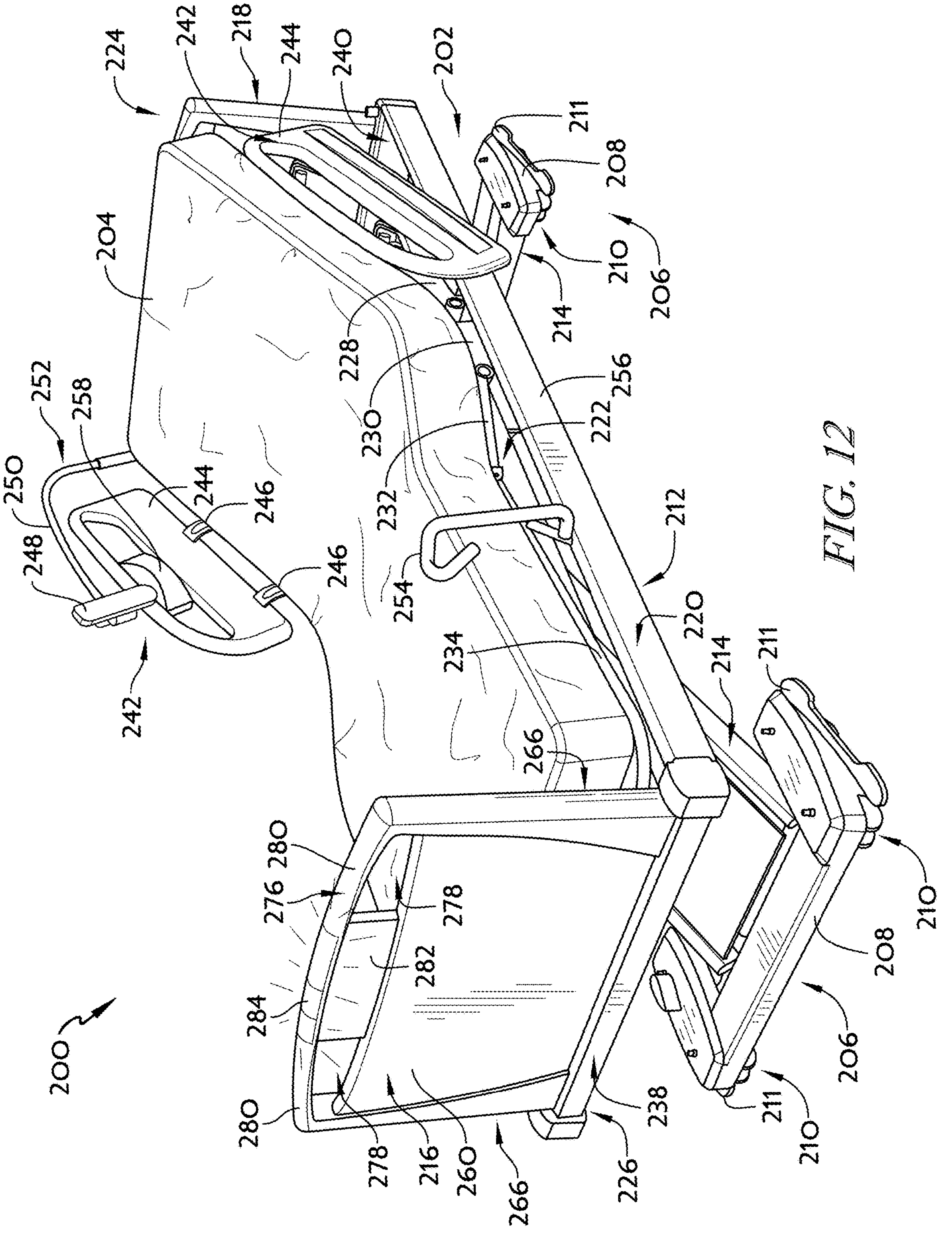
FIG. 12 is a perspective view of an alternative hospital bed showing a footboard at a foot end of a bed frame having an illuminated light emitting region at the top of the footboard to indicate the status of multiple features of the hospital bed.

Referring now to FIG. 12, an alternative hospital bed 200 includes a bed frame 202 that supports a surface or mattress 204. Frame 202 of bed 200 includes a base frame 206 which comprises a pair of longitudinally spaced apart base frame sections 208. A set of four caster assemblies 210, not all of which can be seen in FIG. 12, is mounted to each base frame section 208. Caster assemblies 210 support bed 200 on the underlying floor. Foot pedals 211 are coupled to base frame sections 208 and are used to brake and release the caster assemblies 210. Frame 202 of bed 200 also includes an upper frame assembly 212 and a lift system 214 coupling upper frame assembly 212 to base frame sections 208. Lift system 214 is operable to raise, lower, and tilt upper frame assembly 212 relative to the underlying floor.

Bed 200 has a head end 224 and a foot end 226 that is spaced from head end 224 in a longitudinal dimension of bed 200. Hospital bed 200 further includes a footboard 216 at the foot end 226 and a headboard 218 at the head end 224. Upper frame assembly 212 includes a substantially rectangular upper frame 220 and an articulated mattress support deck 222 which, in turn, includes a head section 228, a seat section 230, a thigh section 232, and a foot section 234 as shown in FIG. 12. Footboard 216 is coupled to a first lateral frame member 238 of upper frame 220 and headboard 218 is coupled to a second lateral frame member 240 of upper frame 220.

Illustrative hospital bed 200 has a pair of siderail assemblies 242 (sometimes referred to as siderails 242) coupled to head section 228 as shown in FIG. 12. Siderails 242 are spaced from each other in a lateral dimension of bed 200. Each of the siderails 242 is movable between a raised position, shown in FIG. 12 with regard to the siderail 242 on the far side of bed 200, and a lowered position, shown in FIG. 12 with regard to the siderail 242 on the near side of bed 200. Each siderail 242 includes a barrier panel 244 and a linkage 246. Each linkage 246 interconnects the respective barrier panel 244 and head section 228 and each linkage 246 is configured to guide the barrier panel 244 during movement of siderails 242 between the respective raised and lowered positions. Barrier panel 244 is maintained by the linkage 246 in a substantially vertical orientation during movement of siderails 242 between the respective raised and lowered positions.

Bed 200 also includes a hand held bed controller pendant 248 supported at the distal end of a flexible arm portion 250 of an arm assembly 252 as shown in FIG. 12. Arm assembly is coupled to a head end corner region of head section 228 of deck 222. An egress handle 254 is also provided on bed 200 and is coupled to a longitudinal frame member 256 of upper frame 220. Egress handle 254 is moveable between a use position extending upwardly from frame member 256 as shown in FIG. 12 and a storage position (not shown) tucked adjacent frame member 256. Handle 254 is gripped by a patient while getting onto or getting off of mattress 204. A caregiver control pod 258 is removably attached to one of siderails 242. Thus, pendant 248 is typically used by a patient to control features of bed 200 and pod 258 is used by a caregiver to control features of bed 200. Pendant 248 and pod 258 each include user inputs such as one or more buttons, switches, touch screens, and the like that receive user inputs from the patient or caregiver as the case may be.

Sections 228, 232, 234 of deck 222 are each movable relative to upper frame 220. For example, head section 228 pivotably raises and lowers relative to seat section 230 whereas foot section 234 pivotably raises and lowers relative to thigh section 232. Additionally, thigh section 232 articulates relative to seat section 230. In the illustrative embodiment, seat section 230 is fixed in position with respect to upper frame 220. In other embodiments, seat section 230 also moves relative to upper frame 220, such as by pivoting and/or translating.

Bed 200 includes one or more motors or actuators, which in some embodiments, comprise linear actuators with electric motors to move the various sections 228, 232, 234 relative to upper frame 220 and to operate lift system 214 to raise, lower, and tilt upper frame assembly 212 relative to base frame 206. As mentioned above in connection with bed 10, these actuators are well-known in the hospital bed art and thus, are not illustrated herein. Alternative actuators or motors contemplated by this disclosure include hydraulic cylinders and pneumatic cylinders, for example.

Figure 13:
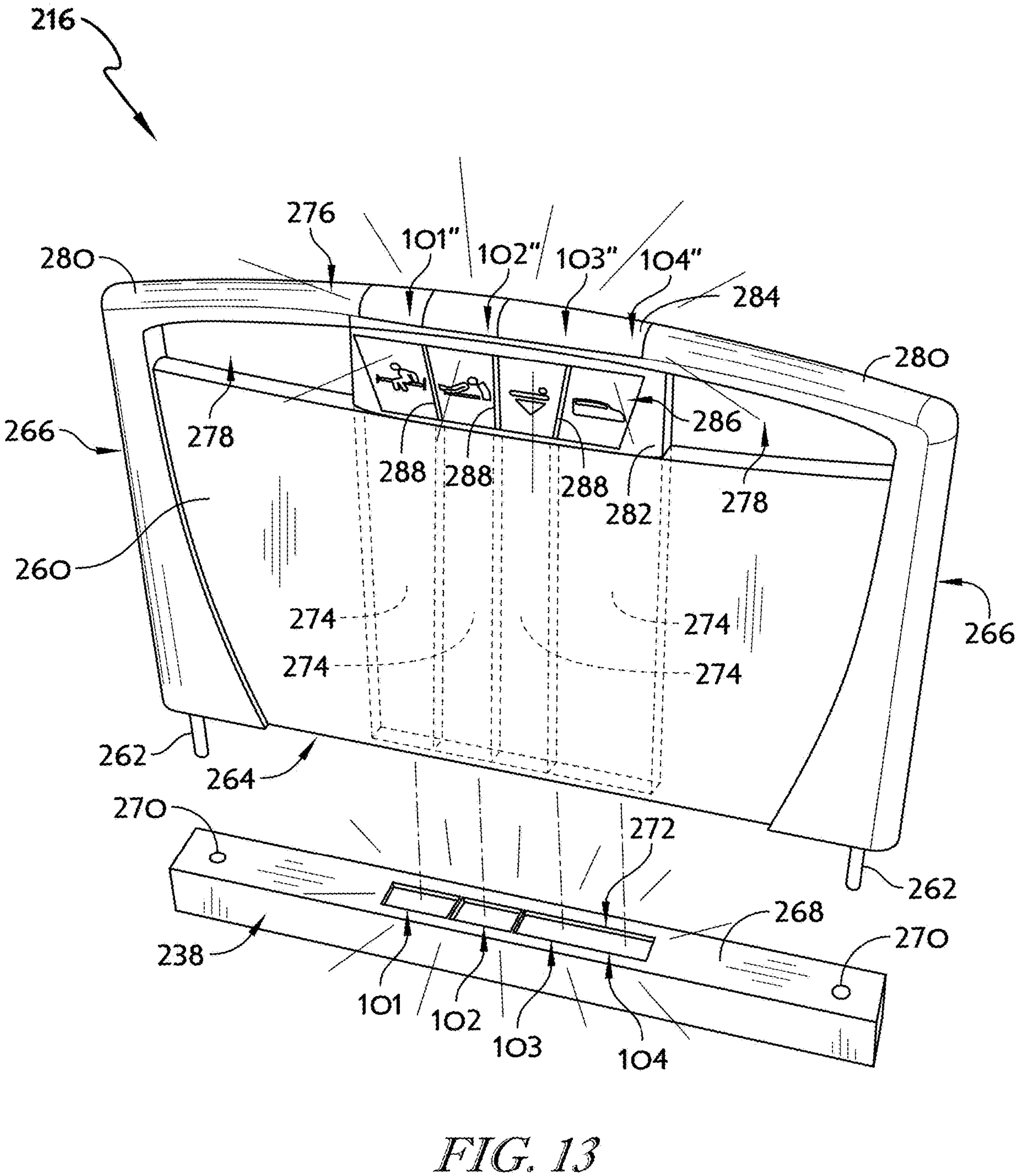
FIG. 13 is a perspective exploded view showing the footboard exploded away from a lateral frame member of the bed frame, a set of alert lights emitting light upwardly from the lateral frame member, and a set of light pipes (in dotted) overlying the set of alert lights and located internally of the footboard.

Referring now to FIG. 13, siderail 216 includes a main body 260 and a pair of posts 262 extending downwardly from a bottom edge 264 of main body 260 with each post 262 being located adjacent a respective opposite side 266 of main body 260. Lateral frame member 238 has a top wall 268 formed with apertures 270 that open to sockets (not shown) provided in the interior region of frame member 238. When footboard 216 is coupled to bed 200, posts 262 extend through respective apertures 270 and are received by the sockets of frame member 238. The upper wall 268 of frame member 238 also is formed to include an elongated opening 272 which, in the illustrative example, is rectangular in shape.

A set of light emitters, such as the LED's 78, 80 of FIG. 27, are situated in the interior region of frame member 238 and are grouped to form four zones 101, 102, 103, 104 of illumination at opening 272. The light emitters in the interior region of frame member 238 are operated to shine green light upwardly out of opening 272 to indicate a satisfactory status of the associated monitored bed condition and the light emitters in the interior region of frame member 238 are operated to shine light of a color other than green (e.g., red, orange, or amber) upwardly out of opening 272 to indicate an unsatisfactory status of the associated monitored bed condition. In some embodiments, partition walls (not shown) are provided in the interior region to separate zones 101, 102, 103, 104 so that light from one zone doesn't bleed over into an adjacent zone within the interior region of frame member 238.

Footboard 216 has a set of light pipes 274 situated in the interior region of main body 260 as shown in FIG. 13 (in phantom). Each light pipe 274 is located vertically above a respective one of zones 101, 102, 103, 104 of opening 272. Thus, there are four light pipes 274 in the illustrative example. A bottom end of each light pipe 274 is exposed at the bottom edge 264 of main body 260 of footboard 216. Thus, bottom edge 264 of main body 260 of footboard 216 is formed to include an opening through which the bottom ends of light pipes 274 are exposed. Light pipes 274 are made of a transparent material, such as acrylic. The light emitted upwardly from zones 101, 102, 103, 104 of opening 272 enters by the bottom end of a respective light pipe 274 and is guided upwardly by the light pipe 274.

Main body 260 of footboard 216 has a crowned or rounded upper edge 276. Adjacent upper edge 276 is a pair of relatively large openings 278 with each opening 278 being adjacent a respective side 266 of main body 260. Portions of upper edge 276 above each opening 278 serve as grip handles 280 which a caregiver is able to grasp to maneuver bed 200 over the floor when footboard 216 is coupled to frame member 238 of upper frame 220. Main body 260 includes a bridging portion 282 situated laterally between openings 278 as shown in FIGS. 12 and 13. Footboard 216 has a translucent lens 284 which is situated above bridging portion 282 and which is situated laterally between grip handles 280 at the top edge 276 of main body 260. Lens 284 is crowned or rounded in the same manner as upper edge 276 such that the tops of handles 280 and lens 284 form a contiguous rounded surface. Lens 284 is held in place with suitable fasteners or via adhesive, such as glue.

Light pipes 274 each extend from bottom edge 264 of main body 260 upwardly through bridging portion 282. Furthermore, light pipes 274 each terminate at an upper end beneath respective zones 101", 102", 103", 104" of lens 284. Zones 101", 102", 103", 104" correspond to respective zones 101, 102, 103, 104 of opening 272 of lateral frame member 238. Thus, the light emitted upwardly from opening 272 and guided upwardly by light pipes 274 through the interior region of main body 260 of footboard 216 is emitted through lens 284 at the upper edge 276 of main body 260. In some embodiments, lens 284 is made of an injection molded polypropylene material. In some embodiments, main body 260 of footboard 216 is made of a blow molded or injection molded plastics material.

A label 286 is adhered to an outer surface of bridging portion 282 as shown in FIG. 13. Label 286 is on the surface of footboard 216 that faces away from mattress 204. Label 286 has a set of spacer lines 288 which divides label 286 into four areas, each of which contains a respective indicia or graphical icon, and each of which is just beneath a respective one of zones 101", 102", 103", 104". The indicia on label 286 are the same as those of the preceding examples. Thus, bed 200 includes sensors 70, 88, 91, 93 and control circuitry 72 similar to that of bed 10 shown diagrammatically in FIG. 27. Accordingly, the discussion above regarding the various aspects of beds 10, 10' that are monitored is equally applicable to bed 200. In an alternative embodiment of bed 200, label 286 is omitted and indicia is provided on or within lens 284 in a manner similar to that described in connection with lenses 122, 174, for example. The light emitted from each of zones 101", 102", 103", 104" of lens 284 is visible from a distance of ten to twenty feet or more. Thus, a caregiver is able to determine the status of the monitored bed conditions from a hallway just like in the preceding examples.

Figure 14:
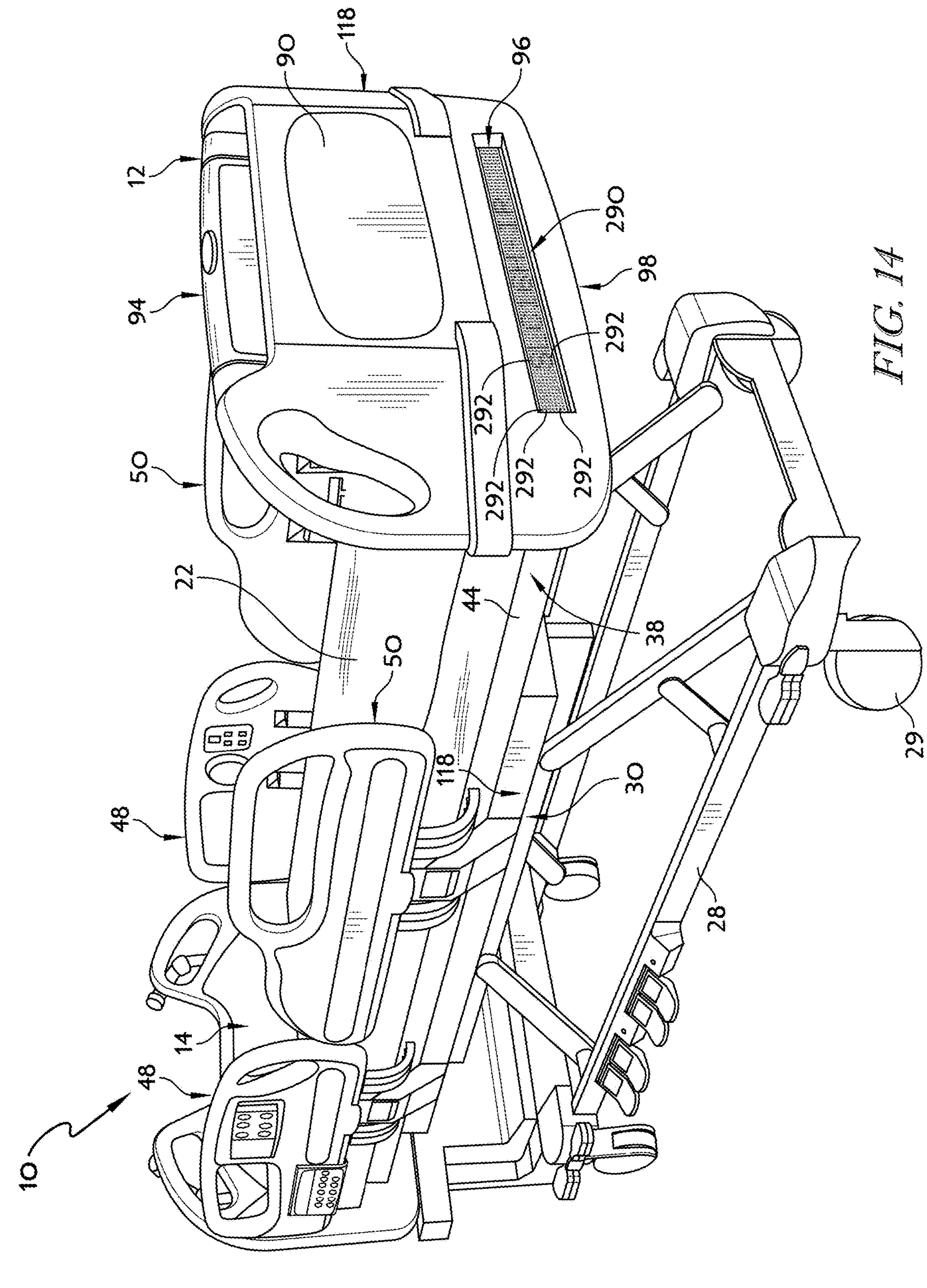
FIG. 14 is a perspective view of another alternative hospital bed, similar to FIG. 8, showing an electronic LED display visible through an elongated horizontal opening formed in a lower region of the footboard.
Figure 15:
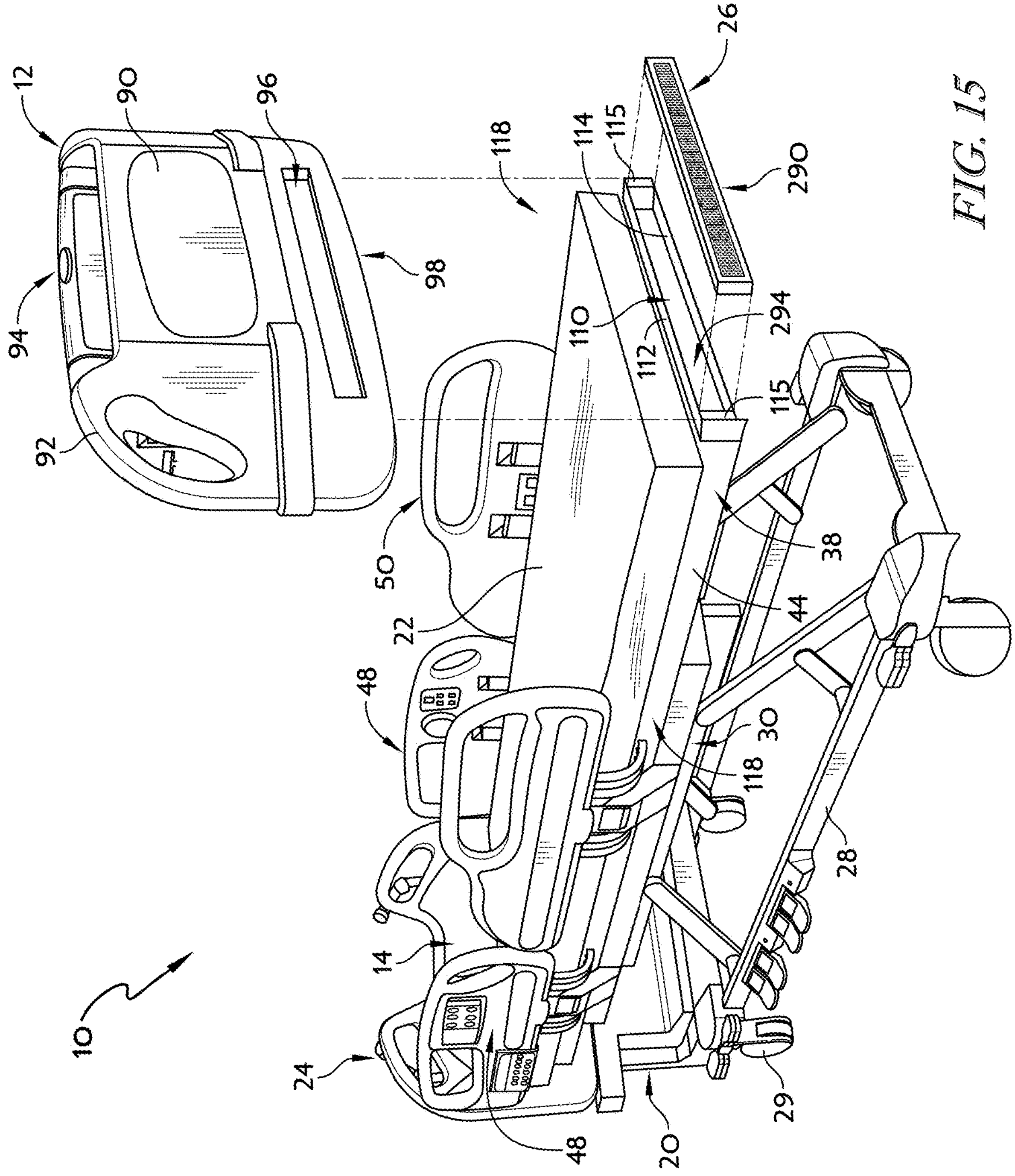
FIG. 15 is a perspective view of the hospital bed of FIG. 14 showing the footboard and the electronic LED display exploded away from a lateral frame member of the upper frame of the hospital bed.

Referring now to FIGS. 14 and 15, another embodiment of bed 10 is shown. The bed 10 shown in FIGS. 14 and 15 has an electronic display 290 that is coupled to lateral frame member 110 of foot deck section 44 in lieu of alert light assemblies 100, 100', 100" or alert light module 160. Electronic display 290 is visible through opening 96 at the lower end region of footboard 12. In the illustrative example, electronic display 290 has an array of LED's 292 arranged in rows and columns. The LED's are illuminated to form alphanumeric messages that can be read by a caregiver from a distance of about ten to about twenty feet or more.

The messages shown on electronic display 290 may relate to any aspect of bed 10 at the option of the bed designer. However, it is contemplated that electronic display 290 will, at appropriate times, display messages that relate to alert conditions of bed 10. Thus, control circuitry 72 of bed 10 is programmed to signal display 290 to light up the appropriate LED's 292 to display alert messages related to conditions sensed by sensors 70, 88, 91, 92 of bed 10. Examples of such messages include the following: "Alert-Siderail down," "Alert-HOB Angle," "Alert-Bed Not Low," "Alert-Brake Not Set," "Alert-PPM," "Alert-Bed Exit." These sorts of messages may flash on display 290 or may scroll on display 290 or both. It is contemplated by this disclosure that messages relating to multiple alert conditions are scrolled serially or flashed one after the other on display 290.

In some embodiments, bed 10 connects to a network of the healthcare facility and receives information that results in the display of messages on display 290. Such information may be transmitted from, for example, a computer device of a nurse call system, an electronic medical records (EMR) system, or an admission/discharge/transfer (ADT) system. Thus, in some embodiments, the messages shown on display 290 include messages relating to the patient associated with bed 10, such as displaying the patient's name or physiological data like vital signs. It is also contemplated by this disclosure that messages directed to caregivers are displayed on electronic display 290. For example, messages reminding caregivers to wash their hands or providing information of a general nature such as lunch room hours are a couple of possibilities of such messages.

In the illustrative embodiment, electronic display 290 is sufficiently large to occupy more than half the distance between the laterally spaced apart sides 118 of the upper frame 30 and to occupy a space between top 112 and bottom 114 of lateral frame member 110 without extending beyond top 112 and bottom 114. In fact, display 290 spans almost the entire length of lateral frame member 110 as shown best in FIG. 15. Thus, a vast majority of the front wall 115 of lateral frame member 110 is cut away to accommodate display 290 within an interior region 294 of frame member 110 as also shown in FIG. 15. In the illustrative embodiment of FIGS. 14 and 15, electronic display is a model no. SLC16H-IR electronic available from Grandwell Industries Inc. which has a vertical height of about 4 inches, a horizontal length of about 26 inches, and a horizontal thickness of about 1.3 inches. In some embodiments, electronic display 290 is mounted at a slight upward angle to facilitate readability when the foot section 44 of be 10 is moved to auto contour and chair positions, which are known positions of deck 38 in the hospital bed field.

Figure 16:
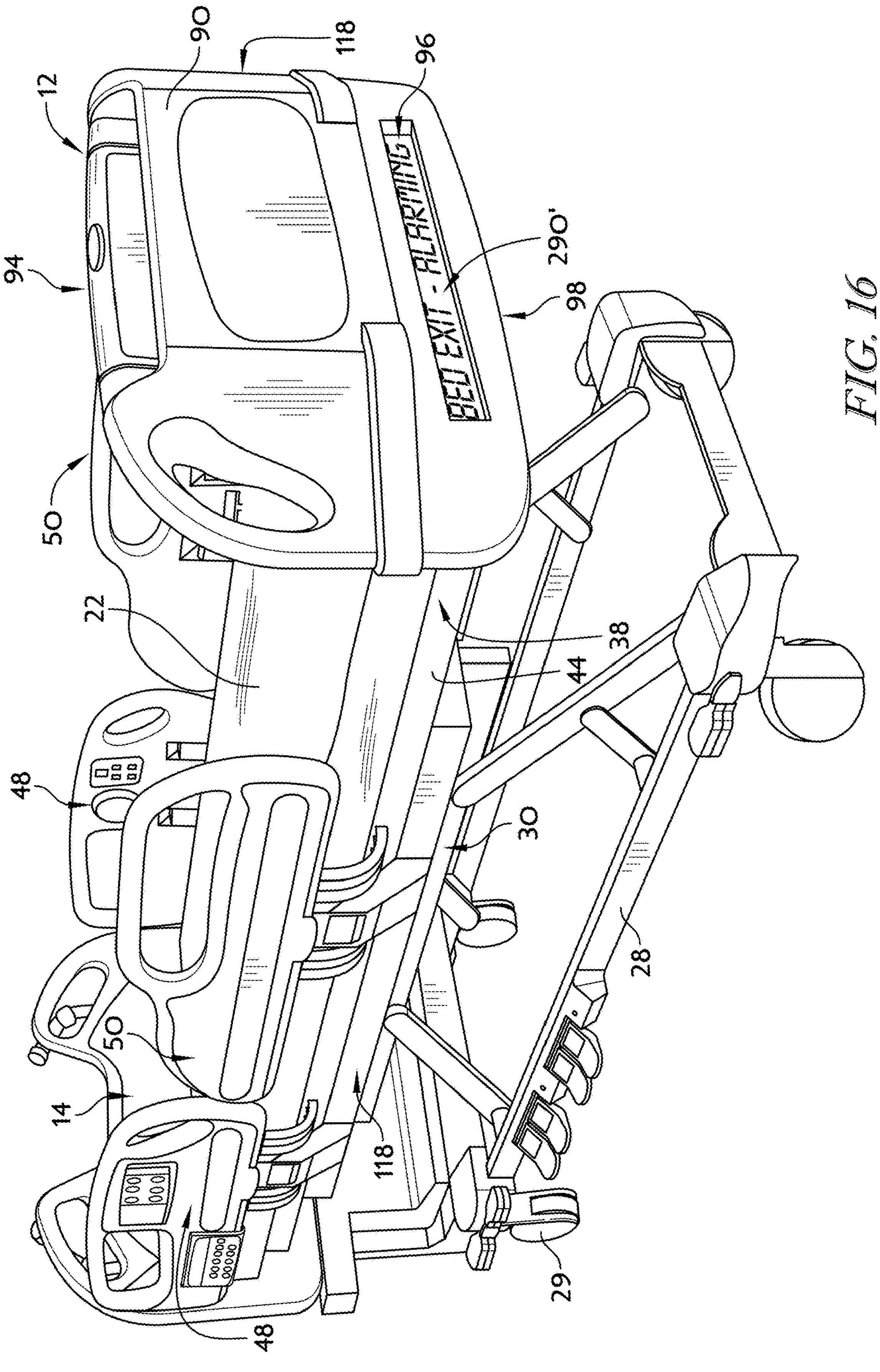
FIG. 16 is a perspective view of another alternative hospital bed, similar to FIG. 14, showing an electronic LCD display visible through an elongated horizontal opening formed in a lower region of the footboard.
Figure 17:
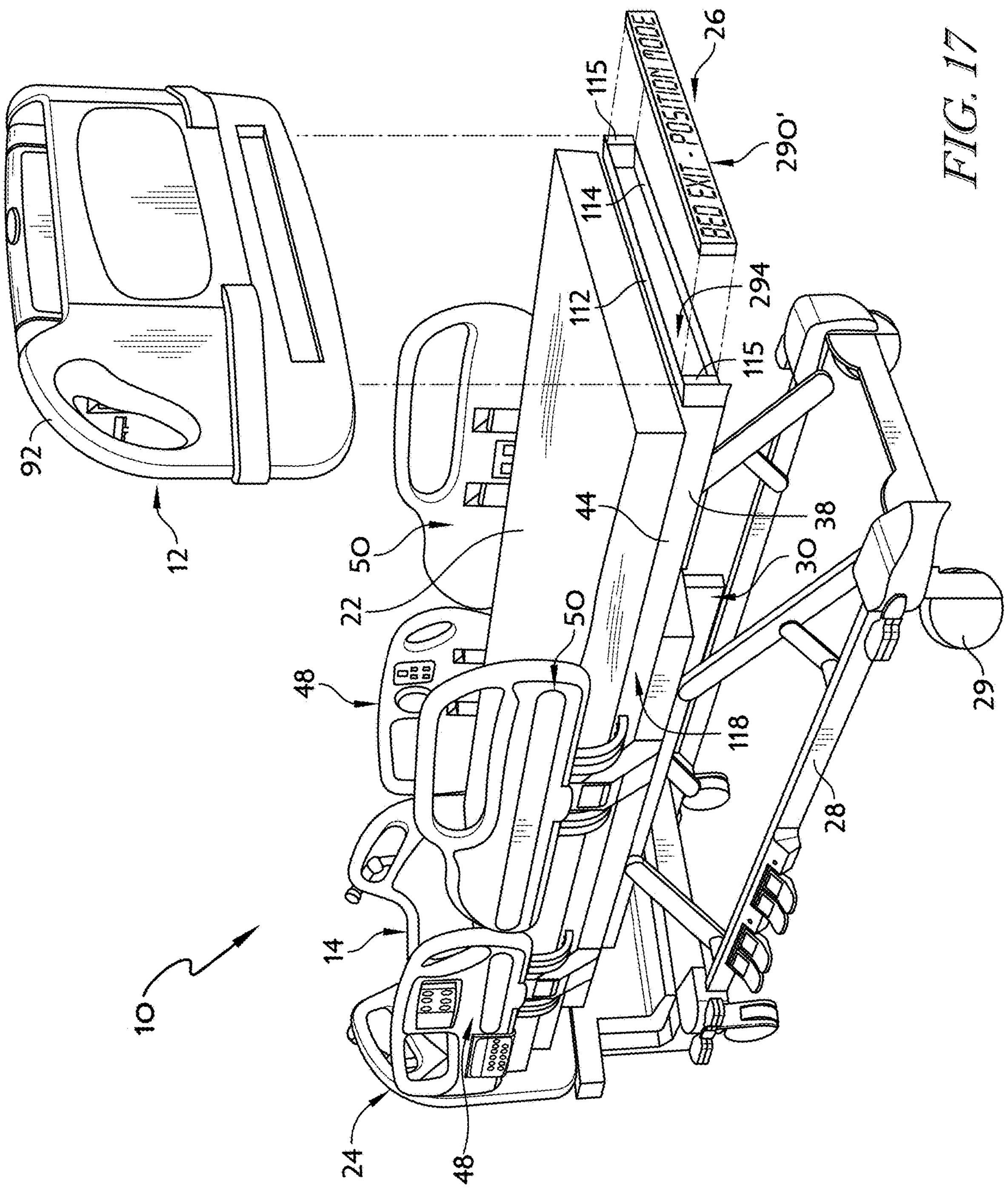
FIG. 17 is a perspective view of the hospital bed of FIG. 16 showing the footboard and the electronic LCD display exploded away from a lateral frame member of the upper frame of the hospital bed.

Referring now to FIGS. 16 and 17, an alternative electronic display 290', which comprise a liquid crystal display (LCD), is visible through opening 96 at the lower end region of footboard 12. The discussion above regarding the types of messages shown on display 290 and the manner of displaying the messages on display 290 is equally applicable to display 290'. Thus, messages are flashed or scrolled on display 290' in some embodiments. In the illustrative example of FIG. 16, electronic display 290' has the message "BED EXIT—ALARMING" shown thereon and, in the illustrative example of FIG. 17, electronic display 290' has the message "BED EXIT—POSITION MODE" shown thereon. In some embodiments, the background color on display 290' is green to indicate that no alert conditions are detected and the background color on display 290' is another color, such as amber, red or orange, to indicate that an alert condition is detected. Thus, the background color of display 290' is used in addition to the messages on display 290' to convey information regarding the status of bed 10. Display 290' is capable of displaying any sort of alphanumeric messages and graphical icons or indicia at the discretion of the bed designer. Display 290' is sufficiently large to be read by a caregiver from a distance of about ten to about twenty feet or more.

In the illustrative embodiment, electronic display 290' occupies more than half the distance between the laterally spaced apart sides 118 of the upper frame 30 and to occupy a space between top 112 and bottom 114 of lateral frame member 110 without extending beyond top 112 and bottom 114. In fact, display 290' spans almost the entire length of lateral frame member 110 as shown best in FIG. 17. Thus, a vast majority of the front wall 115 of lateral frame member 110 is cut away to accommodate display 290' within an interior region 294 of frame member 110 as also shown in FIG. 17. In the illustrative embodiment of FIGS. 16 and 17, electronic display 290' is sized similarly to display 290. Thus, display 290' has a vertical height of about 4 inches, a horizontal length of about 26 inches, and a horizontal thickness of about 1.3 inches. In some embodiments, electronic display 290' is mounted at a slight upward angle for the same reason as described above with regard to display 290.

Figure 18:
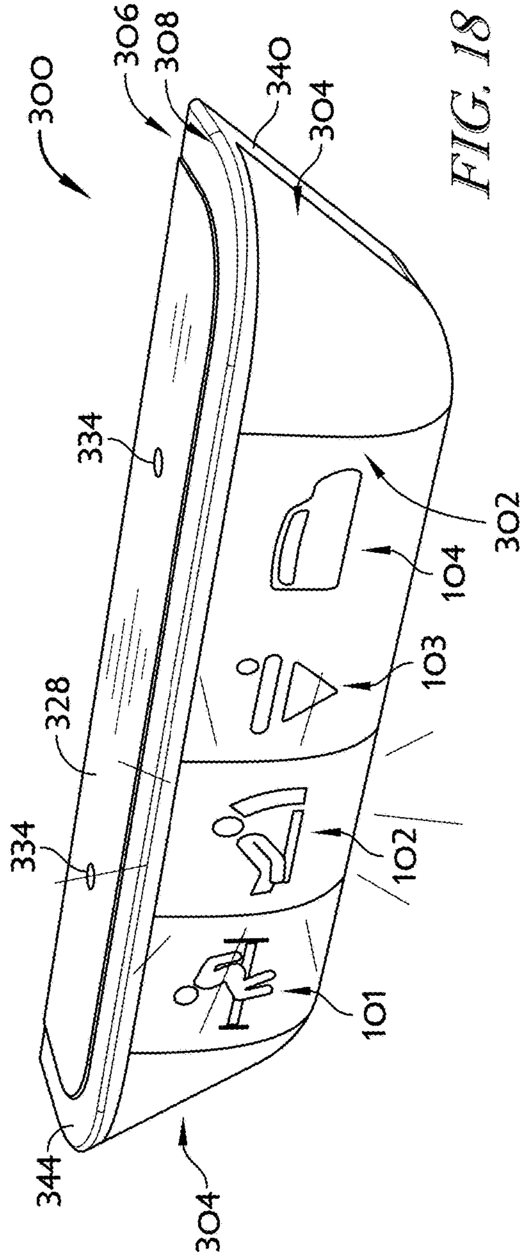
FIG. 18 is a front perspective view of an alternative alert light module, similar to the alert light module of FIG. 9, but having a single lens attached to a housing of the alert light module and bridging across multiple alert light zones.
Figure 19:
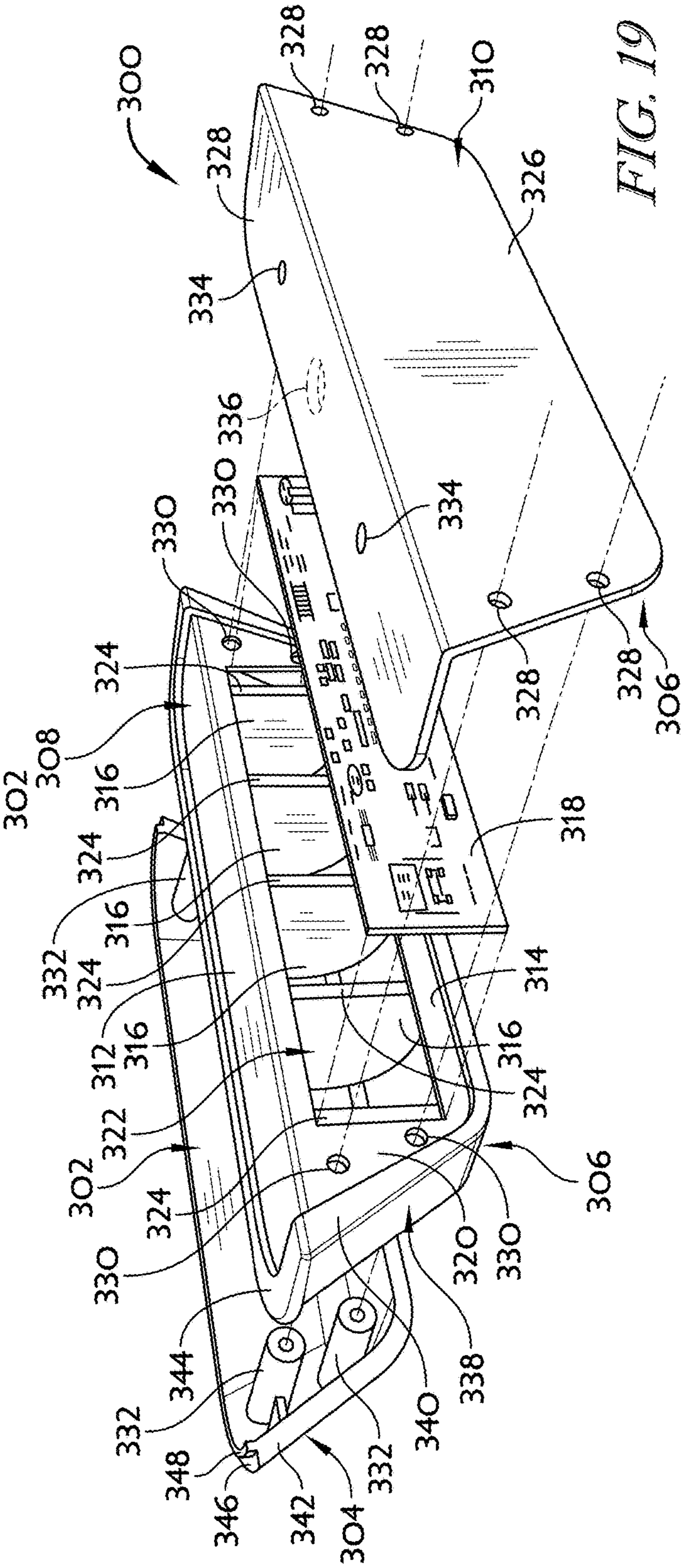
FIG. 19 is a rear exploded view of the alert light module of FIG. 18 showing the housing of the alert light module having a shell and a set of partition walls coupled to the shell, the single lens in front of the shell, the housing having a backing plate that attaches to a rear of the shell, an LED board being sandwiched between the backing plate and the shell, and a top wall extending from the backing plate above the shell and having apertures for fastening the alert light module to a bed frame.

Referring now to FIGS. 18 and 19, an alternative alert light module 300, which is similar to alert light modules 160, 160' discussed above, has a lens 302 that includes indicia associated with zones 101, 102, 103, 104 that correspond to monitored conditions of an associated bed. Thus, lens 302 is a single, unitary body that bridges across all of the multiple alert light zones 101, 102, 103, 104. Lens 302 has rounded ends 304 on the opposite sides of the front portion of lens 302 on which the indicia are provided. The indicia of zones 101, 102, 103, 104 of lens 302 are printed thereon.

A housing 306 of alert light module 300 includes a shell 308 and a backing plate 310 as shown best in FIG. 19. Shell 308 has a top wall 312, a bottom wall 314 and a set of partition walls 316 extending vertically between walls 312, 314. Partition walls 316 define pockets that receive LED's (not shown, but similar to LED's 78, 80 described above) which are mounted on a circuit board 318 of module 300. One or more LED driver IC chips are also mounted on circuit board 318 in some embodiments. A rear wall 320 of shell 308 has a rectangular opening 322 through which the LED's extend into the pockets defined between partition walls 316. Circuit board 318 is sized to fit into, and substantially fill, opening 322. Portions of the circuit board 318 between the groups of LED's associated with each of zones 101, 102, 103, 104 engage rear edges 324 of partition walls 316.

Backing plate 310 includes a vertical wall 326 and a top wall 328 as shown in FIG. 19. Rear wall 326 of backing plate 310 abuts rear wall 320 of shell 308 and is held in place by suitable fasteners (not shown) such as screws or bolts that pass through a first set of apertures 328 formed in wall 326 of plate 310, that past though a second set of apertures 330 formed in wall 320 of shell 30, and that thread into cylindrical bosses 332 of lens 302. Thus, circuit board 318 is sandwiched between wall 326 of plate 310 and shell 308. When lens 302 is being coupled to housing 306 with the fasteners, lens 302 is drawn into contact with the front edge of each partition wall 316. This prevents light emitted in one of zones 101, 102, 103, 104 of module 300 from bleeding into an adjacent zones 101, 102, 103, 104.

Top wall 328 of backing plate 310 extends from the wall 326 and overlies top wall 312 of shell 308. Top wall 328 is formed to include apertures 334 that are used to fasten alert light module 300 to bed frame 20 of bed 10, for example, with suitable fasteners (not shown) such as rivets, bolts or screws. In an alternative embodiment, top wall 328 is formed to include an aperture 336, shown in FIG. 19 (in phantom), which is located about midway between the opposite ends of plate 310. Aperture 336 receives a suitable fastener that permits module 300 to pivot or rotate relative to the frame member of frame 20 to which module 300 is attached. In some embodiments, plate 310 is made of sheet metal and shell 308 is made of a plastics material. Lens 302 is made of a translucent plastics material in some embodiments.

Rounded end walls 304 of lens 302 cover rounded end walls 338 of shell 308 when lens 302 and housing 306 are coupled together. Shell 308 has a U-shaped rear flange 340 that abuts a U-shaped rear edge 342 of lens 302 when lens 302 and housing 306 are coupled together. Shell 308 also has a U-shaped top flange 344 that abuts a U-shaped top edge 346 of lens 302 when lens 302 and housing 306 are coupled together. A bottom surface of flange 344 is formed to include a groove (not shown) that receives a U-shaped ridge 348 that projects upwardly with respect to edge 346 of lens 302. An additional opening or slot (not shown) is provided in backing plate 310 for conductors, such as a ribbon or cable of wires extending from circuit board 318, to pass through. The light emitters of zones 101, 102, 103, 104 of module 300 are illuminated in the same manner and under the same circumstances as modules 160, 160' discussed above.

Figure 20:
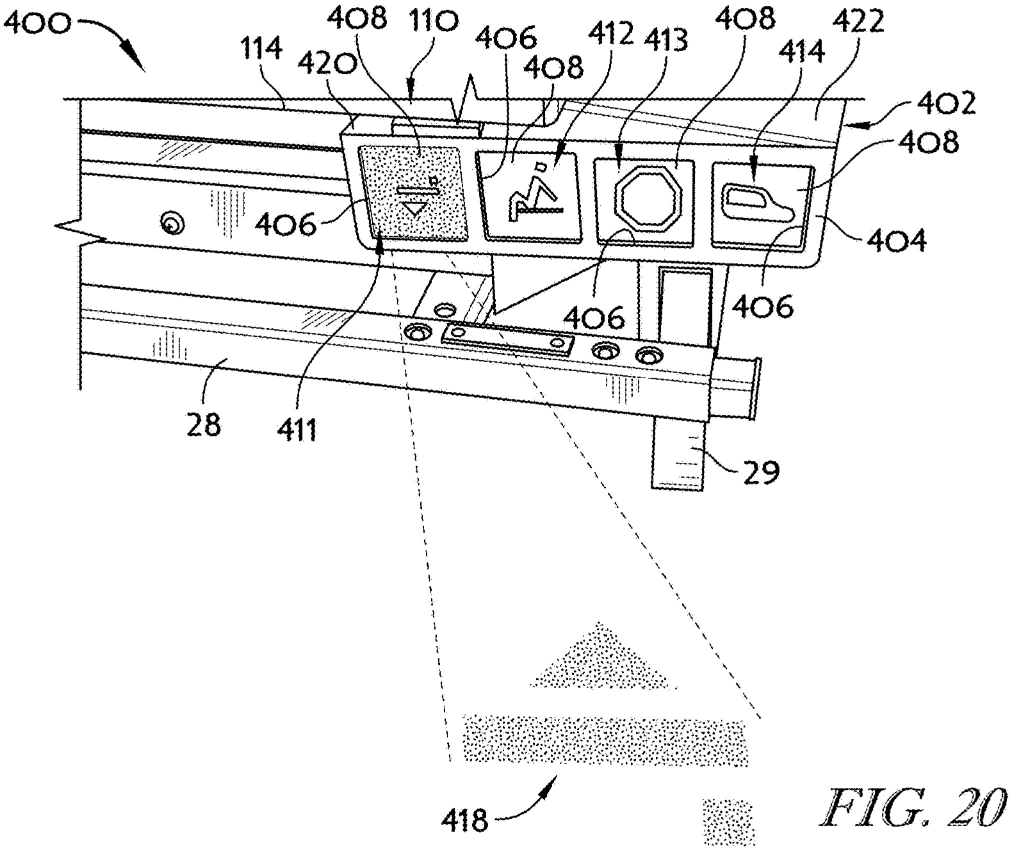
FIG. 20 is a perspective view of a portion of yet another alternative hospital bed showing an alternative alert light module attached to a frame of the hospital bed and projecting a shaped image onto a floor.

Referring now to FIGS. 19 and 20, another alternative alert light module 400 includes a housing 402 having a front wall 404 that is formed to include four square-shaped openings 406. Module 400 includes lenses 408 that extend across respective openings 406. Each lens 408 has indicia in the form of graphical icons that relate to monitored bed conditions. Thus, module 400 has four separate zones 411, 412, 413, 414 that are individually illuminated to convey information regarding respective alert conditions of the bed to which module 400 is coupled. In FIG. 20, portions of the bed that can be seen are denoted with reference numbers that correspond to like elements of bed 10.

The indicia of zone 411 is a bed not down icon. The indicia for zone 412 is a HOB angle icon. The indicia for zone 413 is a stop sign icon which indicates that the casters 29 of the bed are not braked. Thus, in the example of FIG. 21, the bed has one or more sensors to sense whether or not the casters 29 are brake and the sensor(s) is/are electrically coupled to the control circuitry 72 (FIG. 27) of the bed. The indicia for zone 414 is a siderail icon. The discussion above, in connection with the preceding embodiments, regarding the various monitored bed conditions is equally applicable to module 400. Thus, module 400 includes one or more light emitters behind each of lenses 408. For example, in some embodiments, a first LED which shines green light is situated behind each of lenses 408 and a second LED which shines light other than green, such as amber, red, or orange, is also situated behind lenses 408. In other embodiments, a single bi-colored LED is located behind respective lenses 408.

Figure 21:
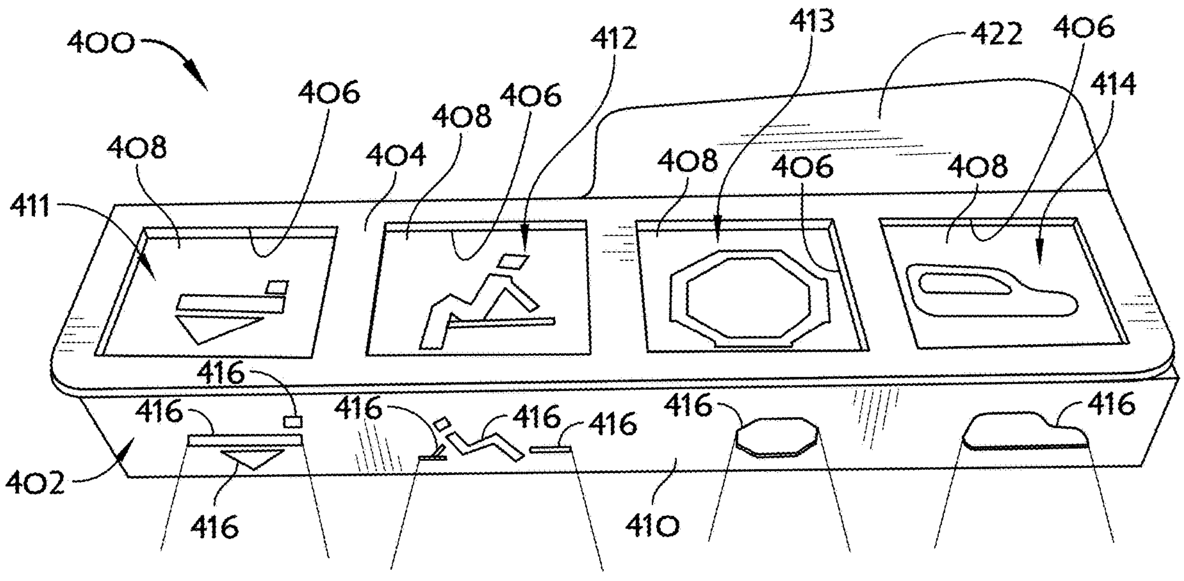
FIG. 21 is a bottom perspective view of the alert light module of FIG. 20 showing a set of shaped cut outs formed in a bottom wall of a housing of the alert light module, the shaped cut outs defining the shape of various images to be projected onto the floor.

Housing 402 of module 400 has a bottom wall 410 that is formed to include cutouts 416 that match the graphical icons or indicia on associated lenses 408 as shown in FIG. 21. In some cases, the cutouts 416 comprise a single hole and in other cases, the cutouts comprise multiple holes. The cutouts 416 are located on bottom wall 410 so as to correspond to associated zones 411, 412, 413, 414 of module 400. Partition walls (not shown, but similar to those described above in preceding embodiments) are provided in the interior region of housing 402 to separate the zones 411, 412, 413, 414.

Some of the light emitted from the respective light emitters (e.g. green LED and amber LED) passes through the respective cutout 416 and projects an image 418 of the cutout on the floor as shown in FIG. 20. Only one image 418 is projected on the floor in the illustrative example. Most healthcare facilities have neutral colored floors that are relatively light in shade, such as being off white, beige, or gray, for example. Thus, the color of image 418 on the floor will match the color of the light emitted through the respective cutout 416. Light also passes through lenses 408 in the illustrative embodiment, but in other embodiments, lenses 408 are omitted and front wall 404 is solid across its entire surface. In the illustrative embodiment of FIGS. 20 and 21, module 400 is sufficiently large for a caregiver to discern the color of the light emitted through lenses 408 when the caregiver is standing at a distance of ten to twenty feet or more from module 400. The images 418 on the floor enhance the ability of caregivers to determine the alert status of the associated bed.

In those embodiments in which two differently colored light emitters are located side-by-side in the interior region of housing 402 of module 400 for each of zones 411, 412, 413, 414, then the position of the image 418 on the floor will shift by a slight amount when module 400 switches from emitting light from the first light emitter to emitting light form the second light emitter, and vice versa. Thus, the spacing between the light emitters of each zone 411, 412, 413, 414 dictates how far the image 418 shifts on the floor. It will be appreciated that the light emitters should be positioned within housing 402 so that there is no overlap on the floor of the images 418 projected from all four zones 411, 412, 413, 414 regardless of which light emitter of each zone is emitting light at any given time. In other embodiments that use a bicolor LED, for example, the issue of a shifting location of image 418 on the floor is avoided because the light is emitted from the bicolor light emitter at the same location within housing 402 regardless of color. In some embodiments, module 400 is operated so that image 418 is flashed on the floor when an alert condition is detected on the bed for a corresponding zone 411, 412, 413, 414. The light emitted from the associated lens 408, of course, also will flash in such embodiments.

In some embodiments, the light emitters of module 400 are arranged within housing 402 so that green colored images 418 are projected onto the floor for each zone 411, 412, 413, 414 a first distance outwardly from foot end 26 of bed 10 in the longitudinal direction of bed 10 and so that amber colored images 418 (or whatever color other than green is used) are projected onto the floor for each zone 411, 412, 413, 414 a second distance outwardly from foot end 26 of bed 10 in the longitudinal direction of bed 10. The second distance is greater than the first distance in some embodiments. Thus, in such embodiments, green images 418 on the floor will be generally aligned with each other at the first distance from foot end 26 of bed 10 and will be generally parallel to the lateral dimension of bed 10. Similarly, amber images 418 on the floor will be generally aligned with each other at the second distance from foot end 26 of bed 10 and will be generally parallel to the lateral dimension of bed 10. For example, green images 418 may be projected onto the floor one foot from foot end 26 of bed 10 and amber images 418 may be projected onto the floor two feet from foot end 26 of bed. Of course, other dimensions for the first and second distances may be chosen in other embodiments at the discretion of the bed designer. Because the amber images are projected further out from foot end 26 of bed 10 and because, in some embodiments, the amber images 418 also flash, the amber images 418 will be readily noticeable to caregivers from afar.

Housing 402 is box-like in structure such that there are side walls and a back wall which cannot be seen in FIGS. 20 and 21. Housing has a top wall 420, a portion of which can be seen in FIG. 20. In the illustrative example, a portion of front wall 404 projects upwardly and serves as a mounting flange 422. In some embodiments, adhesive is used on the back of flange 422 to mount module 400 to a vertical surface of a frame member, such as frame member 110, of bed frame 20. In other embodiments, apertures are provided on flange 422 and/or top wall 420 for receipt of fasteners such as rivets, screws or bolts. Housing 402 also has an opening or slot (not shown) for conductors, such as a ribbon or cable of wires, to pass through to provide current to a circuit board within housing 402 or to connect directly to the light emitters without an intervening circuit board. In some embodiments, one or more circuit boards with LED driver integrated circuit (IC) chips are situated in housing 402.

Figure 22:
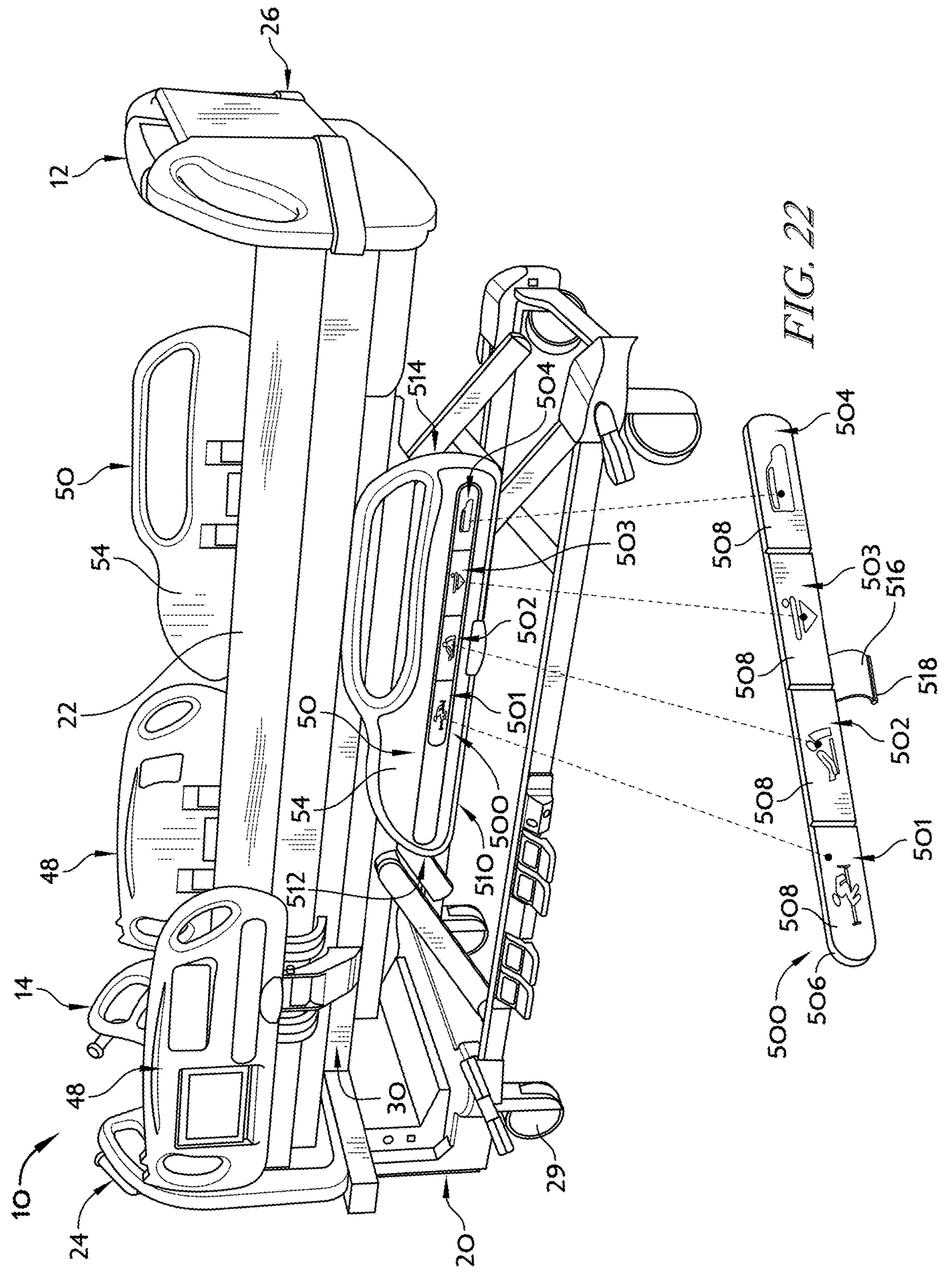
FIG. 22 is a perspective view of still a further alternative hospital bed showing an enlarged alert light assembly exploded away from a siderail of the hospital bed, the alert light assembly having spaced apart zones that are individually illuminated to indicate a status of a respective feature or function of the hospital bed.

Referring now to FIG. 22, an alternative alert light assembly 500 is coupled to barrier panel 54 of siderail 50 of bed 10. In some embodiments, two assemblies 500 are provided on bed 10 with each assembly 500 being attached to the barrier panel 54 of the respective siderail 50. Assemblies 500 may be provided on bed 10 in addition to assemblies 100, 100', 100" and modules 160, 160', 300, 400 in some embodiments. In FIG. 22, an enlarged, duplicative alert light assembly 500 is shown exploded away from siderail 50 for purposes of easing the description thereof.

Alert light assembly 500 comprises a polypropylene LED light strip with an adhesive backing in the illustrative embodiment of FIG. 22. Thus, assembly 500 is similar to alert light assembly 100" discussed above in connection with FIGS. 4-7. Accordingly, alert light assembly 500 has a very thin substrate 506 which carries bi-color light emitting diode (LED) regions 508 which define separate zones 501, 502, 503, 504 that are illuminated to convey information regarding respective alert conditions. Each region 508 of zones 501, 502, 503, 504 of assembly 500 has the same indicia and relates to the same functions of bed 10 as assemblies 100, 100', 100" discussed above. Thus, the discussion herein of diagrammatic circuitry of FIG. 27 is also applicable to assembly 500. Furthermore, the light emitters of zones 501, 502, 503, 504 of assembly 500 are illuminated in the same manner and under the same circumstances as assemblies 100, 100', 100" discussed above.

The adhesive backing of substrate 506 is used to adhere assembly 500 to an outer surface of barrier panel 54 of siderail 50. In some embodiments barrier panel 52 is formed with a shallow recess that receives assembly 500 so that the outer surface of regions 508 is substantially coplanar with the outer surface of barrier panel 54. In the illustrative example, assembly 500 is situated on barrier panel 54 adjacent a bottom edge 510 of siderail 50. Assembly 500 extends more than half the distance between a front end 512 and a rear end 514 of siderail 50. In other embodiments, suitable fasteners are used to couple assembly 500 to siderail 50. In still further embodiments, assembly 500 is coupled to siderail 48 rather than siderail 50. Assembly 500 is sufficiently large that zones 501, 502, 503, 504, when illuminated, can be seen and understood by a caregiver at a distance of about ten to twenty feet, or more, from assembly 500.

Assembly 500 has a ribbon 516 of electrical conductors which terminate at an electrical connector 518 as shown in FIG. 22. Ribbon 516 extends from a central region of substrate 506 about midway between the opposite ends thereof. The conductors of ribbon 516 are routed from connector 518 to the various regions 508. Barrier panel 54 of siderail 50 has a hole, such as a relatively small slot through which connector 518 and ribbon 516 are routed into the interior region of barrier panel 54. Connector 518 attaches to a mating electrical connector in the interior region of barrier panel 54 and electrical conductors extend from the mating connector to control circuitry 72, thereby to electrically couple assembly 500 with circuitry 72.

Figure 23:
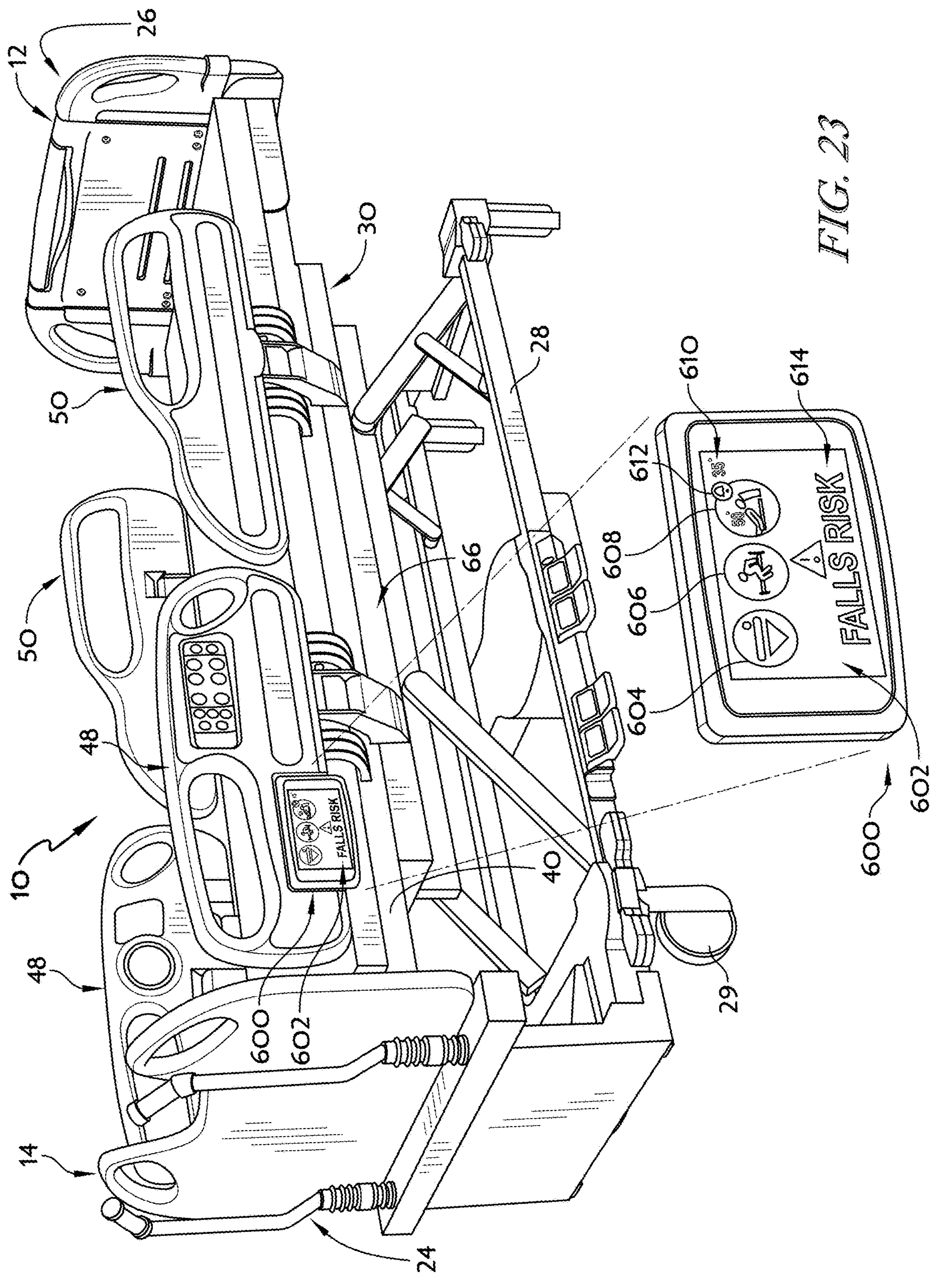
FIG. 23 is a perspective view of yet still a further alternative hospital bed showing a graphical user interface (GUI) exploded away from a siderail of the hospital bed, the GUI displaying alert icons when the GUI defaults to a screen saver mode after a period of inactivity of use by a user.

Referring now to FIG. 23, bed 10 has a graphical user interface (GUI) 600 attached to siderail 48. GUI 600 is a touch screen display that is used by caregivers to navigate through a multitude of bed control screens to provide user inputs to control various features of bed 10. Those various control screens are not salient to the present disclosure. What is salient is a screen saver screen 602 that appears on GUI 600 after a period of inactivity of use of the GUI 600. The period of inactivity of use is monitored by control circuitry 72 (FIG. 27) and may be on the order of about 1 minute to about 5 minutes, for example, at the discretion of the bed designer. Of course, other time out periods are within the scope of this disclosure. Screen saver screen 602 is sometimes referred to herein simply as screen saver 602. In FIG. 23, an enlarged, duplicative GUI 600 is shown exploded away from siderail 48 for purposes of facilitating the description of screen saver 602.

Screen saver 602 includes a set of enlarged graphical icons that are colored to indicate a status of an associated feature of the bed 10. In the illustrative example, a first icon 604 of the screen saver 602 relates to a position of the upper frame 30 relative to the base frame 28 of bed 10, a second icon 606 of the screen saver 602 relates to the ppm system of bed 10, and a third icon 608 of screen saver 602 relates to an angle at which a head section of the upper frame is raised. In some embodiments, the icons 604, 606, 608 on the screen saver 602 of GUI 600 are provided on bed 10 in addition to the alert light assemblies 100, 100', 100" and the alert modules 160, 160', 300, 400 that are discussed elsewhere herein.

Each of icons 604, 606, 608 is colored green on the screen saver 602 when the associated condition of bed is determined by control circuitry 72 to have a satisfactory status based on inputs from sensors 70, 88, 91. If control circuitry 72 determines that there is an unsatisfactory status of a monitored condition of bed 10, then the associated icon 604, 606, 608 is changed to a color other than green, such as red, amber (i.e., yellow) or orange. In some embodiments, icons 604, 606, 608 associated with unsatisfactory conditions of bed 10 are flashed on screen saver 602.

In the illustrative example, an angle at which head section 40 is raised relative to frame 66 or relative to horizontal is displayed in a field 610 adjacent to icon 608 as shown in FIG. 23. In FIG. 23, field 610 indicates that the HOB angle is 35 degrees. The threshold angle above which head section 44 is supposed to be raised in order to have a satisfactory status is 50 degrees as indicated in icon 608. Thus, head section 44 is below the threshold angle. Accordingly, a bell symbol 612 is added to icon 608 to indicate an alert condition. Thus, due to the alert condition, icon 608 is displayed a color other than green, whereas icons 604, 606 are displayed green in color. Screen saver 602 also has a field 614 on which is displayed textual information pertaining to a patient (not shown) supported by bed 10. In the illustrative example, field 614 has text indicating that the patient associated with bed 10 is a falls risk. Also in the illustrative example, a graphical icon 616 associated with the message in field 614 is displayed above field 614.

It should be understood that the icons and text displayed on screen saver 602 are at the discretion of the bed designer and can relate to any desired aspect of bed 10 or the patient associated with bed 10. The text in field 614 may be generated based on information received by bed 10 over the network of the healthcare facility from a remote computer such as those mentioned above in this disclosure. The icons 604, 606, 608 on screen saver 602 are generally round in the illustrative example and have diameters on the order of about 1 inch to about 2 inches. Thus, the size of icons 604, 606, 608 are sufficiently large to stand out to a caregiver viewing GUI 600 from afar. Furthermore, icons 604, 606, 608 are larger than icons that typically appear on GUI 600 in connection with the bed control screens. In other embodiments, the screen saver icons are larger than, or smaller than, the icons 604, 606, 608 that are used in connection with screen saver 602.

Figure 24:
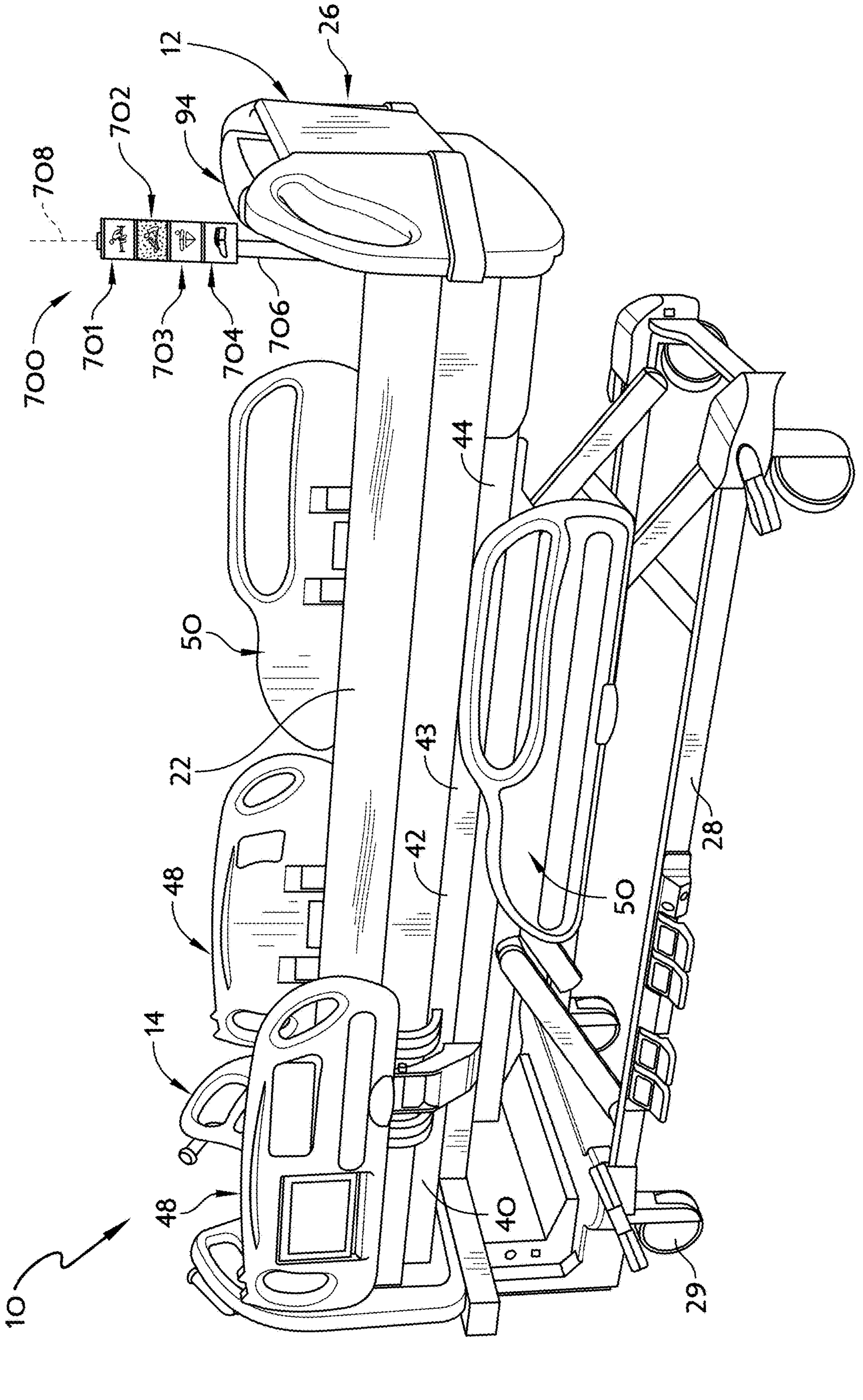
FIG. 24 is a perspective view of another alternative hospital bed showing a set of vertically stacked alert lights mounted on a generally vertically oriented pole at a foot end of the hospital bed.
Figure 26:
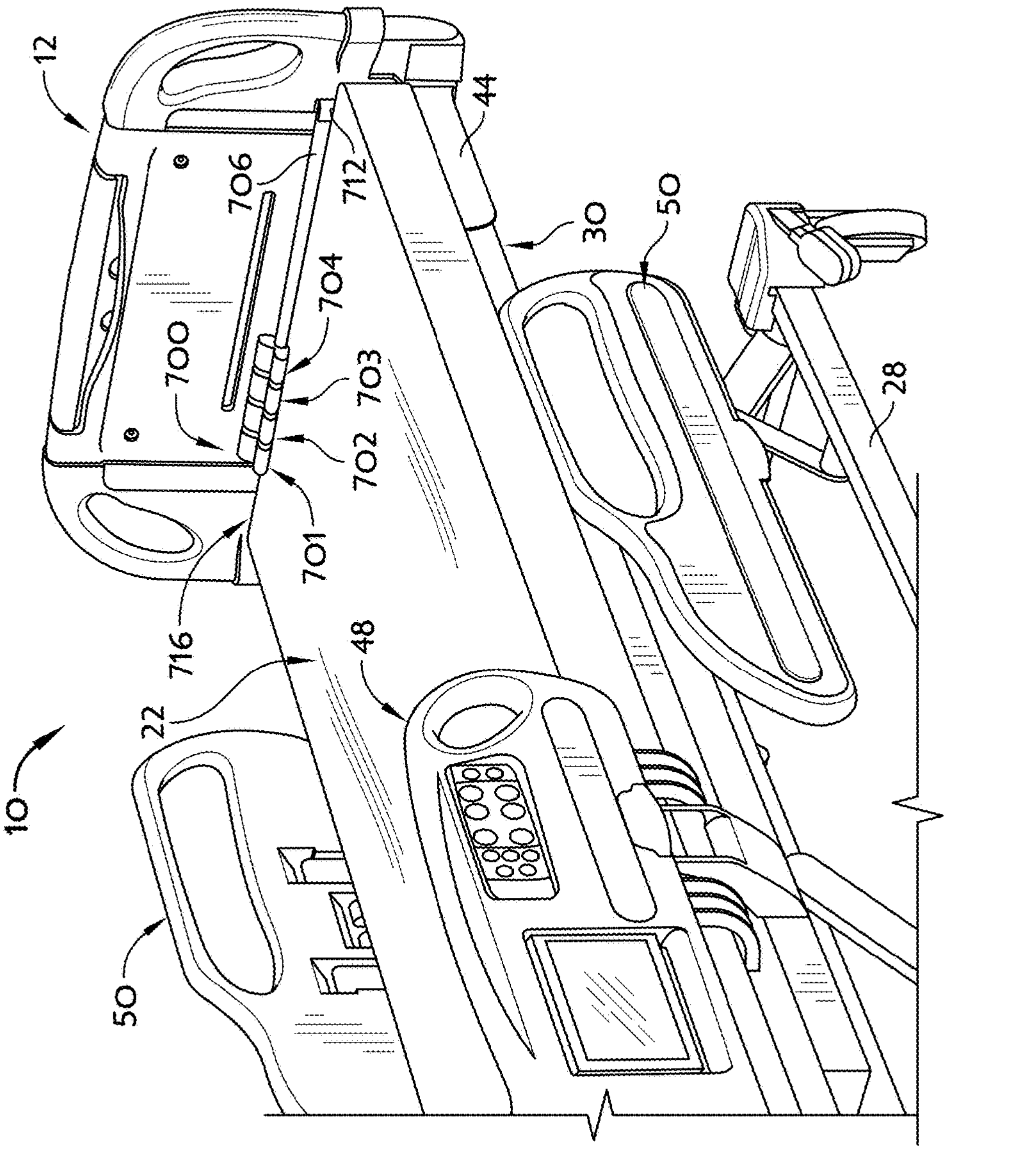
FIG. 26 is a perspective view of a portion of the hospital bed of FIG. 24 showing the pole moved to a storage position having one lobe of the tri-lobed configuration of each alert light tucked into a crevice defined between a mattress and a footboard of the hospital bed.
Figure 25:
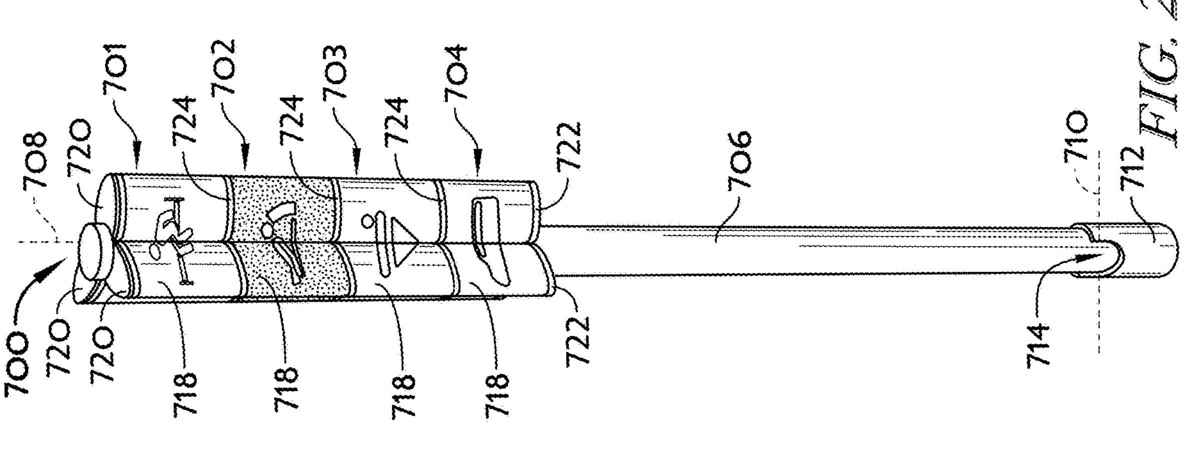
FIG. 25 is an enlarged perspective view of the pole and the vertically stacked alert lights, each of the alert lights having a tri-lobed configuration.

Referring now to FIGS. 24-26, bed 10 includes an alert light assembly 700 that is mounted on a pole 706 which is coupled to the upper frame 30. In the illustrative example, pole 706 is coupled to a corner region of foot section 44 of upper frame 30 near foot end 26 of bed 10. Pole 706 is cylindrical in shape and has a pole axis 708, shown in FIGS. 24 and 25. The pole axis 708 is defined along the length of pole 706 through its center. Alert light assembly 700 is supported by the pole 706 at a position generally above top edge 94 of foot board 12 when pole 706 is in a raised, use position as shown in FIG. 24. Alert light assembly 700 has separate zones 701, 702, 703, 704 that are individually illuminated to indicate the status of a respective bed condition. The separate zones 701, 702, 703, 704 are stacked along pole axis 708 and thus, are vertically stacked when pole 706 is in the raised, use position.

In the illustrative embodiment, each of zones 701, 702, 703, 704 has a tri-lobed configuration as shown best in FIG. 25. Pole 706 is movable relative to the upper frame assembly 30 between the raised, use position extending generally vertically upwardly from the upper frame 30 as shown in FIG. 24 and a storage position, shown in FIG. 26, extending generally horizontally and in proximity to frame member 110 of the upper frame 30. A lower end of pole 706 is coupled to a cylindrical member 712 for pivoting movement about a horizontal axis 710, shown in FIG. 25. Cylindrical member 712 attaches to upper frame 30 such as by coupling to a post or socket (not shown) provided on frame member 110 of upper frame 30 or such as by being welded or otherwise fastened to frame member 110 of upper frame. Cylindrical member 712 is formed to include a U-shaped notch 714 into which a portion of pole 706 moves as pole 706 is moved from the use position to the storage position. Member 712 is situated between footboard 12 and a foot end of mattress 22 as best shown in FIG. 26. When pole 706 is in the storage position, one of the lobes of the tri-lobe configuration of each of the separate zones 701, 702, 703, 704 is tucked into a crevice 716 defined between the foot end of mattress 22 and footboard 12.

In the illustrative embodiment, each of the separate zones 701, 702, 703, 704 includes a lens 718 that encompass the pole axis 708 and that is shaped to define the tri-lobed configuration of assembly 700. Each lens 718 has indicia to indicate a particular alert condition when the associated zone 701, 702, 703, 704 is illuminated a color other than green. The indicia on each lens 718 include three graphical icons spaced equally around the pole axis 708. The three graphical icons of the respective lens 718 of zones 701, 702, 703, 704 are the same as the graphical icons or indicia described above in connection with zones 101, 102, 103, 104 of alert light assemblies 100, 100', 100", for example.

Alert light assembly 700 has a top wall 720 and a bottom wall 722, each of which is generally perpendicular to axis 708 and each of which has the tri-lobed shape of the overall assembly 700. Alert light assembly 700 also has separation walls 724 that are each situated between respective pairs of the separate zones 701, 702, 703, 704 so that light emitted from one of the separate zones 701, 702, 703, 704 is be prevented from bleeding into an adjacent zone 701, 702, 703, 704. Like top and bottom walls 720, 722, separation walls 724 are also generally perpendicular to pole axis 708 and also have the tri-lobed shape of light assembly 700.

In some embodiments, each zone 701, 702, 703, 704 includes a first light emitter 78, such as LED 78 (FIG. 27), that emits light of a first color and a second light emitter, such as LED 80 (FIG. 27), that emits light of a second color. For example, the first color may be green and the second color may be either amber, red, or orange. In some embodiments, each of the lobes of the tri-lobe configuration of each zone 701, 702, 703, 704 includes first and second light emitters. Thus, each zone 701, 702, 703, 704 includes six total light emitters behind lens 718 in such embodiments, three of which emit the first color and three of which emit the second color. In other embodiments, zones 701, 702, 703, 704 have one or more bicolor LED's in lieu of LED's 78, 80.

Electrical conductors, such as conductors 82 (FIG. 27), are routed from control circuitry 72 along and/or through upper frame 30, through the interior region of member 712, and through the interior region of pole 706 to the respective light emitters in each of zones 701, 702, 703, 704. In other embodiments, the conductors routed through member 712 and pole 706 terminate at one or more circuit boards (not shown) of assembly 700 which, in turn, has conductors running to each of the light emitters of assembly 700. Zones 701, 702, 703, 704 are illuminated the first and second colors to indicate respective bed statutes in the same manner as described above in connection with zones 101, 102, 103, 104 of alert light assemblies 100, 100', 100".

Optionally, bed 10 includes one or more sensors 800, shown diagrammatically in FIG. 27 (in phantom), that are coupled to frame 20 and/or mattress 22 and that produce a signal which is used to monitor a sleep state of the patient on bed 10. Examples of the types of sensors that are suitable for use as sensor(s) 800 include force sensors, such as force sensitive resistors (FSR's), piezoelectric materials, and strain gain gages. In some embodiments, sensors 70 of the scale/ppm sensor are used to monitor the patient's sleep state such that separate sensors 800 are not needed for this purpose. Motion sensor pads situated between mattress 22 and deck 38, acoustic sensors, and temperatures sensors that measure patient temperature are examples of other types of sensors that may be used as sensor(s) 800 if desired. Accordingly, block 800 in FIG. 27 is intended to represent any and all types of sensors that may be used in connection with monitoring a patient's sleep state.

A sleep state alert light 802 is also included on bed 10 as indicated diagrammatically in FIG. 27. For example, in some embodiments, light 802 is coupled to frame 20 of bed 10 at a location spaced from the alert light assemblies and the alert light modules, if any, on bed 10. Control circuitry 72 controls the illumination of alert light based on the sleep state of the patient, as measured by sensor(s) 800, so as to indicate an optimal time for a caregiver to take at least one vital sign of the patient. In some instances, the optimal time for the caregiver to take the at least one vital sign is when the signal from sensor 800 indicates that the sleep state of the patient is a deep sleep state. In other instances, the optimal time for the caregiver to take the at least one vital sign is when the signal from the sensor 800 indicates that the sleep state of the patient is an alert state of sleep.

In some embodiments, the alert light 802 is changed from a first color to a second color to indicate the optimal time for the caregiver to take the at least one vital sign of the patient. In other embodiments, the alert light 802 is changed from an off state to an on state to indicate the optimal time for the caregiver to take the at least one vital sign of the patient. It is contemplated by this disclosure that each of the alert light assemblies and each of the alert light modules described above, as well as the GUI 600, are used to indicate the optimal time for the caregiver to take at least one vital sign of the patient. For example, if a third light emitter of a third color, say blue, is added to the illuminated zones (e.g., zones 101, 102, 103, 104 or zones 501, 502, 503, 504 or zones 701, 702, 703, 704) then when the optimal time for taking patient vitals signs is detected by circuitry 72, then all four of the zones are illuminated the third color. Alternatively, one or more tricolor LED's in each of the illuminated zones of the alert light assemblies and modules described herein are also within the scope of this disclosure for this same purpose.

It is also contemplated by this disclosure that the electronic displays 290, 290' described herein in connection with FIGS. 14-17 are operated to display messages pertaining to the patient's sleep state, including messages indicating the optimal time for taking the patient's vital signs based on information from senor(s) 800. Furthermore, in some embodiments, sensor(s) 800 monitor one or more vital signs of the patient in addition to monitoring the patient's sleep state. Thus, when circuitry determines that it is the optimal time for taking the patient's vital signs, circuitry 72 operates automatically to take the patient's vital signs using sensor(s) 800 and then either stores the vital signs in memory 76 or transmits the vital signs information to the network of the healthcare facility for storage in a remote computer device (e.g., the patient's electronic medical record in an EMR computer database) or both.

While several of the embodiments discussed above have four separate zones for alerting, it is within the scope of this disclosure for an alert light assembly or an alert light module of the types discussed herein to have a number of zones less than or greater than four. Furthermore, in some embodiments, an ambient room light sensor (not shown), such as a photocell is included as part of circuitry 72 and is placed on bed 10, 10', 200 at an appropriate location which exposes the sensor to ambient room light. Based on the amount of ambient room light sensed by the ambient room light sensor, the intensity of the illumination of the light emitters of the various alert light assemblies 100, 100', 100", 500, 700 and alert light modules 160, 160', 300, 400, as well as the light pipe 274 embodiment of FIGS. 12 and 13, the electronic displays 290, 290' of FIGS. 14-17, the screen saver 602, and the sleep state alert light 802 discussed herein, is adjusted.

Based on the foregoing, it will be appreciated that if the ambient room light is sensed to have relatively high brightness, such as when the room lights are turned on or during the day time, then the light emitters are controlled to emit light more brightly and, if the ambient room light is sensed to have relatively low brightness, such as when the room lights are turned off or during the night time, then the light emitters are controlled to emit light less brightly. Thus, the current flowing to the light emitters, such as LED's 78, 80, is increased or decreased, such as by use of a voltage controller, based on the signal received from the ambient room light sensor. In some embodiments, the voltage applied to the light emitters uses pulse width modulation (PWM) to control the brightness. Thus, the duty cycle of the PWM voltage applied to the light emitters, such as LED's 78, 80, is increased or decreased based on the signal received from the ambient room light sensor to, in turn, adjust the brightness of the light emitters.

Although certain illustrative embodiments have been described in detail above, many embodiments, variations and modifications are possible that are still within the scope and spirit of this disclosure as described herein and as defined in the following claims.

The invention claimed is:

1. A method comprising providing a patient support apparatus having a frame including a base frame and an upper frame supported above the base frame and configured to support a patient, the upper frame having a head end, a foot end, and a pair of laterally spaced apart sides that cooperate with the head end and the foot end to form corner regions of the frame, the head end and foot end being spaced apart in a longitudinal dimension of the patient support apparatus, and operating a pair of alert lights of the patient support apparatus, the pair of alert lights being coupled to the frame near the corner regions associated with the foot end of the frame, wherein operating the pair of alert lights comprises projecting a lighted field onto the floor surface in an area of the floor surface situated generally below a respective one of the corner regions associated with the foot end of the frame, wherein the lighted fields relate to a status of a monitored condition of the patient support apparatus.

2. The method of claim 1, wherein operating the pair of alert lights includes operating a pair of light emitters of each alert light, a first light emitter of the pair of light emitters emitting green light and a second light emitter of the pair of light emitters emitting at least one of amber light and red light.

3. The method of claim 1, wherein each alert light is mounted to the upper frame.

4. The method of claim 3, wherein the upper frame has a frame member and the alert light is included in an alert light module that hangs downwardly from the frame member.

5. The method of claim 4, wherein the frame member comprises a laterally extending frame member situated adjacent the foot end.

6. The method of claim 1, further comprising monitoring the monitored condition of the patient support apparatus using a patient position monitoring system of the patient support apparatus.

7. The method of claim 1, further comprising monitoring the monitored condition by monitoring a position of the patient on the patient support apparatus.

8. The method of claim 1, wherein the status relates to a patient on the patient apparatus moving into an impermissible position on the patient support apparatus.

9. The method of claim 1, wherein the status relates to a patient exiting from the patient support apparatus.

10. The method of claim 1, wherein if the monitored condition is in an undesirable state, then operating the pair of alert lights comprises projecting each lighted field onto the floor surface so as to be amber in color or red in color.

11. A method comprising providing a patient support apparatus including a base frame, an upper frame supported above the base frame, a barrier coupled to the upper frame, and an alert light region carried by the barrier, the alert light region having four separate icons that are illuminated to convey information regarding respective bed conditions, the four separate icons being spaced from any graphical display screen of the patient bed and distinct from any user inputs of the patient bed, and wherein the four separate icons carried by the barrier are arranged side-by-side in series along a generally horizontal axis, and illuminating one or more of the four separate icons to indicate whether the respective bed condition has a first status or a second status.

12. The method of claim 11, wherein providing the patient support apparatus comprises providing the patient support apparatus with the alert light region situated closer to a top of the barrier than to a bottom of the barrier.

13. The method of claim 11, wherein providing the patient support apparatus comprises providing the barrier with the alert light region situated between a first side and a second side of the barrier.

14. The method of claim 13, wherein providing the patient support apparatus comprises providing the barrier with first and second hand grip openings and with the alert light region being situated below the first and second hand grip openings without the first and second hand grip openings overlying any portion of the alert light region.

15. The method of claim 11, wherein illuminating the one or more of the four separate icons comprises illuminating each of the icons to be green in color when an associated bed condition has the first status and wherein each of the icons is illuminated at least one of amber and red when the associated bed condition has the second status.

16. The method of claim 11, wherein illuminating the one or more of the four separate icons comprises illuminating a first icon of the four separate icons to convey information regarding a bed exit system of the patient bed and illuminating a second icon of the separate icons to convey information regarding a position of the upper frame relative to the base frame.

17. The method of claim 16, wherein illuminating the one or more of the four separate icons comprises illuminating a third icon of the separate icons to convey information regarding a status of a caster brake of the patient bed.

18. The method of claim 11, wherein the barrier comprises a footboard that is coupled to the upper frame.

19. The method of claim 18, further comprising providing a mattress supported by the upper frame and wherein the footboard is configured so that the alert light region is positioned higher in elevation than an upper surface of the mattress.

20. The method of claim 11, wherein the alert light region includes unilluminated areas between the separate icons that remain unilluminated even when one or more of the four separate icons are illuminated.

* * * * *